US012670899B1

(12) United States Patent
Qiu et al.

(10) Patent No.: US 12,670,899 B1
(45) Date of Patent: Jun. 30, 2026

(54) NATURAL LANGUAGE PROCESSING

(71) Applicant: Amazon Technologies, Inc., Seattle, WA (US)

(72) Inventors: Chixiang Qiu, Bothell, WA (US); Kavita Sudheer Dabke, Mercer Island, WA (US); Ilnur Gadelshin, Vancouver (CA); Mark Aiken, Bainbridge Island, WA (US); Sepehr Valipour, Port Moody (CA); Melanie C B Gens, Honolulu, HI (US); Andrew Smith, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 267 days.

(21) Appl. No.: 18/469,964

(22) Filed: Sep. 19, 2023

(51) Int. Cl.
*G10L 15/18* (2013.01)

(52) U.S. Cl.
CPC .................................... *G10L 15/18* (2013.01)

(58) Field of Classification Search
CPC ....................................................... G10L 15/18
See application file for complete search history.

(56) References Cited

U.S. PATENT DOCUMENTS 10,163,436 B1 * 12/2018 Slifka ..................... G10L 13/00
11,145,295 B1 * 10/2021 Kurhekar ................ G10L 13/00
11,151,986 B1 * 10/2021 Rajbhandari ........... G10L 15/30
11,176,936 B2 * 11/2021 Mathias ................ G06F 40/295
11,348,601 B1 * 5/2022 Deshpande ............. G06F 40/30
11,380,304 B1 * 7/2022 Ponnusamy ........ G10L 15/1822
11,398,226 B1 * 7/2022 Wang .................. G10L 15/1822
11,520,412 B2 * 12/2022 Primavesi ........... G06F 3/04886
11,868,732 B2 * 1/2024 Freeman ............... G06F 40/117
12,205,157 B2 * 1/2025 Xie .................... G06Q 30/0631
12,314,309 B2 * 5/2025 Tambi ................... G06F 16/532
2019/0088251 A1 * 3/2019 Mun ...................... G10L 15/083
2024/0386197 A1 * 11/2024 Perez ...................... G06F 9/547
2024/0403710 A1 * 12/2024 Licato .................... G06N 3/045
2024/0412030 A1 * 12/2024 Guinn .................... G06N 3/045
2025/0005299 A1 * 1/2025 Padmanabhan ....... G06F 16/335
2025/0045304 A1 * 2/2025 Quatro ................... G06N 20/00
2025/0045525 A1 * 2/2025 Enomoto ................ G06F 40/30
2025/0068918 A1 * 2/2025 Choshen ................ G06N 20/00
2025/0077509 A1 * 3/2025 Schindel ............... G06F 16/243
2025/0077976 A1 * 3/2025 Drerup ................... G06N 20/00
2025/0078343 A1 * 3/2025 Chen ......................... G06T 5/70
2025/0086310 A1 * 3/2025 Cuomo ............... G06F 21/6245
2025/0086403 A1 * 3/2025 Pitkin ................ G06Q 30/0243
(Continued)

*Primary Examiner* — Fariba Sirjani
(74) *Attorney, Agent, or Firm* — Pierce Atwood LLP

(57) ABSTRACT

Techniques for modifying values included in an input to be provided to a LLM are described, where the values are likely to result in decrease accuracy of an LLM output. In some embodiments, the system receives a user input and may cause various components to determine data usable to generate a response to the user input. Prior to causing a language model(s) to process information, the system may identify that an input to the LLM includes a value that is to be modified. The system may generate a modified value and may provide input data including the modified value to the LLM. Thereafter, the system may revert the modified value to the original value so that another component may perform its configured processing with respect to the original value.

20 Claims, 15 Drawing Sheets

(56) References Cited

U.S. PATENT DOCUMENTS

| | | | | |
|---|---|---|---|---|
| 2025/0086864 | A1* | 3/2025 | Menges | G06T 11/00 |
| 2025/0094686 | A1* | 3/2025 | Wang | G06F 40/166 |
| 2025/0094687 | A1* | 3/2025 | Wang | G06F 40/30 |
| 2025/0094729 | A1* | 3/2025 | Kim | G06F 40/30 |
| 2025/0165826 | A1* | 5/2025 | Musaelian | G06N 10/20 |
| 2025/0181837 | A1* | 6/2025 | Cheng | G06F 40/56 |
| 2025/0225165 | A1* | 7/2025 | Wang | G06N 20/00 |

* cited by examiner

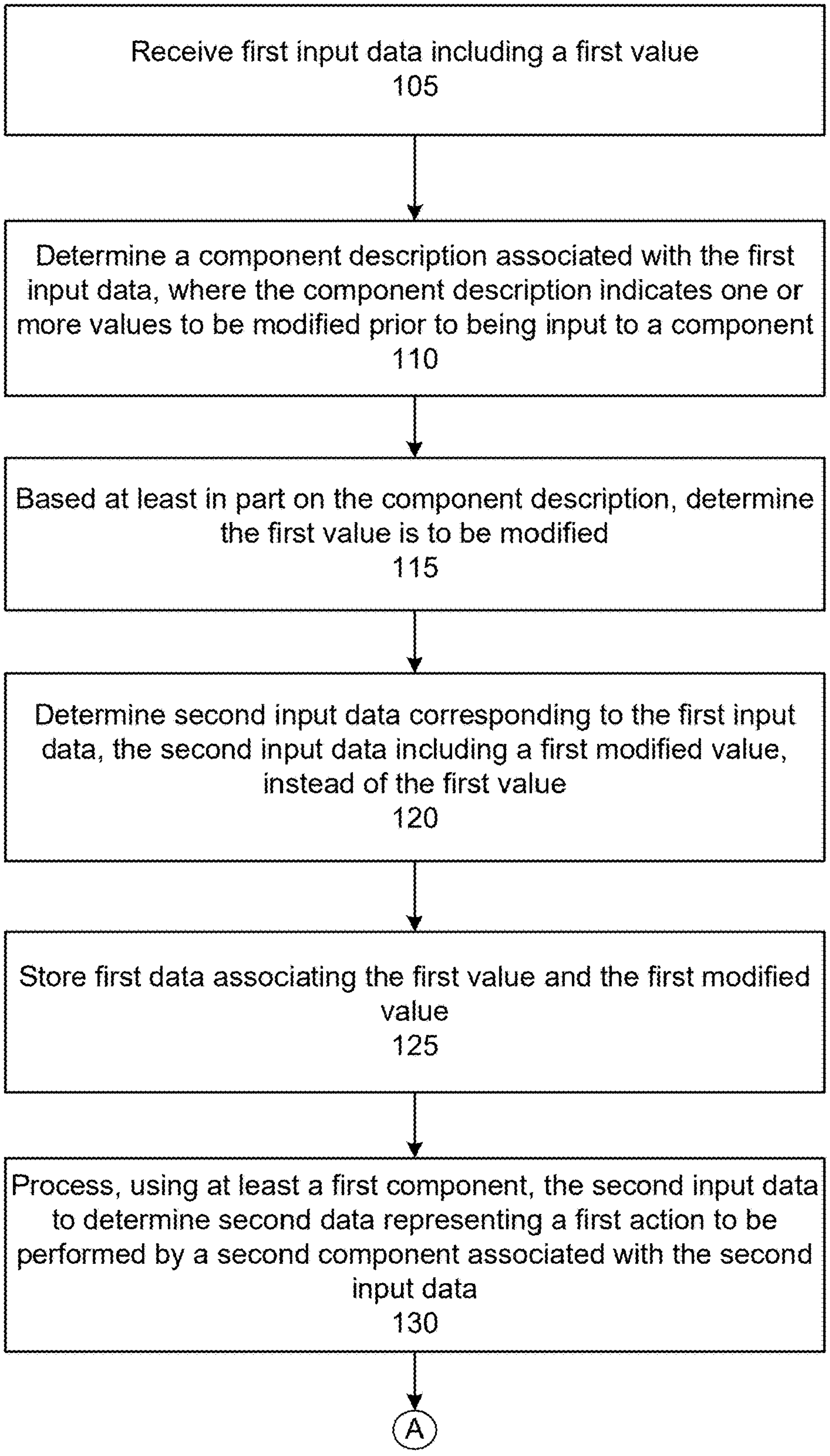

FIG. 1B

Receive first input data including a first value
105

Determine a component description associated with the first input data, where the component description indicates one or more values to be modified prior to being input to a component
110

Based at least in part on the component description, determine the first value is to be modified
115

Determine second input data corresponding to the first input data, the second input data including a first modified value, instead of the first value
120

Store first data associating the first value and the first modified value
125

Process, using at least a first component, the second input data to determine second data representing a first action to be performed by a second component associated with the second input data
130

(A)

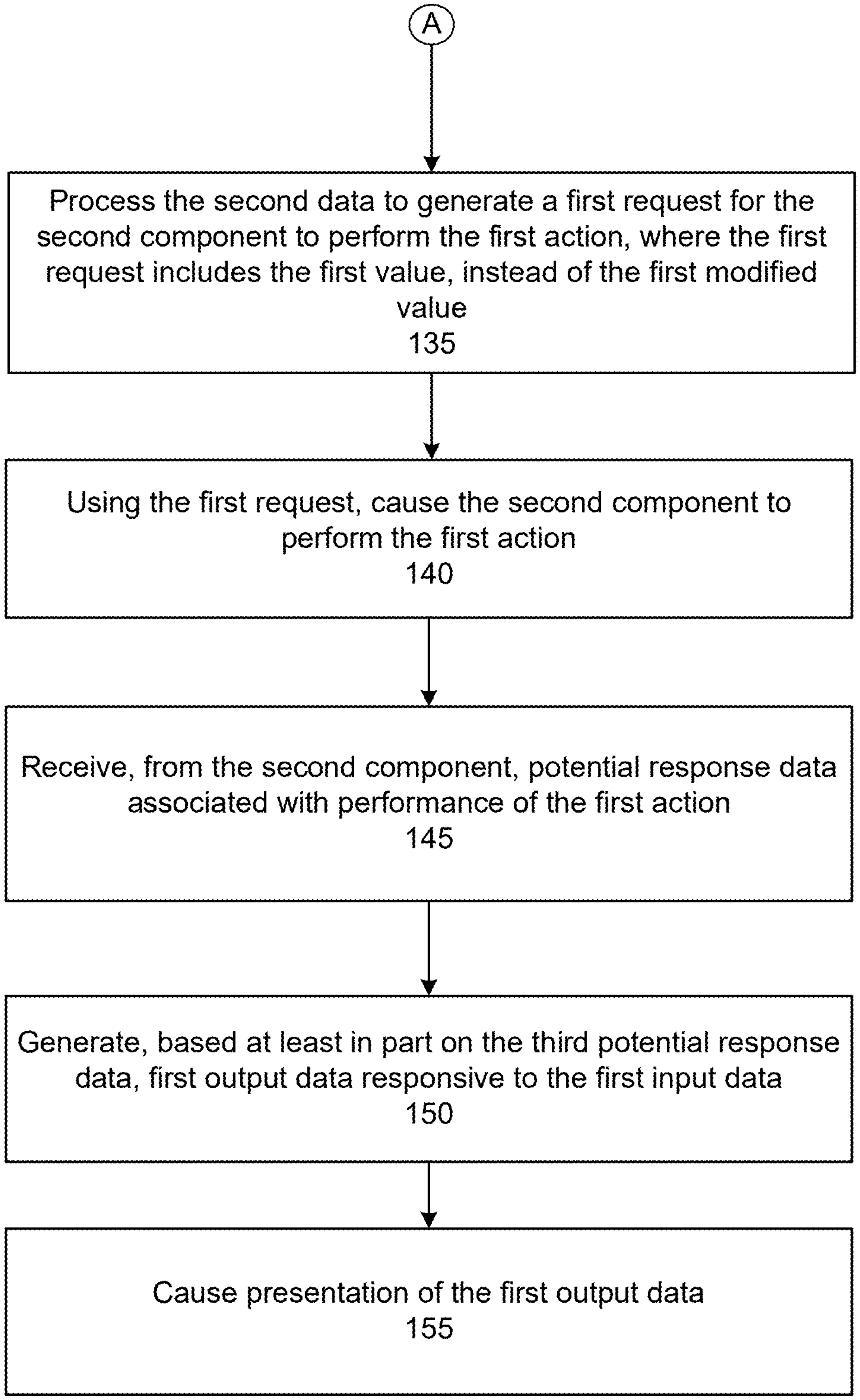

Process the second data to generate a first request for the second component to perform the first action, where the first request includes the first value, instead of the first modified value
135

Using the first request, cause the second component to perform the first action
140

Receive, from the second component, potential response data associated with performance of the first action
145

Generate, based at least in part on the third potential response data, first output data responsive to the first input data
150

Cause presentation of the first output data
155

Network(s) 299

Device 210

Antenna 1122

Microphone(s) 1120

Speaker 1112

Display 1116

Camera 1118

Bus 1124

I/O Device Interfaces 1102

Controller(s) / Processor(s) 1104

Memory 1106

Storage 1108

NATURAL LANGUAGE PROCESSING

BACKGROUND

Natural language processing systems have progressed to the point where humans can interact with computing devices using their voices and natural language textual input. Such systems employ techniques to identify the words spoken and written by a human user based on the various qualities of received input data. Speech recognition combined with natural language understanding processing techniques enable speech-based user control of computing devices to perform tasks based on the user's spoken inputs. Such processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 1B-1C are flowcharts illustrating example processes that may be performed by a system to modify values of input data prior to providing the input data to one or more components of the system, according to embodiments of the present disclosure.

DETAILED DESCRIPTION

Figure 1A:
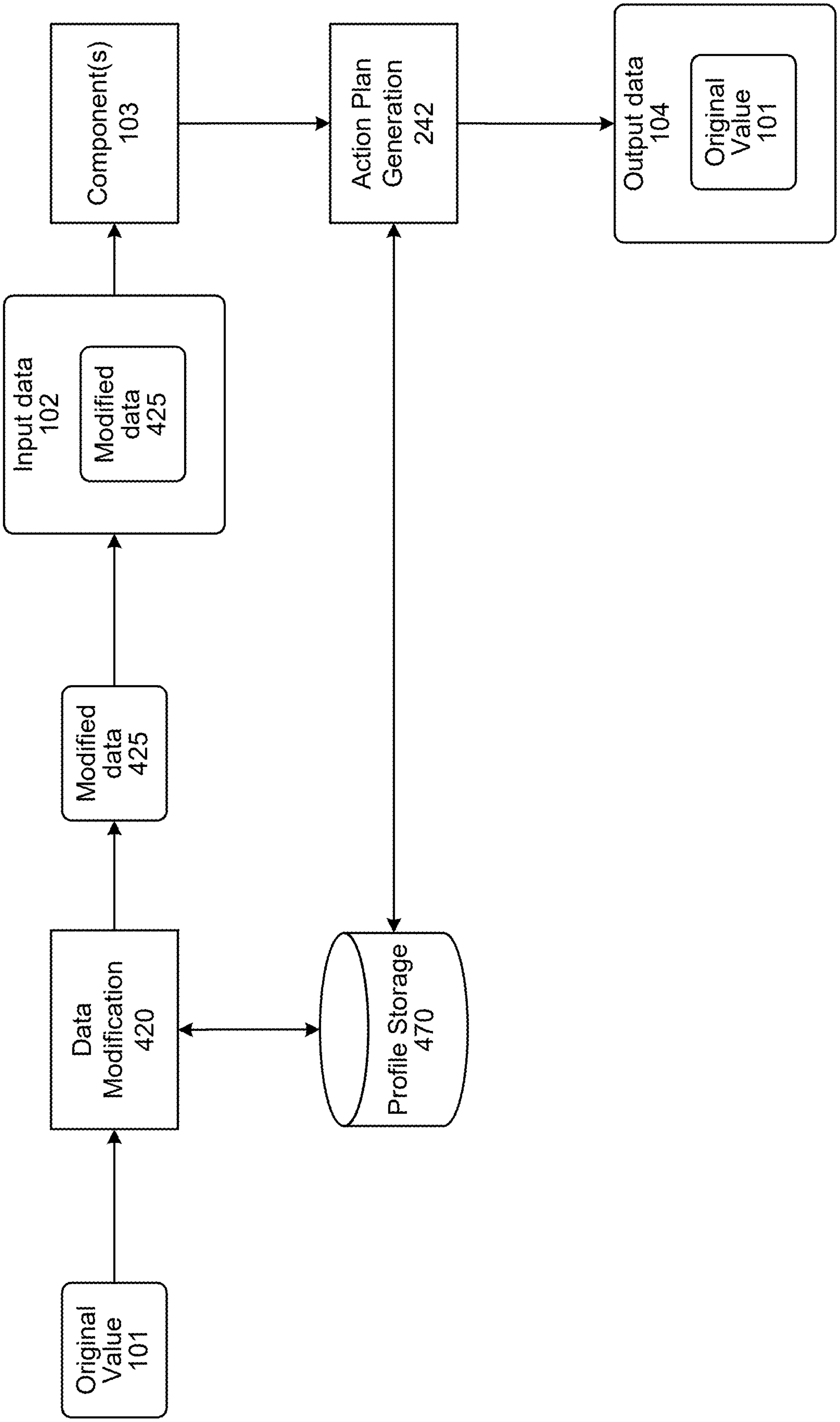
FIG. 1A is a conceptual diagram illustrating an example system for modifying a value prior to providing to a component(s), according to embodiments of the present disclosure.

Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a system. Text-to-speech (TTS) is a field of computer science concerning transforming textual and/or other data into audio data that is synthesized to resemble human speech. Natural language generation (NLG) is a field of artificial intelligence concerned with automatically transforming data into natural language (e.g., English) content. Language modeling (LM) is the use of various statistical and probabilistic techniques to determine the probability of a given sequence of words occurring in a sentence. LM can be used to perform various tasks including generative tasks that involve generating data rather than discriminating between given classes.

Certain systems may be configured to respond to natural language (e.g., spoken or typed) user inputs. For example, in response to the user input "what is today's weather," the system may output weather information for the user's geographic location. As another example, in response to the user input "what are today's top stories," the system may output one or more news stories. For further example, in response to the user input "tell me a joke," the system may output a joke to the user. As another example, in response to the user input "book me a flight to Seattle," the system may book a flight to Seattle and output information of the booked flight. For further example, in response to the user input "lock the front door," the system may actuate a "front door" smart lock to a locked position.

A system may receive a user input as speech. For example, a user may speak an input to a device. The device may send audio data, representing the spoken input, to the system. The system may perform ASR processing on the audio data to generate ASR data (e.g., text data, token data, etc.) representing the user input. The system may perform processing on the ASR data to determine an action responsive to the user input.

In some instances, the system may be configured to process the ASR data using one or more language models (e.g., one or more large language models (LLMs)) to determine a request(s) for one or more components to perform a function(s) potentially responsive to the user input (e.g., generate a potential response/action responsive to the user input). For example, in response to the user input "Please plan a 4-person trip to [Location] from [Date 1] to [Date 2]," the language model(s) may determine one or more requests for one or more components (e.g., an application programming interface (API), a skill component, a LLM agent component, etc.) to book a flight ticket and book a hotel. The requests may be associated with a component description. A component description may be natural language data representing API calls, incomplete API calls, API call formats (e.g., TravelApplication1.Book_Flight (Departure_Date="[Date 1]", From_Destination=" ", To_Destination="[Location]"), TravelApplication2.Book_Hotel (Location=" ", Check_In_Date=" ", Check_Out_Date=" "), etc.), indications of actions to be performed (e.g., "Book a flight to [location]"; "Book a hotel at [location]") and/or one or more components (e.g., use [Component 1] to book a flight ticket to [location] on [Date 1], use [Component 2] to book a hotel in [Location] from [Date 1] to [Date 2]).

In some instances, the system may receive information whose value is not particularly useful to the processing of the language model(s) (or some other component(s)). For example, such information may not be needed by the language model(s) to generate an output, may increase a likelihood of error in processing by of the language model(s), etc. However, such information is useful to other system components to perform its processing/actions. As such, it may be beneficial for the system to modify the value.

The present disclosure describes techniques for identifying information that may not be particularly useful for the processing by a system component(s). The present disclosure also describes techniques for modifying such information and maintaining a record so that the original information is still available for other system components to process. In example embodiments, the system may identify one or more values in input data that is to be provided to a large language model (LLM), where such value(s) may not be useful in the LLM's processing, may degrade the accuracy of the LLM, and/or may correspond to information that is otherwise not to be provided to the LLM (e.g., personally identifiable information). After identifying the value, the system may modify the value in the input data, for example, by removing it, replacing it with another value, truncating it, etc., and the input data with the modified value may be processed by the LLM. The system may store data (e.g., a mapping, a record, etc.) representing the original value and the modified value. The stored data may be used to retrieve the original value, which may be used by other system components to perform its processing.

In some embodiments, the value may be replaced with a version of the value. A version of the value may be a simplified form of the value, a truncated form of the value, a smaller size of the value, etc. The modified value may have fewer characters or tokens than the original value. The modified value may be of fewer bits/bytes than the original value.

In example embodiments, information that may not be useful in LLM processing, may degrade the accuracy of the LLM, and/or may otherwise not be provided to the LLM may be certain types of identifiers, such as globally unique identifiers, geographic coordinates identifying a location, etc. Globally unique identifiers may be used to identify users, devices, components, etc., and may thus include user identifiers, device identifiers, component identifiers, etc.

Modifying such information may result in the LLM not spending processing cycles on processing values that are not useful to the LLM and/or an increase in the accuracy of the LLM based on the LLM processing the modified values. For example, the modified information may be a natural language description of the information associated with the original value (e.g., the original value may be a device ID for a device located in a living room and the modified value may be "living room device"). The system may further revert the original value prior to causing other component(s), to which the original value is useful, to process the information (e.g., a component(s) configured to perform an action using the original value, a component(s) configured to generate/determine information associated with the original value).

Techniques of the present disclosure can be used to identify information that is not useful for the processing by other types of components as well, such as an LLM-based component, an ML-based component, a rule-based component, etc.

In an example, the system may receive a device ID: "system.endpoint.5de6cqfd-3705-4932-9f28-c74eb00p6db1," and the system may determine that this particular value is not useful for LLM processing/reasoning, then the system may modify the device ID value to, for example, "device ID 1." For example, the system may receive a user input "Play music" and corresponding context data representing a device ID value "system.endpoint.5de6cqfd-3705-4932-9f28-c74eb00p6db1," for a device that captured the user input. Based on the received user input and the context data, the system may determine an example prompt: "Play music on device: system.endpoint.5de6cqfd-3705-4932-9f28-c74eb00p6db1." Prior to sending this prompt to a LLM for processing, the system may modify the prompt to be: "Play music on device: device ID 1", by replacing the original device ID value with a simplified or truncated version of the original value. The prompt including the modified device ID value may be provided to the LLM for processing. In this manner, the LLM is still capable of generating an output referring to the particular device (e.g., as "device ID 1"), but the LLM does not have to process with respect to the device ID value of "system.endpoint.5de6cqfd-3705-4932-9f28-c74eb00p6db1." This may be particularly beneficial for components, such as an LLM, configured to perform text summarization/generation as the component will have less tokens to process, which can increase the accuracy of the component. This may be further beneficial for such components in instances where the original value was of no value to the component or the original value is not a descriptive value, which may be difficult for the component to accurately reproduce.

In some embodiments, the system may identify that a value is to be modified using a component description associated with a component that generated the information including the value. For example, the system may identify a component identifier (e.g., indicating the component that generated the information) associated with the information and may use the component identifier to retrieve the corresponding component description. The component description may indicate values that are to be modified prior to being processed by other components.

Additionally, or alternatively, the system may identify a value to be modified using a list of identifier types known to be associated with values to be modified. For example, the system may reference the list to determine that an identifier type of "geographic location" is commonly associated with a value that is to be modified.

In some embodiments, the system may determine how a value is to be modified using mappings between previous values and their corresponding modified values. The system may retrieve the mappings from a storage location (e.g., a user profile storage). The mappings may further associate the mappings with an identifier type (e.g., label) associated with the original value. For example, the mappings may include an identifier type of "device ID," which may be associated with the mappings of "system.endpoint.Org8cqqp-9365-8154-pq09-oe8sb64o1jq8=device ID 1; system.endpoint.3a15c4p4g-075t-931w-8k93-i1e91i4bq5=device ID 2." The system may determine a modified value for a current value by identifying the last modified value associated with the identifier type of "device ID" (e.g., "device ID 2") and determining a new modified value based on the last modified value (e.g., by incrementing the last modified value such that the modified value for the current value is “device ID 3”). The system may update the mappings to include the new mapping (e.g., “system.endpoint.5de6cqfd-3705-4932-9f28-c74eb00p6db1=device ID 3”) and send the mappings to the storage location.

In some embodiments, the system may further identify information that includes a value that was previously modified by the system and may further determine that the original value is useful to the processing by a particular component. The system may, therefore, revert the modified value to the original value. For example, with respect to the example provided above, the system may retrieve the mappings and use them to identify that the device ID value of “device ID 3” is the result of a previous modification by the system, based on the storage including a mapping between the value of “device ID 3” and the original value of “system.endpoint.5de6cqfd-3705-4932-9f28-c74eb00p6db1.” The system may further determine that a component (e.g., a skill component, an API component, etc.) potentially needs the original value of the device ID. For example, the component may be configured to perform an action responsive to the user input/the information being used to request further information from the component (e.g., a device controller component that will use the device ID to control the corresponding device). The system may, therefore, use the mapping to revert the device ID value of “device ID 3” to “system.endpoint.5de6cqfd-3705-4932-9f28-c74eb00p6db1” prior to sending data to the component for processing.

Teachings of the present disclosure provide, among other things, improved computer processing by providing a system capable of modifying values determined to not be useful for the processing by a LLM, determined to result in degradation in the accuracy of the LLM, or determined to correspond to information that is not to be provided to the LLM. This can result in improved computer processing by enabling more efficient processing by the LLMs by only providing information beneficial to its processing to generate an output. This may also improve the accuracy of the LLM by reducing a likelihood that it generates an erroneous output (e.g., an output including an error, an output generated based on a hallucination by the model, etc.). This may also improve the accuracy of the LLM by providing the LLM with modified values that are more descriptive than the original value and, therefore, more meaningful to the LLM when performing its configured processing. The foregoing can also result in an improved user experience by improving efficiency and accuracy of a natural language processing system.

A system according to the present disclosure will ordinarily be configured to incorporate user permissions and only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1A is a conceptual diagram of an example system for modifying values prior to providing to a component(s) for processing. FIGS. 1B-1C are example flowcharts illustrating an example process that may be performed by the system (e.g., the system 100) to modify one or more values prior to providing input data to one or more components.

Referring to FIGS. 1A-1C, the system may receive (step 105) first input data including a first value, for example an original value 101 (shown in FIG. 1A). In some embodiments, the first input data may correspond to a user-provided input, such as such as text (e.g., a text or tokenized representation of a user input), audio, image, video etc. Additionally, or alternatively, the first input data may include an event (e.g., change in device state, presence of a user, etc.), an actuation of a physical button, data representing selection of a button displayed on a graphical user interface (GUI), image data of a gesture user input, combination of different types of user inputs (e.g., gesture and button actuation), etc. Additionally, or alternatively, the first input data may be contextual information (e.g., context data 305 or personalized context data 267 shown in FIG. 4), such as weather information, time of day, device information associated with the device that sent the user input data 227 (e.g., device ID, device states, historical device interaction data, etc.), user ID, user behavioral information, user preferences, user demographics, historical user interaction data, devices/device IDs associated with the user profile, etc. Additionally, or alternatively, the first input data may include system-generated data that is potentially responsive to a user input, such as potential response data 307*a-n* (or information usable to determine potential response data), which is discussed in further detail herein below with respect to FIGS. 5-6.

In some embodiments, the first input data may include a component identifier associated with a component that generated the input data. For example, in instances where the first input data corresponds to a user-provided input, the component identifier may be associated with an orchestrator component 830. For further example, in instances where the first input data corresponds to contextual information, then the component identifier may be associated with the component that determined the contextual information, such as a user recognition component 895, a personalized context component 265, an API provider component 250, etc. As a further example, in instances where the first input data includes system-generated data that is potentially responsive to the user input, the component identifier may be associated with the component that generated the potentially responsive data, such as a TTS component 256, a skill component 254, an LLM agent component 252, the API provider component 250, the personalized context component 265, etc. The system may use the component identifier to determine a component description for the component associated with the component identifier.

The first value/original value 101 included in the first input data may correspond to information associated with a user/a user input, such as a user ID, a device ID, a geolocation, an utterance ID, Uniform Reference Label (URL), item ID (e.g., product ID, such as an Amazon Standard Identification Number (ASIN), song ID, etc.), or any other globally unique identifier.

The system may determine (110) a component description associated with the first input data, where the component description indicates one or more values associated with output generated by a component that are to be modified prior to being input to a component. As discussed above, the system may determine the component description using the component identifier, which may be included in the first input data. The component description may be various information usable by the corresponding component to perform an action. The component description may include actions performable by the component (e.g., natural language descriptions of actions performable by the component, example API calls usable to cause the component to perform the actions, API call formats, etc.), values needed for the component to perform the actions, values that are to be modified prior to being processed by other downstream components, etc. For example, for a music skill, the component description may include a description that the music skill is usable to play music, values needed to cause the music skill to play music (e.g., output device ID, user ID, song ID, playlist ID, etc.), and values that are to be modified prior to being processed by other components (e.g., the output device ID, the user ID, the song ID, the playlist ID, etc.) Based at least in part on the component description, the system may determine (115) the first value is to be modified. In some embodiments, the system may identify an identifier type associated with the first value (e.g., "user ID," "device ID," "geographic location"), and may compare the identifier type to the component description to determine whether the values associated with the identifier type are to be modified. If the component description includes the identifier type, the system may determine that the first value (corresponding to the identifier type) is to be modified. Further details regarding the component descriptions and determining whether to modify a value are discussed herein below with respect to FIGS. 4-6.

The system may determine (120) second input data corresponding to the first input data, the second input data including a first modified value (e.g., modified data 425 shown in FIG. 1A), instead of the first value/original value 101. For example, the system may replace the first value included in the first input data with first modified data 425 to generate input data 102 (as shown in FIG. 1A). The system may use a data modification component 420 (shown in FIG. 1A) to generate the modified data 425 and/or the input data 102 including the modified data 425. The system may generate the first modified value using a mapping(s) between values previously determined to be modified and the corresponding modified values, which may be retrieved from a user profile storage (e.g., the profile storage 470 shown in FIG. 1A). The system may identify the last modified value included in the mapping(s) and may generate the first modified value based on the last modified value (e.g., the value of the last modified value may be incremented by 1). In some embodiments, the system may identify the last modified value based on the last modified value being associated with the same identifier type as the current value. Further details regarding the generation of the modified values are discussed herein below with respect to FIG. 4.

The system/data modification component 420 may store (125) first data associating the first value and the first modified value. For example, the system may update the mappings 472 (shown in FIG. 4) in the profile storage 470 (shown in FIG. 1A) to further include an association between the first value and the first modified value, which may be further associated with the identifier type corresponding to the first value.

The system may process (130), using at least a first component (e.g., component(s) 103 shown in FIG. 1A), the second input data to generate second data representing a first action to be performed by a second component associated with the second input data. In some embodiments, the first component may include one or more LLMs (e.g., the plan generation language model 320, the task selection language model 340, the shortlister language model 540, and/or the response language model 720). Additionally, or alternatively, the first component may further include other components, such as rule-based components, ML-based components, etc. In some embodiments, the second data may correspond to an action plan including one or more requests generated by an LLM (e.g., the shortlister language model 540) for one or more components (e.g., the API provider component 250, the LLM agent component 252, the skill component 254, and/or the TTS component 256) to generate potential responses to the user input. Further details regarding the processing of the system to generate an action to be performed by another component of the system are discussed herein below with respect to FIGS. 3 and 5.

The process may continue as shown in FIG. 1C. The system may process (135) the second data to generate a first request for the second component to perform the first action, where the first request includes the first value, instead of the first modified value. For example, in some embodiments, the first value (e.g., the original value) may be useful for the processing of certain components (e.g., a component(s) 103 configured to perform an action using the original value, a component(s) configured to generate/determine information associated with the original value, etc.). As such, the system (e.g., action plan generation component 242 shown in FIG. 1A) may be further configured to revert the modified values to their original values. The system may identify the one or more requests included in the second data (e.g., the action plan) and may revert the modified value(s) back to their original value(s) (e.g., the value(s) included in the first input data). For example, the action plan generation component 242 may generate output data 104 including the original value 101. The system may revert the modified value(s) using the mapping(s) 472 updated by the system when generating the second input data/output data 104. The system may identify the mapping associating the first value and the first modified value and use the mapping to generate the first request to include the first value, instead of the first modified value. Further details regarding the reverting of modified values to their original values are discussed herein below with respect to FIG. 6.

Using the first request, the system may cause (140) the second component to perform the first action. For example, the system may identify a component description corresponding to the second component associated with the first request and may use the first request and the component description to generate an executable API call usable to cause the second component to perform the first action. Further details regarding the generating of executable API calls using system-generated requests are discussed herein below with respect to FIG. 6.

The system may receive (145), from the second component, potential response data associated with performance of the first action. For example, the second component may process as requested by the executable API call and may return a potential response to the user input. Further details regarding the generation of the potential responses are discussed herein below with respect to FIGS. 5-6. In some embodiments, prior to performing further processing with respect to the potential response data, the system may process as described herein above to modify a value(s) included in the potential response data.

The system may generate (150), based at least in part on the potential response data, first output data responsive to the first input data. For example, the system may select one or more potential responses included in the potential response data that are determined to be responsive to the user input and cause a TTS component to generate output audio data corresponding to the potential responses. Thereafter, the system may cause (155) presentation of the first output data. Further details regarding the generation of a responsive output are discussed herein below with respect to FIG. 7.

Figure 2:
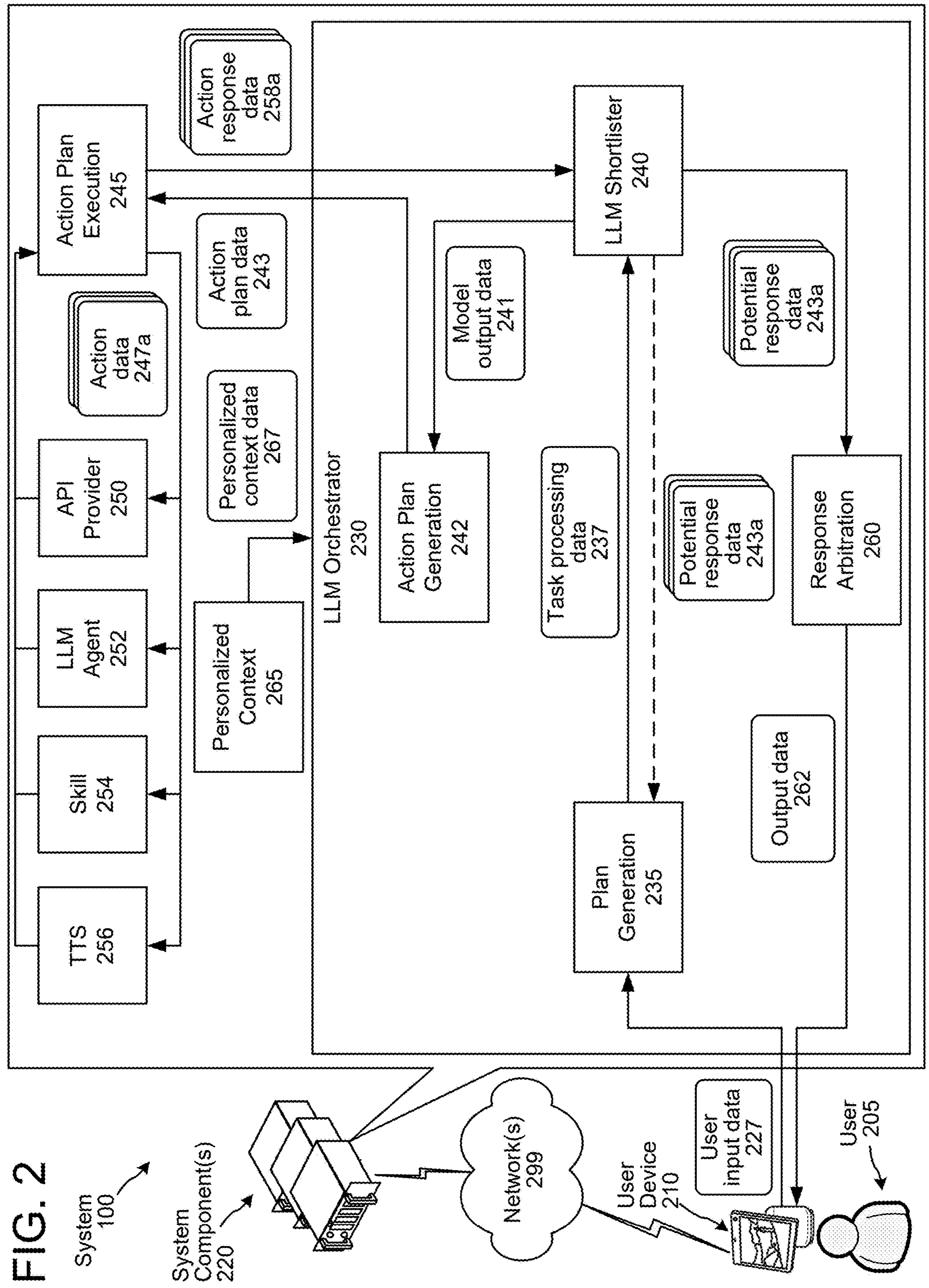
FIG. 2 is a conceptual diagram illustrating example components and processing for determining one or more components configured to perform an action associated with the task, according to embodiments of the present disclosure.

FIG. 2 illustrates a system 100 for using one or more language models to determine an action responsive to a user input. As shown in FIG. 2, the system may include a user device 210, local to a user 205, in communication with a system component(s) 220 via a network(s) 299. The network(s) 299 may include the Internet and/or any other wide- or local-area network, and may include wired, wireless, and/or cellular network hardware.

The system component(s) 220 may include various components, such as a large language model (LLM) orchestrator component 230, a personalized context component 265, an action plan execution component 245, an API provider component 250, an LLM agent component 252, a skill component 254, and a TTS component 256. The LLM orchestrator component 230 may include a plan generation component 235, an LLM shortlister component 240, and a response arbitration component 260. In some embodiments, the response arbitration component 260 may exist elsewhere in the system component(s) 220 outside of the LLM orchestrator component 230.

Language modeling (LM) is the use of various statistical and probabilistic techniques to determine the probability of a given sequence of words occurring in a sentence. Language models analyze bodies of text data to provide a basis for their word predictions. The language models are generative models. In some embodiments, the language models may be a LLM. An LLM is an advanced artificial intelligence system designed to process, understand, and generate human-like text based on massive amounts of data. In some embodiments, an LLM may be further designed to process, understand, and generate multi-modal data including audio, text, image, and/or video. An LLM model may be built using deep learning techniques, such as neural networks, and may be trained on extensive datasets that include text (or other type of data, such as multi-modal data including text, audio, image, video, etc.) from a broad range of sources, such as books and websites, for natural language processing. An LLM uses an expansive training dataset, as compared to a language model, and can include a large number of parameters (in the range of billions), hence, they are called "large" language models. In some embodiments one or more of the language models (and their corresponding operations, discussed herein below) may be the same language model.

In some embodiments where one or more of the language models are LLMs, the one or more language model may be transformer-based seq2seq models involving an encoder-decoder architecture. In an encoder-decoder architecture, the encoder may produce a representation of an input (e.g., audio, text, image, video, etc.) using a bidirectional encoding, and the decoder may use that representation to perform some task. In some such embodiments, one or more of the language models may be a multilingual (approximately) 20 billion parameter seq2seq model that is pre-trained on a combination of denoising and Causal Language Model (CLM) tasks in various languages (e.g., English, French, German, Arabic, Hindi, Italian, Japanese, Spanish, etc.), and the language model may be pre-trained for approximately 1 trillion tokens. Being trained on CLM tasks, the one or more language models may be capable of in-context learning. An example of such a LLM is Alexa Teacher Model (Alexa™).

In other embodiments, where one or more of the language models are an LLM, the one or more language models may be a decoder-only architecture. The decoder-only architecture may use left-to-right (unidirectional) encoding of the input (e.g., audio, text, image, video, etc.). An example of such a LLM is the Generative Pre-trained Transformer 3 (GPT-3) and other versions of GPT. GPT-3 has a capacity of (approximately) 175 billion machine learning parameters.

Other examples of LLMs include BigScience Large Open-science Open-access Multilingual Language Model (BLOOM), Language Model for Dialogue Applications model (LaMDA), Bard, Large Language Model Meta AI (LLaMA), Titan Foundational Model, etc.

In some embodiments, the system may include one or more machine learning model(s) other than one or more of the language models. Such machine learning model(s) may receive text and/or other types of data as inputs (e.g., audio, image, video, etc.), and may output text and/or the other types of data. Such model(s) may be neural network-based models, deep learning models, classifier models, autoregressive models, seq2seq models, etc.

In embodiments where one or more of the language models are an LLM, the input to the LLM may be in the form of a prompt. A prompt may be a natural language input, for example, an instruction, for the LLM to generate an output according to the prompt. The output generated by the LLM may be a natural language output responsive to the prompt. In some embodiments, the output may be another type of data, such as audio, image, video, etc. The prompt and the output may be text in a particular language (e.g., English, Spanish, German, etc.) and/or other types of data such as audio, image, video, etc. For example, for an example prompt "how do I cook rice?", the LLM may output a recipe (e.g., a step-by-step process represented by text, audio, image, video, etc.) to cook rice. As another example, for an example prompt "I am hungry. What restaurants in the area are open?", the LLM may output a list of restaurants near the user 205 that are open at the time.

The language models may be configured using various learning techniques. For example, in some embodiments, the language models may be configured using few-shot learning. In few-shot learning, the model learns how to learn to solve the given problem. In this approach, the model is provided with a limited number of examples (i.e., "few shots") from the new task, and the model uses this information to adapt and perform well on that task. Few-shot learning may require fewer amount of training data than implementing other fine-tuning techniques. For further example, in some embodiments, the language models may be configured using one-shot learning, which is similar to few-shot learning, except the model is provided with a single example. As another example, in some embodiments, the language models may be configured using zero-shot learning. In zero-shot learning, the model solves the given problem without examples of how to solve the specific/similar problem and just based on the model's training dataset. In this approach, the model is provided with data sampled from a class not observed during training, and the model learns to classify the data.

In some embodiments, the LLM orchestrator component 230 may generate prompt data representing a prompt for input to the language models. As shown in FIG. 2, the system component(s) 220 receive user input data 227, which may be provided to the LLM orchestrator component 230. In some instances, the user input data 227 may correspond to various data types, such as text (e.g., a text or tokenized representation of a user input), audio, image, video, etc. For example, the user input data may include input text (or tokenized) data when the user input is a typed natural language user input. For further example, prior to the LLM orchestrator component 230 receiving the user input data 227, another component (e.g., an automatic speech recognition (ASR) component 850) of the system 100 may receive audio data representing the user input. The ASR component 850 may perform ASR processing on the audio data to determine ASR data corresponding to the user input, which may correspond to a transcript of the user input. As described below, with respect to FIG. 8, the ASR component 850 may determine ASR data that includes an ASR N-best list including multiple ASR hypotheses and corresponding confidence scores representing what the user may have said. The ASR hypotheses may include text data, token data, ASR confidence score, etc. as representing the input utterance. The confidence score of each ASR hypothesis may indicate the ASR component's 850 level of confidence that the corresponding hypothesis represents what the user said. The ASR component 850 may also determine token scores corresponding to each token/word of the ASR hypothesis, where the token score indicates the ASR component's 850 level of confidence that the respective token/word was spoken by the user. The token scores may be identified as an entity score when the corresponding token relates to an entity. In some instances, the user input data 227 may include a top scoring ASR hypothesis of the ASR data. As an even further example, in some embodiments, the user input may correspond to an actuation of a physical button, data representing selection of a button displayed on a graphical user interface (GUI), image data of a gesture user input, combination of different types of user inputs (e.g., gesture and button actuation), etc. In such embodiments, the system 100 may include one or more components configured to process such user inputs to generate the text or tokenized representation of the user input (e.g., the user input data 227).

In some embodiments, the LLM orchestrator component 230 may receive input data, which may be processed in a similar manner as the user input data 227 as described herein. The input data may be received in response to detection of an event such as change in device state (e.g., front door opening, garage door opening, TV turned off, etc.), occurrence of an acoustic event (e.g., baby crying, appliance beeping, etc.), presence of a user (e.g., a user approaching the device 210, a user entering the home, etc.). In some embodiments, the system 100 may process the input data and generate a response/output. For example, the input data may be received in response to detection of a user generally or a particular user, an expiration of a timer, a time of day, detection of a change in the weather, a device state change, etc. In some embodiments, the input data may include data corresponding to the event, such as sensor data (e.g., image data, audio data, proximity sensor data, short-range wireless signal data, etc.), a description associated with the timer, the time of day, a description of the change in weather, an indication of the device state that changed, etc. The system 100 may include one or more components configured to process the input data to generate a natural language representation of the input data. The system 100 may process the input data and may perform an action. For example, in response to detecting a garage door opening, the system 100 may cause garage lights to turn on, living room lights to turn on, etc. As another example, in response to detecting an oven beeping, the system 100 may cause a device 210 (e.g., a smartphone, a smart speaker, etc.) to present an alert to the user. The LLM orchestrator component 230 may process the input data to generate tasks that may cause the foregoing example actions to be performed.

The user input data 227 may be received at the LLM orchestrator component 230 of the system component(s) 220. In particular, the user input data 227 may be received at the plan generation component 235, which may be configured to generate a list (e.g., one or more) of tasks (e.g., steps/actions) that are to be completed in order to perform an action responsive to the user input and select a task of the list of tasks that is to be completed first (e.g., in a current iteration of processing by the system 100), as described in detail herein below with respect to FIG. 3. In instances where the plan generation component 235 generates more than one task to be completed in order to perform the action responsive to the user input, the plan generation component 235 may further maintain and prioritize the list of tasks as the processing of the system 100 with respect to the user input is performed. In other words, as the system 100 processes to complete the list of tasks, the plan generation component 235 may (1) incorporate the potential responses associated with completed tasks into data provided to other components of the system 100; (2) update the list of tasks to indicate completed (or attempted, in-progress, etc.) tasks; (3) generate an updated prioritization of the tasks remaining to be completed (or tasks to be attempted again); and/or (4) determine an updated current task to be completed. In some embodiments, the plan generation component 235 may further be configured to, prior to generating the list of tasks, cause the modification of (e.g., removal, replacement, truncation, etc.) values included in the data input to the plan generation component 235 (e.g., the user input data 227, context data, potential responses, etc.) that are determined to not be useful to the processing of the LLM orchestrator component 230, as is discussed in detail herein below with respect to FIG. 4. The plan generation component 235 may generate and send task processing data 237 representing the selected task to be completed and various other information needed to perform further processing with respect to the task (e.g., the user input data 227, an indication of the selected task, potential responses associated with previous tasks, the remaining task(s), and context data associated with the user input data 227, as described in detail herein below with respect to FIG. 3) to the LLM shortlister component 240.

The LLM shortlister component 240 may be configured to determine one or more components (e.g., APIs, skill component(s) 254, LLM agent component(s) 252, TTS component 256, etc.) configured to perform an action related to the user input or the current task. The LLM shortlister component 240 may further be configured to generate and cause the execution of a request(s) (e.g., an API call(s), an incomplete API call/API call format, an indication of an action to be performed by a component, etc.) for the one or more components to provide a potential responses(s) to the user input or current task (e.g., a response to a user-provided question, a paragraph from a website, etc.), which may further include a potential action (e.g., a description of a potential action, such as turning on a light, booking a flight ticket, ordering a pizza, etc.) the components are configured to/will perform with respect to the user input or the current task). Such requests may be represented in the model output data 241 sent to the action plan generation component 242.

The action plan generation component 242 may identify the request(s) in the model output data 241 and may send action plan data 243 representing the identified request(s) to the action plan execution component 245. In embodiments where the plan generation component 235 is configured to generate the abovementioned modified values and the requests in model output data 241 include one or more of the modified values, the action plan generation component 242 may be configured to revert the modified values to their original value and may generate the action plan data 243 to include the requests including the original values, as is discussed in more detail herein below with respect to FIG. 6.

The action plan execution component 245 may identify the request(s) in the action plan data 243, generate executable API calls corresponding to the request(s), and cause the corresponding components (e.g., the API provider component 250, the LLM agent component 252, the skill component 254, and/or the TTS component 256) to generate action response data 258*a-n* representing the requested potential response(s), where individual action response data 258*a* may be provided by/correspond to a particular responding component—one of the API provider component 250, the LLM agent component 252, the skill component 254, and/or the TTS component 256. The action response data 258*a-n* may include various data types including audio, text, image, video, etc. In some embodiments, the action response data 258*a-n* may include a component identifier (e.g., a component name, an alphanumerical value associated with the component, etc.) for the component providing the data. In some embodiments, similar to the plan generation component 235, the action plan execution component 245 may be configured to cause the modification of one or more values included in the action response data 258*a-n* that are determined to not be useful to the downstream processing of the LLM orchestrator component 230.

The LLM shortlister component 240 receives and processes the action response data 258*a-n* and generates potential response data 243*a-n* representing the potential response(s) (e.g., relevant potential responses, selected potential responses, ranked potential responses, etc.) for further processing (e.g., as described in detail herein below with respect to FIG. 5). If the LLM shortlister component 240 determines that there are no remaining tasks to generate potential responses for, the LLM shortlister component 240 may send the potential response data 243*a-n* to the response arbitration component 260. The potential response data 243*a-n*, in some embodiments, may be determined based on receiving potential responses from various different components that may be relevant in responding to the user input data 227. For example, the potential response data 243*a-n* may include a first potential response from a first component configured to perform a first task determined by the plan generation component 235, a second potential response from a second component configured to perform a second task determined by the plan generation component 235, etc. The potential response data 243*a-n* can include more than one potential response relating to an individual task. In some embodiments, the potential response data 243*a-n* may be natural language data. In other embodiments, the potential response data 243*a-n* may be multi-modal data such as audio, image, text, video, etc.

The response arbitration component 260 processes the potential response data 243*a-n* to determine whether the potential responses generated for the one or more tasks are responsive to the user input. In some embodiments, similar to the plan generation component 235, the response arbitration component 260 may cause the modification of one or more values included in the potential response data 243*a-n* that are determined to not be useful to the processing of the LLM orchestrator component 230. The response arbitration component 260 processes the potential response data 243*a-n* (representing at least the generated potential responses, optionally including the modified values) and selects one or more of the potential responses that are determined to be responsive to the user input and/or determines that none of the actions are responsive to the user input. For example, the response arbitration component 260 may process the potential response data 243*a-n* to determine if one or more of the potential responses performable by the API(s) (e.g., the potential responses and/or potential actions) are responsive to the current task. In some embodiments, the response arbitration component 260 may generate a natural language summary of one or more of the selected responses and output the natural language summary to the user 205. In some embodiments, the response arbitration component 260 may further output other types of data to the user such as audio, image, video, etc. which may be included in/associated with the selected responses.

If the response arbitration component 260 determines that none of the potential responses are responsive to the user input, then the response arbitration component 260 may send an instruction to the personalized context component 265 to generate additional information (e.g., personalized context data 267) for the user input. Additionally, or alternatively, the response arbitration component 260 may generate a natural language question to be output to the user 205 requesting the additional information. In some embodiments, the response arbitration component 260 may further output other types of data to the user such as audio, image, video, etc. which may be included in/associated with the selected responses. In such instances, the system 100 (e.g., the plan generation component 235, the LLM shortlister component 240, and/or the response arbitration component 260) may process as described herein with further respect to the additional information (e.g., the personalized context data 267 and/or the user-provided additional information) to perform the action responsive to the user input.

Figure 3:
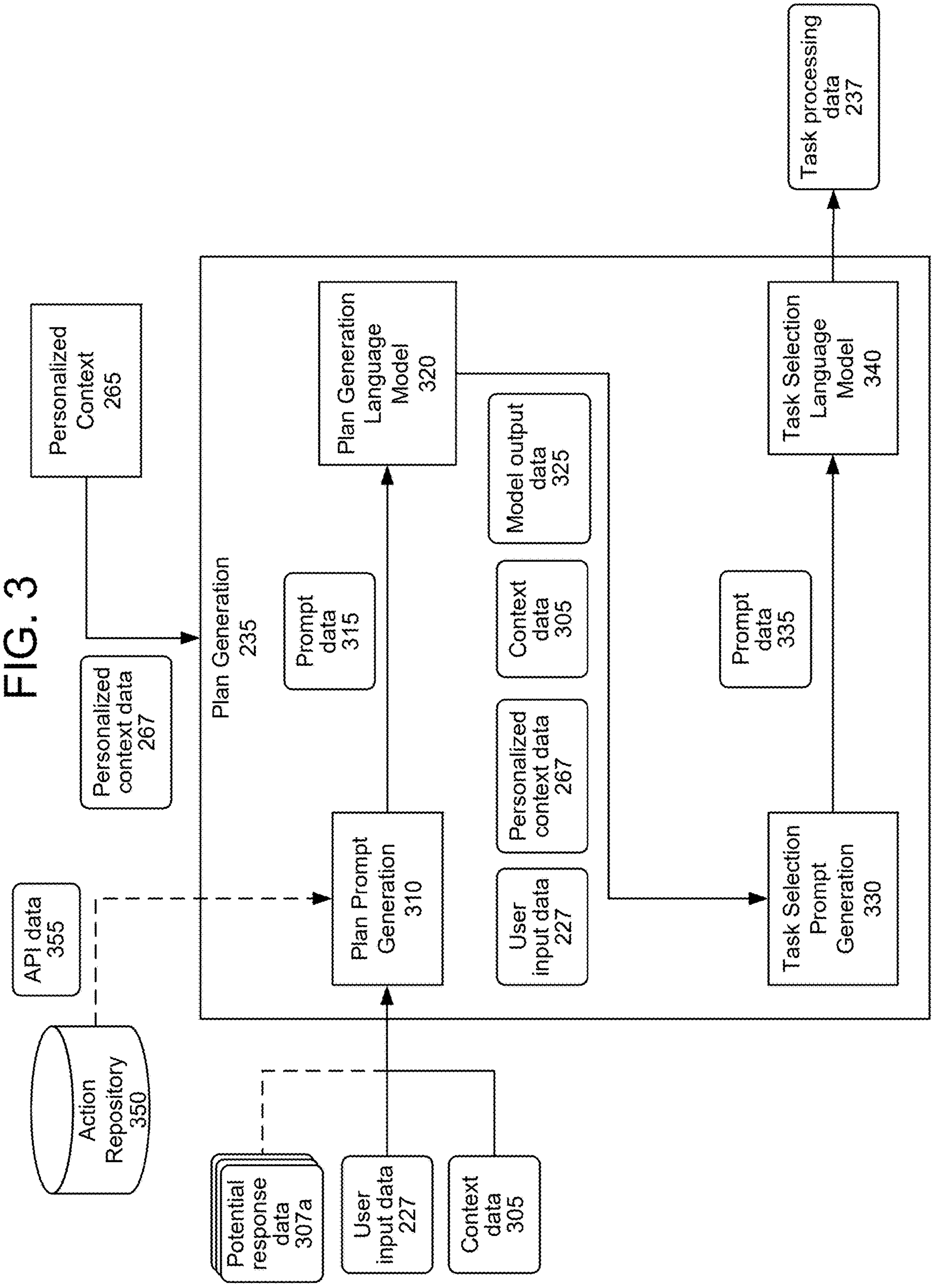
FIG. 3 is a conceptual diagram illustrating example components and processing of a plan generation component, according to embodiments of the present disclosure.

FIG. 3 illustrates example processing of the plan generation component 235. As shown in FIG. 3, the plan generation component 235 may include a plan prompt generation component 310, a plan generation language model 320, a task selection prompt generation component 330, and a task selection language model 340.

As further shown in FIG. 3, the user input data 227 is received at the plan prompt generation component 310. The plan prompt generation component 310 processes the user input data 227 to generate prompt data 315 representing a prompt for input to the plan generation language model 320. The plan prompt generation component 310 may further receive context data 305 representing various contextual signals associated with the user input data 227, such as weather information, time of day, device information associated with the device that sent the user input data 227 (e.g., device ID, device states, historical device interaction data, etc.). The prompt data 315 may be generated based on combining the user input data 227 and the context data 305.

In some embodiments, the prompt data 315 may be generated further based on personalized context data 267 representing one or more contextual signals associated with a user that provided the user input, such as information associated with a user profile of the user (e.g., user ID, user behavioral information, user preferences, age, gender, historical user interaction data, devices associated with the user profile, etc.), which may be determined using, for example, a user recognition component 895. In some embodiments, an indication of the user and/or user profile may be included in the user input data 227 (e.g., as included in the output of the ASR component 850.). In some embodiments, the personalized context data 267 may include dialog history data representing one or more user inputs and corresponding system-generated responses for a current interaction between the user and the system 100.

As used herein, a "dialog" may refer to multiple related user inputs and system 100 outputs (e.g., through user device(s) 210) between the system and the user that may have originated with a single user input initiating the dialog. Thus, the data associated with a dialog may be associated with a same dialog identifier, which may be used by components of the overall system 100 to associate information across the dialog. Subsequent user inputs of the same dialog may or may not start with the user speaking a wakeword. Each natural language input may be associated with a different natural language input identifier, and each natural language input identifier may be associated with a corresponding dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The plan prompt generation component 310 may receive the personalized context data 267 from a personalized context component 265. The personalized context component 265 may be configured to determine and return contextual information associated with a user input to the plan prompt generation component 310, which the plan prompt generation component 310 may combine with the user input data 227 to generate the prompt data 315. In some embodiments, the personalized context component 265 may query various components and/or storages (e.g., the profile storage 470) for the contextual information. In some embodiments, the personalized context component 265 may include a storage including one or more portions of the contextual information. In other embodiments, the personalized context component 265 may be/implement an LLM. In such embodiments, the personalized context component 265 may be finetuned on personalized information for one or more users, as is discussed in more detail herein below. Further, in such embodiments, the personalized context component 265 (or the system 100) may include a personalized context prompt generation component (not illustrated), which may be configured to generate a prompt including the user input data 227 (or a representation of an intent of the user input) to be input to the LLM. The prompt may be an instruction for the LLM to determine one or more portions of context data (e.g., the personalized context data 267) associated with the prompt.

The personalized context component 265 may be caused to generate and return the personalized context data 267 based on the system 100 determining that clarifying information is needed in order to complete a task associated with a user input. For example, one or more of the components of the system 100 (e.g., the plan generation language model 320, the task selection language model 340, the shortlister language model 540, the response arbitration component 260) may determine that an ambiguity exists in the user input (or the data determined/generated as a result of processing with respect to the user input). In such examples, the personalized context component 265 may receive the user input, the current task, and/or model output data indicating that an ambiguity exists/clarifying information should be determined (e.g., model output data representing "Does the user prefer to use [Music Streaming Service 1] or [Music Streaming Service 2] for playing music," "I need to determine whether the user prefers [Music Streaming Service 1] or [Music Streaming Service 2] for playing music" or the like). The personalized context component 265 may process as described herein above to generate the personalized context data 267 (e.g., "The user prefers [Music Streaming Service 1].")

In some embodiments, the plan prompt generation component 310 may further receive potential response data 307*a-n*. For example, if the current iteration of processing with respect to the user input data 227 is a subsequent iteration of processing (e.g., the system previously determined that more than one task is to be completed in order to perform an action responsive to the user input data 227 and has previously caused one or more components to generate potential responses associated with at least a first task of the more than one tasks), then the plan prompt generation component 310 may further receive the potential response data 307*a-n*. The potential response data 307*a-n* may include one or more potential responses generated by one or more components during the previous iteration(s) of processing, an indication of the remaining tasks to be completed, and/or an indication of the completed task(s). In such embodiments, the prompt data 315 may be generated by further combining at least a portion of the potential response data 307*a-n*.

In some embodiments, the plan prompt generation component 310 may be configured to modify (e.g., remove, truncate, replace, etc.) at least a portion(s) of the potential response data 307*a-n*. For example, the plan prompt generation component 310 may modify the potential response data 307*a-n* based on determining the potential response data 307*a-n* includes information whose particular value is not useful to the processing of the LLM orchestrator component 230, includes information whose particular value may result in a degradation of the accuracy of the LLM orchestrator component 230, and/or includes information whose value should otherwise not be provided to downstream components of the LLM orchestrator component 230. In some embodiments, such a particular value may be identified based on determining the purpose of the value is to (uniquely) identify other data. For example, the LLM orchestrator component 230 may need to be able to identify/refer to particular information (e.g., a user ID, a device ID, a geolocation, an utterance ID, Uniform Reference Label (URL), item ID (e.g., product ID, such as an Amazon Standard Identification Number (ASIN), song ID, etc.), or any other globally unique identifier), for further processing, but may not need the exact value corresponding to the information, as long as the value is usable to identify the particular information (e.g., as long as the value is unique). Therefore, for example, for a device ID of "system.endpoint.5de6cqfd-3705-4932-9f28-c74eb00p6db1," the plan prompt generation component 310 may determine that the particular value of the device ID ("system.endpoint.5de6cqfd-3705-4932-9f28-c74eb00p6db1") is not beneficial to the processing of the LLM orchestrator component 230, may result in a degradation of the accuracy of the LLM orchestrator component 230, and/or should otherwise not be provided to downstream components of the LLM orchestrator component 230, but, instead, the information is usable to identify the particular information (e.g., identify the particular device). As such, the plan prompt generation component 310 may modify (e.g., remove, truncate, replace, etc.) the device ID to a uniquely identifiable value of "device ID 1," or the like.

Figure 4:
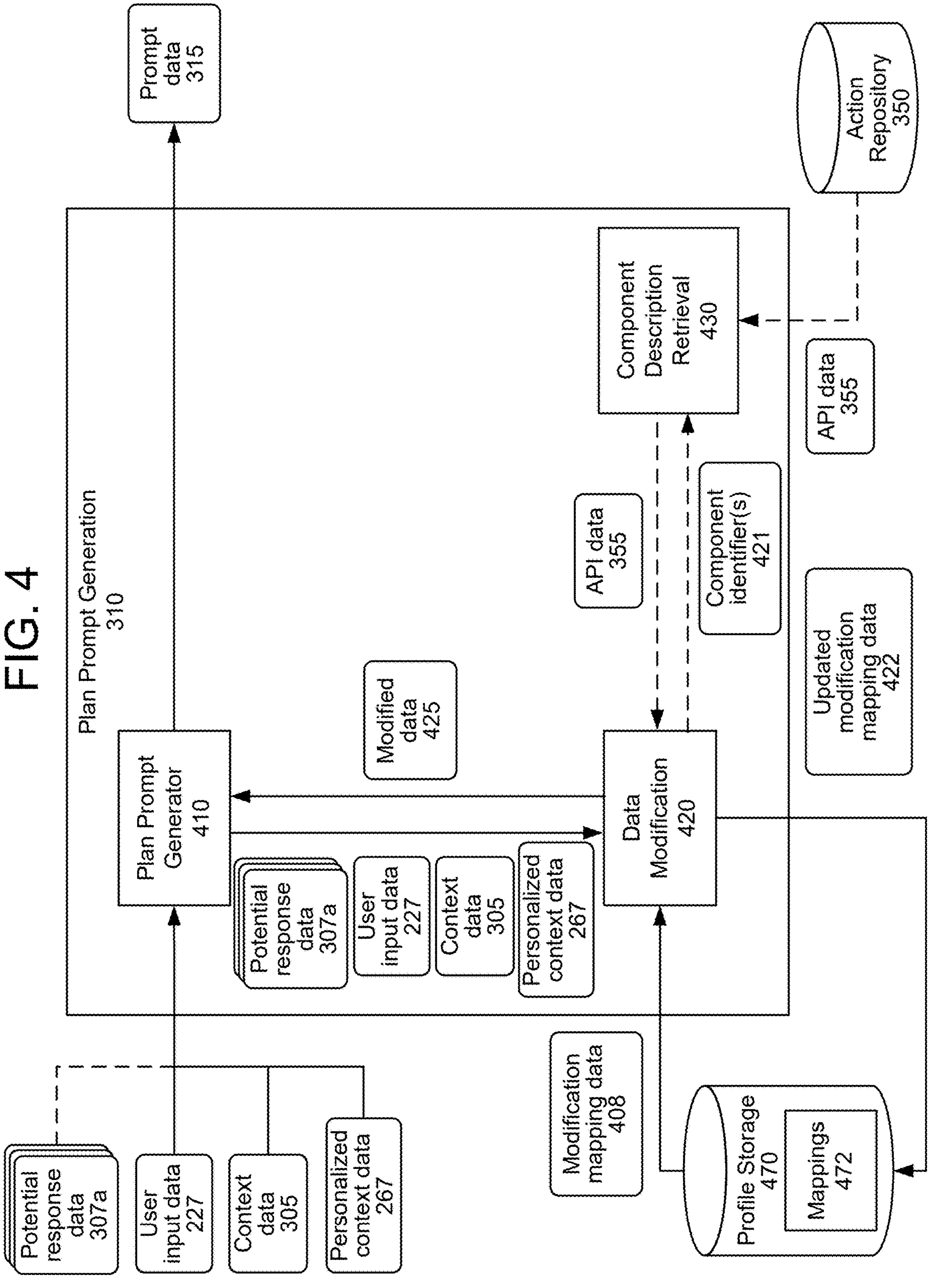
FIG. 4 is a conceptual diagram illustrating example components and processing of a plan prompt generation component, according to embodiments of the present disclosure.

FIG. 4 illustrates example processing and components of the plan prompt generation component 310. As shown in FIG. 4, the plan prompt generation component 310 may include a plan prompt generator component 410, a data modification component 420, and a component description retrieval component 430. In some embodiments, the data modification component 420 and the component description retrieval component 430 may be included in another component of the system 100, outside of the plan prompt generation component 310.

As further shown in FIG. 4, the user input data 227, the context data 305, the personalized context data 267, and/or the potential response data 307*a-n* may be received at the plan prompt generator component 410, which may be configured to generate the prompt data 315. Prior to generating the prompt data 315 and in embodiments where the plan prompt generation component 310 receives the potential response data 307*a-n*, the plan prompt generator component 410 may send the user input data 227, the context data 305, the personalized context data 267, and/or the potential response data 307*a-n* to the data modification component 420, which may be configured to determine whether one or more of the user input data 227, the context data 305, the personalized context data 267, and/or the potential response data 307*a-n* includes a value(s) to be modified.

In some embodiments, the data modification component 420 may determine to modify a value(s) included in the user input data 227, the context data 305, the personalized context data 267, and/or the potential response data 307*a-n* based on API data 355. The API data 355 may include information (e.g., at least a portion of a component description) associated with the one or more components that generated the user input data 227, the context data 305, the personalized context data 267, and/or the potential response data 307*a*. The API data 355 may further indicate information associated with output generated by the component that is to be modified by the data modification component 420. For example, the API data 355*a* may indicate that potential response data generated by a component associated with API data 355*a* may include a device ID(s), which are to be modified by the data modification component 420. In some embodiments, the API data 355 may further indicate a format to be used when altering the information. For example, for the example API data 355*a*, the API data 355*a* may further indicate that the device ID(s) are to be modified along a format of "device ID [whole number]," indicating that a first modified device ID should correspond to "device ID 1" and an nth modified device ID should correspond to "device ID n."

The data modification component 420 may receive the API data 355 from a component description retrieval component 430, which may retrieve the API data 355 from an action repository 350. The action repository 350 may store various component description(s) for a component(s) in association with one or more component identifiers corresponding to the component(s). In some embodiments, the user input data 227, the context data 305, the personalized context data 267, and/or the potential response data 307*a-n* may include component identifier(s) 421 representing an indication(s) of the component(s) which generated the user input data 227, the context data 305, the personalized context data 267, and/or the potential response data 307*a-n*. The data modification component 420 may identify and send the component identifier(s) 421 to the component description retrieval component 430. The component description retrieval component 430 may query the action repository for API data 355 corresponding to the user input data 227, the context data 305, the personalized context data 267, and/or the potential response data 307*a-n* (e.g., at least a portion of a component description associated with the component(s) that generated the user input data 227, the context data 305, the personalized context data 267, and/or the potential response data 307*a-n*). In some embodiments, the API data 355 may be included in the user input data 227, the context data 305, the personalized context data 267, and/or the potential response data 307*a-n*, in which the data modification component 420 may not cause the component description retrieval component 430 to retrieve and send the API data 355.

Thereafter, the data modification component 420 may process the API data 355 and the user input data 227, the context data 305, the personalized context data 267, and/or the potential response data 307*a-n* to determine whether the user input data 227, the context data 305, the personalized context data 267, and/or the potential response data 307*a-n* is to be modified. In some embodiments, the data modification component 420 may modify the user input data 227, the context data 305, the personalized context data 267, and/or the potential response data 307*a-n* based on determining that a value included in the user input data 227, the context data 305, the personalized context data 267, and/or the potential response data 307*a-n* is associated with an identifier type that corresponds to (e.g., matches, is semantically similar to, etc.) one or more of the identifier types included in the API data 355. For example, the data modification component 420 may determine to modify a value associated with an identifier type of "user ID" included in potential response data 307*a* from a first component based on API data 355*a* associated with the first component indicating that a value included in potential response data associated with the identifier type of "user ID" is to be modified. As such, the data modification component 420 may generate modified data 425 corresponding to the potential response data 307*a*, except with the value(s) associated with the identifier type of "user ID" replaced with modified value(s) (e.g., "user ID 1"). The data modification component 420 may send the modified data 425 to the plan prompt generator component 410.

In instances where the data modification component 420 determines, based on the API data 355, that there are no values to be modified in the user input data 227, the context data 305, the personalized context data 267, and/or the potential response data 307*a-n*, then the data modification component 420 may send modified data 425 indicating as much to the plan prompt generator component 410 (e.g., "no values to be modified," "NULL," etc.) In such instances, the plan prompt generator component 410 may generate the prompt data 315 using the user input data 227, the context data 305, the personalized context data 267, and/or the potential response data 307*a-n*. In other embodiments, the data modification component 420 may send modified data 425 corresponding to the user input data 227, the context data 305, the personalized context data 267, and/or the potential response data 307*a-n*.

The data modification component 420 may generate the modified data 425 (e.g., corresponding to the user input data 227, the context data 305, the personalized context data 267, and/or the potential response data 307*a-n* including the modified value(s)) using modification mapping data 408. The modification mapping data 408 may include mappings between one or more values previously determined to require modification by the data modification component 420 and one or more corresponding modified values. In some embodiments, the modification mapping data 408 may store the mappings in association with an identifier type associated with the one or more values. For example, the modification mapping data 408 may include "device ID: {[device ID]: "device ID 1"; [device ID]: "device ID 2"; [device ID]: "device ID 3"}," where "device ID" indicates the type of identifier associated with the information (e.g., in this case indicating that the following mappings are for device IDs) and "[device ID]: "device ID 1" indicates the original device ID value and the corresponding modified device ID value, respectively. For further example, the modification mapping data 408 may further include "User ID: [user ID]: "user ID 1"; [user ID]: "user ID 2"}," where "user ID" indicates the type of identifier associated with the information (e.g., in this case indicating that the following mappings are for user IDs) and "[user ID]: "user ID 1" indicates the original user ID value and the corresponding modified user ID value, respectively. The data modification component 420 may receive the modification mapping data 408 from the LLM orchestrator component 230. As shown in FIG. 4, the data modification component 420 may receive the modification mapping data 408 from the profile storage 470, which may be stored in a mappings location 472, which may be part of a user profile associated with a user 205 associated with the user input data 227.

The data modification component 420 may use the modification mapping data 408 to generate the modified data 425. The data modification component 420 processes the user input data 227, the context data 305, the personalized context data 267, and/or the potential response data 307*a-n* and the API data 355 to determine whether one or more values included in the user input data 227, the context data 305, the personalized context data 267, and/or the potential response data 307*a-n* are to be modified (e.g., whether the user input data 227, the context data 305, the personalized context data 267, and/or the potential response data 307*a-n* includes a value associated with an identifier type that corresponds to an identifier type that is associated with a value to be modified in the API data 355). If the data modification component 420 determines a value included in the user input data 227, the context data 305, the personalized context data 267, and/or the potential response data 307*a-n* is to be modified, the data modification component 420 may parse the modification mapping data 408 for a corresponding identifier type (e.g., an identifier type corresponding to (e.g., matching, semantically similar to, etc.) the identifier type associated with the value to be modified in the potential response data 307*a-n*). For example, if the data modification component 420 determines a value of "GHI789" included in the potential response data 307*a-n* is to be modified (e.g., based on the value being associated with the identifier type of "user ID" and the API data 355 indicating that values associated with "user ID" are to be modified), then the data modification component 420 may parse the modification mapping data 408 for an identifier type of/similar to "user ID." If the data modification component 420 identifies a corresponding identifier type in the modification mapping data 408, the data modification component 420 may determine the last modified value associated with the corresponding identifier type. For example, if the data modification component 420 determines a corresponding identifier type of "user ID" that is associated with the mappings of "ABC123: "user ID 1"" and "DEF456: "user ID 2"," then the data modification component 420 may determine the modified value of "user ID 2" as the last modified value. The data modification component 420 may generate updated modification mapping data 422 corresponding to the modification mapping data 408 and further including a mapping associated with the corresponding identifier type of "user ID" of "GHI789: "user ID 3"." In other words, the data modification component 420 may determine a modified value for the value to be modified that corresponds to the last modified value associated with the corresponding identifier type incremented by a value of 1.

In some embodiments, the modified value may be generated to be a value that may be meaningful to the processing of the LLM orchestrator component 230. In such embodiments, the modified value may correspond to a value that is descriptive of the original value, without using the original value (e.g., replacing a device ID of "ABC123" with "kitchen device 1"). In some embodiments, the modified value may be generated using a profile/information (e.g., a natural language description, a name, etc.) associated with the original value. For example, if the data modification component 420 determines a "device ID" value of "XYZ234" included in the user input data 227, the context data 305, the personalized context data 267, and/or the potential response data 307*a-n* is to be modified, then the data modification component 420 may replace the value with a modified value of "Living room device 1," based on determining a device profile associated with the device ID of "XYZ234" is associated with a name of "Living room device" (e.g., a device group name, a device name, an indicator, a natural language description, etc.). The data modification component 420 may generate the updated modification mapping data 422 corresponding to the modification mapping data 408 and further including a mapping associated with the corresponding identifier of "device ID" of "XYZ234: "living room device 1"." For further example, if the data modification component 420 determines a "user ID" value of "TUV567" included in the user input data 227, the context data 305, the personalized context data 267, and/or the potential response data 307*a-n* is to be modified, then the data modification component 420 may replace the value with a modified value of "child profile 1," based on determining a user profile associated with the user ID of "TUV567" indicates the corresponding user is a child. The data modification component 420 may generate the updated modification mapping data 422 corresponding to the modification mapping data 408 and further including a mapping associated with the corresponding identifier of "user ID" of "TUV567: "child profile 1"." As another example, if the data modification component 420 determines a "geographic location" value of "42° 21' 40.1220" N and 71° 3' 25.4988" W" included in the user input data 227, the context data 305, the personalized context data 267, and/or the potential response data 307*a-n* is to be modified, then the data modification component 420 may replace the value with a modified value of "Boston, MA," or "Boston" based on determining the closest city/state to the geographic location.

In embodiments where the data modification component 420 is configured to generate the descriptive modified values, the data modification component 420 may employ various techniques to generate the modified values, such as text parsing techniques, NLP techniques, NER techniques, etc. In such embodiments, the data modification component 420 may be configured to avoid generating modified values that include certain words/information, such as a user's name.

In some embodiments, as discussed herein above, generating modified values that are descriptive of the value to be modified may increase the accuracy of one or more downstream language models (e.g., the plan generation language model 320, the task selection language model 340, the shortlister language model 540, the response language model 720, etc.) because the descriptive modified values may include information meaningful to the processing of the one or more downstream language models. For example, with respect to the first example modified value of "living room device 1," although the initial device ID was determined to not be useful to the processing of the downstream language models, the modified value may prove to be meaningful, not only because it is smaller in dimensions, but because it also informs the downstream models that the modified value corresponds to a living room device, which may be meaningful to the processing of the downstream language models. Similarly, with respect to the second example modified value of "child profile 1," the modified value informs the downstream models that the modified value corresponds to a child's profile, which may be meaningful to the processing of the downstream language models.

If the data modification component 420 does not identify a corresponding identifier type in the modification mapping data 408, the data modification component 420 may generate updated modification mapping data 422 corresponding to the modification mapping data 408 and further including the identifier type associated with the value to be modified and a mapping from the value to be modified to a modified value. In some embodiments, the modified value may correspond to the identifier type associated with the value to be modified concatenated with a number (e.g., 1). For example, if the data modification component 420 determines a value of "ABC123" is to be modified, which is associated with an identifier type of "user ID", and determines that a corresponding identifier type is not included in the modification mapping data 408, then the data modification component 420 may generate updated modification mapping data 422 corresponding to the modification mapping data 408 and further including "device ID: {"ABC123": "device ID 1"}," indicating that the device ID value of "ABC123" has been modified to "device ID 1."

The data modification component 420 may send the updated modification mapping data 422 to the profile storage 470 to be stored in association with a profile of the user 205 that provided the current user input. The data modification component 420 may further send the modified data 425 corresponding to the potential response data 307*a-n* including the modified values to the plan prompt generator component 410. In some embodiments, after a response to the user input has been presented to the user 205 (and/or an action responsive to the user input has been performed), and/or a dialog between the user 205 and the system 100 has ended, the system 100 may cause the modification mapping data 408/the updated modification mapping data 422 to be deleted.

In some embodiments, the data modification component 420 may query for/have access to a list of identifier types known to the system to be associated with values that are to be modified prior to being processed by one or more downstream components, where, unlike the API data 355, the list of identifier types may not be associated with a specific component. In such embodiments, the data modification component 420 may compare one or more identifier types included in the user input data 227, the personalized context data 267, the context data 305, and/or the potential response data 307*a-n* to the list of identifier types to determine whether the value(s) corresponding to the one or more identifier types are to be modified.

The plan prompt generator component 410 may process the modified data 425, the user input data 227, the personalized context data 267, and/or the context data 305 to generate the prompt data 315.

In embodiments where the data modification component 420 and the component description retrieval component 430 are included in another component of the system 100, outside of the plan prompt generation component 310, the plan prompt generation component 310 may send the user input data 227, the potential response data 307*a-n*, the context data 305, and/or the personalized context data 267 to the component, which may process as described above to generate the modified data 425, which may be sent back to the plan prompt generation component 310 to generate the prompt data 315.

In some embodiments, plan prompt generation component 310 (or another component of the system 100) may process the context data 305, the personalized context data 267, the user input data 227, and/or the modified data 425 to generate a natural language representation of the user input (represented by the user input data 227) that is updated to include the contextual information of the personalized context data 267 (e.g., a contextual rewrite of the user input). Thereafter, the plan prompt generation component 310 may process to generate the prompt data 315 using at least the updated user input data.

With reference once more to FIG. 3, in some embodiments, the prompt data 315 may be an instruction for the plan generation language model 320 to determine one or more tasks (e.g., steps/actions) that are to be completed in order to perform an action responsive to the user input given the other information (e.g., the personalized context data 267, the indication of the remaining task(s), the indication of the completed task(s), and/or the corresponding response(s)) included in the prompt data 315.

In some embodiments, the plan prompt generation component 310 may also include in the prompt data 315 a sample processing format to be used by the plan generation language model 320 when processing the prompt. In some embodiments, the plan prompt generation component 310 may generate the prompt data 315 according to a template format. For example, the prompt data 315 may adhere to a template format of:

{
Create a new task if necessary to help complete a request to [user input data 227 (or a representation of a determined intent of the user input data 227].
Here are the completed tasks, their results, user inputs, and context so far:
[completed tasks, modified data 425, dialog history, context data 305, personalized context data 267]
These are the remaining tasks to be completed:
[remaining task data]
Based on the result, create new tasks to be completed, if necessary.
Return the tasks as an array.
}

In some embodiments, the template format may instruct the plan generation language model 320 as to how it should process to generate the one or more tasks (e.g., steps) that are to be completed in order to perform the action responsive to the user input. In some embodiments, the format may further include an indication, such as a label of "User:" indicating the following string of characters/tokens as the user input. In some embodiments, the format may further include a label of "Thought:" instructing the plan generation language model 320 to generate an output representing the determined interpretation of the user input by the plan generation language model 320 and/or an action that should be taken (e.g., the user is requesting [intent of the user input], the user is trying to [intent of the user input], need to determine

[information needed to properly process the user input] etc.) In some embodiments, the format may further include an indication of "Observation:" indicating the following string of characters/tokens as the result of performance of an action determined by the plan generation language model 320/the plan generation language model 320's interpretation of the result of the performance of the action determined by the plan generation language model 320 (e.g., the completed tasks and/or their results). In some embodiments, the format may further include an indication of "Response:" instructing the plan generation language model 320 to generate a response (e.g., one or more tasks to be completed to perform an action responsive to the user input) to the prompt.

Following such a template format, for example, and for a user input of "turn on all of the lights except the garage," the plan prompt generation component 310 may generate example prompt data 315*a:*

{
Create a new task if necessary to help complete a request to turn on all of the lights except the garage.
Here are the completed tasks, their results, user inputs, and context so far:
Context:
Device IDs:
device ID 1
device ID 2
These are the remaining tasks to be completed:
[ ]
Based on the result, create new tasks to be completed, if necessary.
Return the tasks as an array.
}

As an example of a user input that is associated with more than one task, the system 100 may receive a user input of "please order some pizza for dinner" and may determine a task list of "identify user pizza preference" and "find application that enables ordering of pizza." Thereafter, the system 100 may process as described herein below to select and complete the task of "identify user pizza preference." The plan prompt generation component 310 may process the user input, corresponding context data, the remaining task list, and the modified data 425 (e.g., results of processing performed with respect to previous tasks (e.g., the users pizza preference, determined, for example, by the personalized context component 265) to generate example prompt data 315*a:*

{
Create a new task if necessary to help complete a request to order some pizza for dinner.
Here are the completed tasks, their results, user inputs, and context so far:
Completed tasks:
Identify user pizza preference: user ordered Brooklyn style pizza from [Company name]
Context:
User ID: user ID 1
These are the remaining tasks to be completed:
Find application to order pizza
Based on the result, create new tasks to be completed, if necessary.
Return the tasks as an array.
}

In some embodiments, the plan prompt generation component 310 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data 315 may include "Please generate a polite, respectful, and safe response and one that does not violate protected class policy."

The plan generation language model 320 processes the prompt data 315 to generate model output data 325 representing one or more predicted tasks to be completed in order to perform the action responsive to the user input. For example, based on processing the first example prompt data provided above, the plan generation language model 320 may output model output data: {"turn on device: device ID 1; device ID 2,"} or the like. For further example, as discussed above, based on processing prompt data corresponding to the user input "please order some pizza for dinner" the plan generation language model 320 may output model output data: {"identify user pizza preference;" "find application that enables ordering of pizza," or the like. After the first task of "identify user pizza preference" is complete, and based on processing the second example prompt data provided above, the plan generation language model 320 may further output model output data: {"find an application to order pizza" "find API to order [Company name] pizza,"} or the like. In some embodiments, the threshold for determining the one or more tasks may be such that the plan generation language model 320 is encouraged to generate multiple predicted tasks for a given user input, where the system 100 may parse and filter the list of tasks during downstream processing (e.g., during the processing of the task selection language model 340). For example, based on processing the first example prompt data provided above, the plan generation language model 320 may further output model output data: {"turn on all of the lights except the garage light," "turn on all lights," "identify which garage light," "turn on all lights then turn off garage light," "turn on all lights where user is located," "turn on kitchen lights, living room lights, dining room lights, hallways lights" "turn on all lights on first floor,"} or the like.

The model output data 325 is sent to the task selection prompt generation component 330, which processes the model output data 325 to generate prompt data 335 representing a prompt for input to the task selection language model 340. In some embodiments, such prompt data 335 may be generated based on combining the user input data 227, the context data 305, the personalized context data 267, the prompt data 315, and/or the model output data 325. In some embodiments, the plan generation component 235 may include another component that parses the model output data 325 to determine the one or more tasks and may send a representation of the one or more tasks to the task selection prompt generation component 330.

In some embodiments, the prompt data 335 may be an instruction for the task selection language model 340 to select a task of the one or more tasks that is to be completed first (e.g., completed during the current iteration of processing) given the information (e.g., user input data 227, the personalized context data 267, and the one or more tasks) included in the prompt data 335. In some embodiments, the prompt data 335 may further include an instruction for the task selection language model 340 to determine a priority of the one or more tasks (e.g., an ordered list representing the order in which the one or more tasks are to be completed). As discussed above, with respect to the plan prompt generation component 310, in some embodiments, the task selection prompt generation component 330 may also include in the prompt data 335 a sample processing format to be used by the task selection language model 340 when processing the prompt. Similarly, in some embodiments, the task selection prompt generation component 330 may generate the prompt data 335 according to a template format, such as:

{
Select the top prioritized task given the ultimate goal of [user input data 227 (or a representation of a determined intent included in the user input data 227]
Here are the completed tasks, their results, and user inputs so far:
[completed tasks, modified data 425, dialog history, context data 305, personalized context data 267]
Here are the task candidates:
[remaining tasks]
Return your selected task, return None if the goal is achieved or indicate existing ambiguities.
}

In some embodiments, the template format may instruct the task selection language model 340 as to how it should process to select the task and/or prioritize the one or more tasks. In some embodiments, as discussed above, the format may further include indications of the "User:", "Thought:", "Action:", "Observation:", and/or "Response:" indicators.

Following such a template format, for example, and for the first example user input provided above of "turn on all of the lights except the garage," the task selection prompt generation component 330 may generate example prompt data 335*a:*

{
Select the top prioritized task given the ultimate goal of turn on all of the lights except the garage
Here are the completed tasks, their results, user inputs, and context so far:
Context:
Device IDs:
device ID 1
device ID 2
Here are the task candidates:
Turn on device: device ID 1; device ID 2
Return your selected task, return None if the goal is achieved or indicate existing ambiguities.
}

For further example, for the second example user input provided above of "please order some pizza for dinner," the task selection prompt generation component 330 may generate example prompt data 335*a:*

{
Select the top prioritized task given the ultimate goal of please order some pizza for dinner
Here are the completed tasks, their results, user inputs and context so far:
Completed tasks:
Identify user pizza preference: user ordered Brooklyn style pizza from [Company name]
Context:
User ID: user ID 1
Here are the task candidates:
find an application that sells pizza
find API that sells [Company name] pizza
Return your selected task, return None if the goal is achieved or indicate existing ambiguities.
}

In some embodiments, the task selection prompt generation component 330 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data may include "Please generate a polite, respectful, and safe response and one that does not violate protected class policy."

The task selection language model 340 processes the prompt data 335 to generate model output data representing the task to be completed first and/or a prioritization of the one or more tasks. For example, based on processing the first example prompt data provided above, the task selection language model 340 may output model output data: {"1. Turn on device: device ID 1; device ID 2,"} or the like. For further example, based on processing the second example prompt data provided above, the task selection language model 340 may output model output data: {"1. Find an API that sells [Company name] pizza,"} or the like. In some embodiments, during processing of the task selection language model 340 to select and/or prioritize the one or more tasks, the task selection language model 340 may update the task list to remove any redundant and/or conflicting tasks. For example, for the second example prompt data, the task selection language model 340 may determine that the remaining tasks of "find an application that sells pizza" and "find an API that sells [Company name] pizza" are redundant, and that "find an API that sells [Company name] pizza has a higher priority. Therefore, the task selection language model 340 may remove the task of "find an application that sells pizza" from the remaining task list. Thereafter, the plan generation component 235 (or another component of the plan generation component 235) may process the model output data of the task selection language model 340 to determine task processing data 237 representing the user input data 227, the context data 305, the personalized context data 267, and/or the task selected by the task selection language model 340 to be completed first. In some embodiments, the task processing data 237 may include the remaining one or more tasks and/or may indicate the prioritization of the one or more tasks, as determined by the task selection language model 340. The task processing data 237 may be sent to the LLM shortlister component 240, which is described in detail herein below with respect to FIG. 5.

Figure 5:
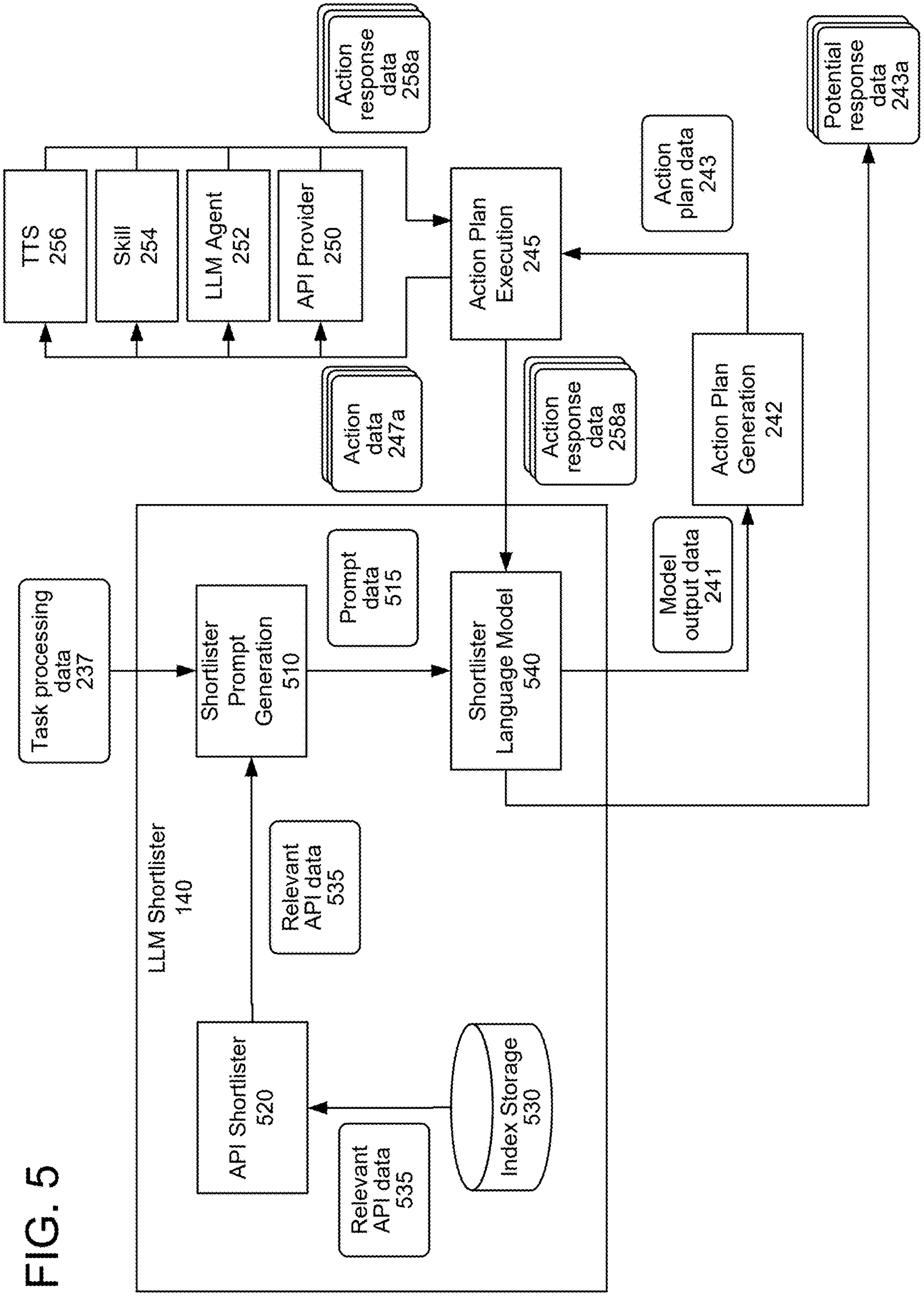
FIG. 5 is a conceptual diagram illustrating example components and processing of an LLM shortlister component, according to embodiments of the present disclosure.

FIG. 5 illustrates example processing of the LLM shortlister component 240. As shown in FIG. 5, the LLM shortlister component 240 may include an index storage 530, an API shortlister component 520, a shortlister prompt generation component 510, and a shortlister language model 540.

As further shown in FIG. 5, the task processing data 237 is received at the shortlister prompt generation component 510. The shortlister prompt generation component 510 processes the task processing data 237 to generate prompt data 515 representing a prompt for input to the shortlister language model 540. In some embodiments, such prompt data 515 may be generated based on combining the task processing data 237 (e.g., the user input data 227, the selected task, remaining tasks, results from processing performed to complete one or more previous tasks, etc.) and relevant API data 535 representing one or more APIs associated with the user input data 227 and/or the current task.

The relevant API data 535 may be generated by the API shortlister component 520, which may be configured to retrieve one or more (e.g., top-k) relevant APIs associated with the user input data 227 or the current task. In some embodiments, the APIs may correspond to various components. For example, the components may correspond to rule-based components, ML-based components, LLM-based components, or the like, such as personalized context component 265, skill component(s) 254, LLM agent component(s) 252, TTS component 256, orchestrator component 830, etc.) In some embodiments, the APIs may correspond to the components.

The API shortlister component 520 may use retrieval-based approaches to retrieve the one or more relevant APIs from the index storage 530, which may store various information associated with multiple APIs such as component descriptions, API arguments (e.g., parameter inputs/outputs), identifiers for components (e.g., such as personalized context component 265, skill component(s) 254, LLM agent component(s) 252, TTS component 256) that provide the API, etc. For example, the API shortlister component 520 may compare one or more APIs included in the index storage 530 to the user input or the current task to determine one or more APIs (top-k) that corresponds to the user input or the current task (e.g., APIs that are semantically similar to the user input or the current task, APIs that are capable of performing the current task, etc.). In some embodiments, the API shortlister component 520 (or another component of the API shortlister component 520) may determine an encoded representation of the user input or the current task and compare (e.g., using cosine similarity) the encoded representation(s) to an encoded representation of a component description for the API to determine whether the API is semantically similar to the user input or the current task. A component description may correspond to a description of the one or more actions that the API is configured to perform and/or other information associated with the API (e.g., an API call formatting structure (e.g., including input parameters), historical accuracy/defect rate, historical latency value, etc.). In some embodiments, the component description may further include one or more exemplars associated with use of the API (e.g., an example user input, corresponding API call, and example API output). If the value of semantic similarity meets or exceeds a threshold, the API (and, optionally, the component description) may be included in the relevant API data 535. In some embodiments, the API shortlister component 520 may determine the relevant API data 535 further using contextual information, including the context data 305, the personalized context data 267, an accuracy/defect rate value associated with the APIs, and/or a historical latency value associated with the APIs (e.g., which may be included in the description of the API). In some embodiments, the index storage 530 may be included in the API shortlister component 520. Similar processing may be performed to determine one or more components that are semantically similar to the user input or the current task, which may be included in the relevant API data 535. The component description retrieval component 430 may send the relevant API data 535 to the shortlister prompt generation component 510.

In some embodiments, the prompt data 515 may be an instruction for the shortlister language model 540 to determine one or more APIs that are to process with respect to the user input or the current task (e.g., determine one or more API calls to cause the APIs to process) given the information (e.g., the user input data 227, the context data 305, the personalized context data 267, the current task, and the relevant API data 535). As discussed above, with respect to the plan prompt generation component 310 and the task selection prompt generation component 330, in some embodiments, the shortlister prompt generation component 510 may also include in the prompt data 515 a sample processing format to be used by the shortlister language model 540 when processing the prompt. Similarly, in some embodiments, the shortlister prompt generation component 510 may generate the prompt data 515 according to a template format, such as:

{
You are an AI agent to find and execute an API to complete the task of [Task]
Here are a list of relevant API available:
[relevant API]
Use the following format:
Thought: think about what to do
API: API calls compatible with the task
Observation: the result of the API call
Summary: summarized results from the API call
If no appropriate API is found, summarize as nothing is found.
}

Following such a template format, for example, and for a selected task of "turn on all of the lights except the garage light" and corresponding relevant API data, the shortlister prompt generation component 510 may generate example prompt data 515*a:*

{
You are an AI agent to find an execute an API to complete the task of turn on all of the lights except the garage light
Here is a list of relevant API available:
Let's chat API
Classic NLU API
Smart Home skill
Use the following format:
Thought: think about what to do
API: API calls compatible with the task
Observation: the result of the API call
Summary: summarized results from the API call
If no appropriate API is found, summarize as nothing is found.
}

In some embodiments, the shortlister prompt generation component 510 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data may include "Please generate a polite, respectful, and safe response and one that does not violate protected class policy."

The shortlister language model 540 processes the prompt data 515 to generate one or more API calls corresponding to request(s) that the corresponding APIs return a description of an action(s) that the APIs are configured to/will perform with respect to the user input and/or the current task. As such, in some embodiments, the shortlister language model 540 may generate API calls for a subset of the APIs represented in the prompt data 515. The shortlister language model 540 may generate the one or more APIs calls (including the required input parameters) by applying in-context learning for cold-starting APIs (e.g., one-shot/few-shot learning). For example, in embodiments where the relevant API data 535 includes the component descriptions, the shortlister language model 540 may use the one or more exemplars included in the component descriptions (included in the prompt data 515) to determine the one or more input parameters for the API call. In some embodiments, the shortlister language model 540 may be finetuned on such exemplars (e.g., during offline or runtime processing), such that the shortlister language model 540 is capable of determining the one or more input parameters for the given API call.

During processing of the shortlister language model 540 and after generating the one or more requests, the shortlister language model 540 may cause the one or more requests to be executed. As shown in FIG. 5, the shortlister language model 540 may generate model output data 241 corresponding to the one or more requests, and may send the model output data 241 to the action plan generation component 242, which identifies the request(s) in the model output data 241 and may send action plan data 243 representing the identified request(s) to the action plan execution component 245. As is discussed in more detail below, the action plan generation component 242 may further revert modified values included in the identified request(s) to their original value, as is discussed herein below with respect to FIG. 6. Thereafter, the action plan data 243 may be sent to the action plan execution component 245, which causes execution of the one or more requests included in the action plan data 243.

Figure 6:
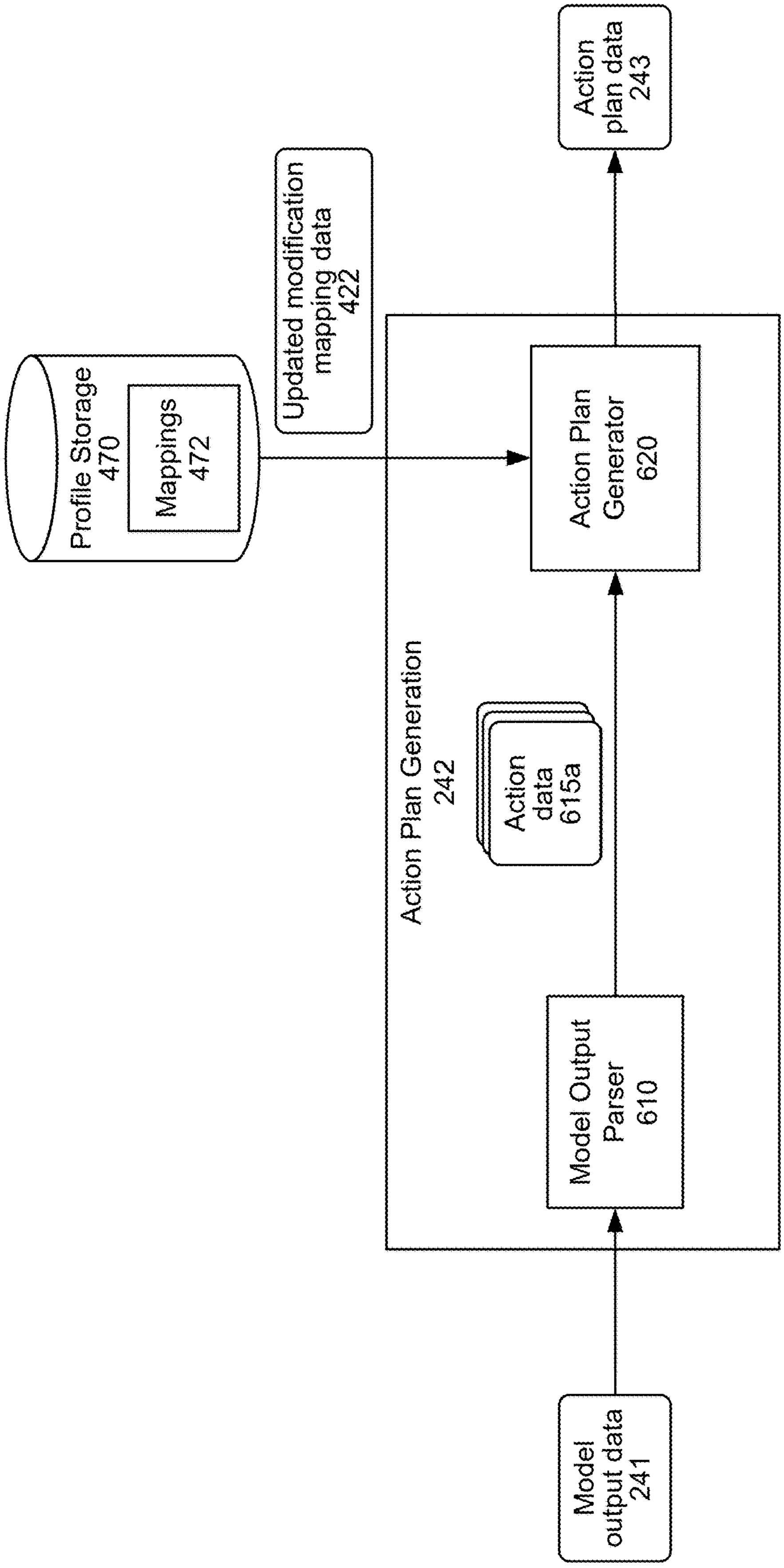
FIG. 6 is a conceptual diagram illustrating example components and processing of an action plan generation component, according to embodiments of the present disclosure.

As shown in FIG. 6, the action plan generation component 242 may further include a model output parser component 610 and an action plan generator component 620.

The model output parser component 610 parses the model output data 241 to generate action data 615*a-n* representing the request(s) generated by the shortlister language model 540. For example, if the model output data 241 includes "Action: Play music on device: device ID 1," action data 615*a* may represent "Play music on device: device ID 1." The action data 615*a-n* is sent to the action plan generator component 620.

The action plan generator component 620 may be configured to modify (remove, replace, elongate, etc.) a value(s) included in one or more of the requests of the action data 615*a-n*. In particular, the action plan generator component 620 may identify one or more values included in the action data 615*a-n* (e.g., included in the request(s)) that were previously modified by the LLM orchestrator component 230 (e.g., as discussed herein above with respect to FIG. 4) and further modify the one or more values such that they correspond to the original, unmodified value (e.g., the value originally included in potential response data 307*a-n*/potential response data 158*a-n*). In other words, the action plan generator component 620 may be configured to identify one or more modified values included in the one or more requests (which were the result of modifying potential response data (or the user input data 227, the context data 305, the personalized context data 267, etc.)) and revert the one or more modified values to their original values. For example, if the system 100 previously modified a user ID value of "ABC123" to a modified value of "user ID 1," then the action plan generator component 620 may be configured to revert the modified value of "user ID 1" to the value of "ABC123" prior to sending the action data 615*a-n* to the action plan execution component (as the action plan data 243).

The action plan generator component 620 may modify a value included in action data 615*a-n* to include the further modified (e.g., reverted) value using the updated modification mapping data 422. As discussed herein above, the updated modification mapping data 422 may include an identifier type(s) of a value(s) to be modified and a mapping(s) from the value(s) to be modified to a modified value(s). For example, the updated modification mapping data 422*a* may include "device ID: {"ABC123": "device ID 1"}," where "device ID" represents that the following mappings are for values associated with device IDs, "ABC123" represents an original device ID value that was modified, and "device ID 1" represents the modified value mapped to the device ID "ABC123." The action plan generator component 620 may process the action data 615*a-n* and the updated modification mapping data 422 to determine whether one or more of the values included in the action data 615*a-n* include an identifier type that corresponds to (e.g., matches, is (semantically) similar to, etc.) an identifier type included in the updated modification mapping data 422 (e.g., "device ID," "user ID," "geographic location," or the like.). If action plan generator component 620 determines a request included in the action data 615*a-n* includes an identifier type that corresponds to an identifier type included in the updated modification mapping data 422, the action plan generator component 620 may determine whether the value corresponding to the identifier type included in the action data 615*a-n* corresponds to (e.g., matches, is (semantically) similar to, etc.) a modified value associated with the identifier type included in the updated modification mapping data 422. If the value included in the action data 615*a-n* corresponds to the modified value included in the updated modification mapping data 422, the action plan generator component 620 may replace the modified value included in the action data 615*a-n* with a value included in the updated modification mapping data 422 that is mapped to the modified value. For example, the action plan generator component 620 may process action data 615*a* including a request of "Turn on device: device ID 2" and updated modification mapping data 422*a* including "device ID: {"ABC123": "device ID 1" "DEF456": "device ID 2"}" to determine that the action data 615*a* includes a modified value of "device ID 2." As discussed herein above, the action plan generator component 620 may make such a determination based on determining the action data 615*a* includes an identifier type of "device ID" associated with the value of "device ID 2" that corresponds to the identifier type of "device ID" included in the updated modification mapping data 422*a* and/or based on the value of "device ID 2," included in the action data 615*a*, corresponding to a modified value included in the updated modification mapping data 422*a* (e.g., the modified value of "device ID 2"). The action plan generator component 620 may modify the action data 615*a* to replace the modified value with the original value included in the updated modification mapping data 422*a*. For example, the action data 615*a* as modified by the action plan generator component 620 may correspond to "Turn on device: DEF456." The action plan generator component 620 may generate the action plan data 243 including the modified action data 615*a-n*, which may be sent to the action plan execution component 245.

The action plan execution component 245 may include an LLM action resolution component, an action creation component, an action execution component, and an action validation component (not illustrated). In some embodiments, the system 100 may further include the action repository 350.

The action plan data 243 may be received at the LLM action resolution component. In some embodiments, the LLM action resolution component may process the action plan data 243 to resolve the one or more requests included in the action plan data 243 into one or more executable API calls, which may include one or more parameters usable to cause the corresponding components to generate the potential responses. In some embodiments, the parameters may be associated with (or related to) the user input data 227.

The LLM action resolution component may determine the one or more executable API calls using the action repository 350. In addition to the description of the action repository 350 included herein above, the component descriptions include in the action repository 350 may further represent functions performable by components of the system 100. In some embodiments, a component description may include a description of the one or more functions performable by the API/component, a description of one or more parameters to be included in an executable API call usable to cause the API/component to perform the one or more functions, exemplars representing example user inputs associated with the API/component, example requests output by the LLM orchestrator component 230 that are associated with the API/component, corresponding executable API calls for causing the API/component to perform the example functions, and corresponding potential responses generated by the API/component. In some embodiments, a component description may be stored in association with one or more example requests output by the LLM orchestrator component 230. For example, an example request of "please turn on the kitchen lights," may be stored in association with a component description including a description of "usable to power on a device," an example executable API call of "turn_on_device(device="kitchen light")," and/or a description for the parameter of "kitchen light" of "target device identifier for the device to be powered on."

The LLM action resolution component may query the action repository 350 for component descriptions associated with the requests included in the action plan data 243 (or, in embodiments where the LLM action resolution component determines to modify one or more of the requests, the modified requests). The action repository 350 may determine API data representing component descriptions (according to the query for component descriptions associated with the requests), and may send the API data to the LLM action resolution component. In some embodiments, the component descriptions may be included in the API data based on them being semantically or lexically similar to the requests included in the action plan data 243. For example, the action repository 350/the LLM action resolution component may be capable of comparing (e.g., using cosine similarity) (an encoded representation of) a request to (an encoded representation of) a component description to determine a semantic similarity between the request and the API definition (e.g., a semantic similarity between the request and a natural language description of the functionality of the API/component included in the component description). If the component description is determined to be semantically similar to the request, then the corresponding component description, from the action repository 350, may be included in the API data. In some embodiments, the API data may include the top-n identified component descriptions. In some embodiments, component descriptions may be included in the API data based on the corresponding example request being (semantically or lexically) similar to the requests in the action plan data 243.

In some embodiments, the LLM action resolution component may process authentication credentials associated with the user input data 227. The authentication credentials may represent credentials (e.g., encrypted security token, log-in credentials, and/or any other data unique to the user 205 and/or the user device 210) usable for authenticating the identity of the user 205 that provided the user input and/or the user device 210 that captured the user input. The LLM action resolution component may compare the authentication credentials to validated authentication credentials corresponding to the user 205 and/or the user device 210. For example, in the instance where the authentication credentials correspond to an encrypted security token representing the identity of the user, the LLM action resolution component may identify a decryption key for decrypting the authentication credentials and compare the decrypted authentication credentials to one or more validated authentication credentials corresponding to the user 205.

In some embodiments, the authentication credentials may be sent to the LLM action resolution component by an orchestrator component 830, which may be determined as a result of user recognition processing (e.g., performed by the user recognition component 895). In some embodiments the LLM action resolution component may query the orchestrator component 830 for the authentication credentials.

In some embodiments, after receiving the action plan data 243, the LLM action resolution component may send the action plan data 243 to the action validation component. The action validation component processes the action plan data 243 to determine whether (execution of an API call(s) corresponding to) one or more of the requests included in the action plan data 243 are in conflict with a system operating policy. A request may be in conflict with a system operating policy if execution of the request may, for example, result in unsafe device operation, an undesired/unintended action, subject the user to a negative experience, and/or result in the divulgence of sensitive and/or confidential information. For example, the action validation component may determine that execution of one or more of the requests are in conflict with a system operating policy based on determining that execution of the requests may result in an unsafe device operation such as, for example, a request of "open the door," "unlock the front door," "open the garage door," etc. For further example, the action validation component may determine that execution of one or more of the requests is in conflict with a system operating policy based on determining that execution of the requests in the action plan data 243 may result in an undesired/unintended action such as turning a light switch on and off 10 times or divulgence of sensitive and/or confidential information, such as sending log-in credentials, payment information, etc. to a third party.

In some embodiments, the action validation component may further be configured to determine whether the requests are inappropriate and therefore should not be executed. For example, the action validation component may determine that execution of the requests in the action plan data 243 may be inappropriate, such as use/disclosure of sensitive information (e.g., financial information, medical information, etc.), explicit material (e.g., mature content), etc.

The action validation component may identify a request as potentially in conflict with a system operating policy based on various factors. For example, the action validation component may determine a request is potentially in conflict with a system operating policy based on determining the request is semantically similar to a request known to be in conflict with a system operating policy. For example, the action validation component may compare the request to one or more requests known to be in conflict with a system operating policy (e.g., unsafe device operations, such as controlling a door, controlling a lock, etc.). Based on determining the request matches/meets a threshold of semantic similarity with the one or more requests known to be in conflict with the system operating policy, the action validation component may determine that the request is potentially in conflict with the system operating policy. In some embodiments the one or more requests known to be in conflict with a system operating policy may include a request(s) previously determined to potentially be in conflict with a system operating policy.

For further example, the action validation component may determine whether the request includes one or more words known to be associated with a request(s) that is known to be in conflict with a system operating policy (e.g., explicit words, words associated with sensitive information (e.g., credit card, debit card, bank, social security number, address, log-in credentials, phone number, etc.), medical information (e.g., medication, prescriptions, etc.), and/or other words such as "open," "unlock," etc.) As another example, the action validation component may determine a request is potentially in conflict with a system operating policy based on determining the request is unassociated with (e.g., semantically dissimilar to) the user's original request (e.g., the user input), such as if the user's request was "What is the weather today" and the request is "unlock the front door."

As an additional example, the action validation component may determine a request is potentially in conflict with a system operating policy based on context data included in the action plan data (or received by the action plan execution component using the abovementioned authentication credentials), such as if the request is "unlock the front door," but the user that provided the corresponding user input is not currently home/within a proximity of their home. As an even further example, the action validation component may determine a request is potentially in conflict with a system operating policy based on determining that the request cannot be resolved into a corresponding executable API call, such as if an API corresponding to the request cannot be identified, an executable API call cannot be generated for the request (e.g., information required to determine one or more parameters of the API call is unavailable, etc.).

In some embodiments, the action validation component may determine that a request is in conflict with a system operating policy based on the request corresponding to a subject matter/topic category. For example, the action validation component may use a machine learning (ML) model(s) (e.g., a topic classification model) to determine a category corresponding to the request (e.g., a smart home device operation category, financial information category, purchase category, etc.), and if the determined category is in a stored list of policies, then the action validation component may determine that the request is in conflict with a system operating policy.

In some embodiments, the action validation component may be configured to modify the execution of the one or more requests based on one or more of the determinations discussed above. For example, in some embodiments, the action validation component may be configured to suspend and/or preempt performance of a request (e.g., execution of the corresponding executable API call) determined to potentially be in conflict with a system operating policy until authorization to perform the request is received by a user. As such, the action validation component may insert a new request into the action plan data 243 representing that a request for authorization is to be output and an order in which the new request is to be executed in (e.g., an indication that the new request is to be performed prior to the suspended and/or preempted request). For example, in response to an request of "open the garage door," the action validation component may determine that execution of such a request may potentially be in conflict with a system operating policy (e.g., unsafe device operation such as, in this instance, potentially allowing for unwanted access to the user's home) and may insert a request into the action plan data 243 (or otherwise provide an indication to the LLM action resolution component) representing that authorization to open the garage door should be requested from the user prior to causing the garage door to be opened.

For further example, in some embodiments, the action validation component may be configured to filter the action plan data 243 for requests (or portion of a request) determined to potentially be in conflict with the system operating policy. As such, in response to a request of "turn the light on and off 10 times," the action validation component may determine that performance of the request is potentially in conflict with a system operating policy (e.g., an undesired/unintended action of turning the light on and off multiple times) and may remove the request from the action plan data 243. Similarly, if the action validation component determines that a request is not supported by an API, not enough information is available to generate an executable API call, etc., the action validation component may remove the request from the action plan data 243 or may associate an indicator (e.g., a label, a tag, a flag, etc.) with the request for another component of the system 100 to perform additional processing with respect to the request. In such embodiments, the action validation component may include in the action plan data 243 (or otherwise provide to the LLM action resolution component) an indication that the request was removed. In some embodiments, the action validation component may be configured to filter a portion of the request that is in conflict with the system operating policy. For example, for the request "turn the light on and off 10 times," the action validation component may filter the request to become "turn the light on," or the like. The action validation component may generate action validation data representing whether performance of one or more of the requests were modified and representations of the modified requests, and send the action validation data to the LLM action resolution component.

In some embodiments, the action validation component may determine whether a request included in the action plan data 243 is a potential security concern using an ML model. For example, the ML model may process a request included in the action plan data 243 (and optionally a representation of the user input, which may also be included in the action plan data 243) and generate an indication of whether execution of the request may be in conflict with a system operating policy. During training, the ML model may take as input a plurality of training tuples including a request to be executed and an indication of whether execution of the request is in conflict with a system operating policy (and, optionally, a user input associated with the request and/or contextual information associated with the user input (e.g., dialog history data, interaction history data, user profile information, device profile information, etc.)), where, for a given training tuple, the ML model is tasked with correctly classifying execution of the request as being in conflict with a system operating policy or not. Based on whether the ML model correctly classifies the request or not, one or more values (e.g., weights) of the ML model may be configured.

In some embodiments, the action validation component may be periodically updated to identify additional requests that may be in conflict with a system operating policy. For example, additional logic and/or training data may be provided to the action validation component (or the ML model) in real time so that the action validation component (or the ML model) may be configured to identify any additional requests potentially in conflict with a system operating policy.

The LLM action resolution component may process the API data and the action plan data 243 to generate executable API data corresponding to one or more executable API calls usable to cause one or more components/APIs to generate potential responses to the user input. The LLM action resolution component may resolve the parameters included in the executable API data using the API data, an/or the action plan data 243. For example, for a request included in the action plan data 243 of "Please turn on the kitchen light", the corresponding target device identifier (e.g., included in the action plan data 243) of "Kitchen device 1," and the corresponding API call format (e.g., included in the API data) of "turn_on_device (device=[device name])," the LLM action resolution component may generate executable API data of "turn_on_device (device="Kitchen device 1")."

The LLM action resolution component may use various techniques to generate a parameter included in the executable API call, for example, using the API data, and/or the action plan data 243. In some embodiments, the LLM action resolution component may generate a parameter included in the executable API call based on determining an identifier type/label associated with information included in the action plan data 243 corresponding to an identifier type in the component description that corresponds to the parameter. For example, for a request (included in the action plan data 243) of "What is the capital of France," the LLM action resolution component may process as described above to generate API data including an API call format of InfoQA.get_answer ({"question": "user input"}) including the identifier type of "user input" for the parameter to be included in the executable API call. The LLM action resolution component may use the action plan data 243 and the API data to generate an executable API call of InfoQA.get_answer ({"question": "What is the capital of France"}) based on the action plan data 243 including natural language of "What is the capital of France" and an identifier type associated with the natural language data of "user input."

As discussed above, in some embodiments, the LLM action resolution component may generate a parameter included in the executable API call using one or more associations (e.g., mappings) between the identifier type associated with the parameter to be included in the executable API call and an identifier type associated with information included in the action plan data 243. Such an association may represent an alternative identifier type(s) that is associated with data corresponding to the parameter. In such embodiments, the API data (e.g., the component descriptions included in the API data) may further include one or more associations for an identifier type associated with a parameter to be included in an executable API call. For example, for an identifier type of "user ID" associated with a parameter to be included in the executable API call, the corresponding component description may further include an association with "customer ID", "user identifier", "customer identifier", or the like, indicating that data associated (e.g., labeled) with those identifier types may also correspond to the parameter. The LLM action resolution component may use these associations to generate a parameter included in the executable API call. For example, for an action of "Turn on the kitchen light," a target device of "kitchen light 1," an identifier type associated with the target device of "device ID," and API data including an API call format of turn_on_device(device="device name") including the identifier type of "device name" for the parameter to be included in the executable API call, the LLM action resolution component may generate an executable API call of turn_on_device(device="Kitchen light 1") based on determining that an association corresponding to the identifier type "device name" includes the identifier type "device ID."

In some embodiments, the LLM action resolution component may be configured to generate the executable API data for one or more of the requests included in the action plan data 243 without querying the action repository 350. For example, the LLM action resolution component may be further configured to recognize certain requests and transform them into the corresponding executable API data, without querying the action repository for the corresponding API data. In some embodiments, the LLM action resolution component may include logic for generating the executable API data for requests determined to be popular (e.g., requests generated 5 or more times in the last week). In some embodiments, the LLM action resolution component may further store data representing recent, previous request-to-executable API action data transformations, such that if a same or similar request is received in the future, the LLM action resolution component may generate the corresponding executable API data without querying the action repository for the API data.

In some embodiments, the LLM action resolution component may be configured to determine an order in which the executable API data is to be executed. For example, as discussed herein above, the action plan data 243 may include an indication of the prioritization of one or more of the tasks associated with the one or more requests included in the action plan data 243. The LLM action resolution component may use the prioritization to determine an order in which the executable API data is to be executed. In some embodiments, the executable API data may include an indication of the order.

The executable API data may be sent to the action creation component. The action creation component may process to generate additional executable API data representing one or more additional requests that were not explicitly indicated/predicted by the LLM orchestrator component 230 (e.g., not included in the action plan data 243). Although the one or more additional requests were not included in the action plan data 243, in some embodiments, one or more of the additional requests may be associated with one or more of the requests included in the action plan data 243. In such embodiments, one or more of the additional requests may represent sub-requests to be performed in addition to (e.g., prior to, concurrently, partially in parallel to, after) the one or more requests included in the action plan data 243.

As such, in some embodiments, the action creation component may generate the additional executable API data based on processing the executable API data. For example, the action creation component may generate the additional executable API data using an association (e.g., mapping) between requests and additional requests. The action creation component may have access to the associations between one or more system-generated requests (e.g., requests that may be generated by the LLM orchestrator component 230) and one or more additional requests. As such, if one or more of the requests included in the action plan data 243/represented by the executable API data are associated with one or more additional requests, then the action creation component may generate additional executable API data representing the additional requests. For example, a first association might represent that a request for TTS to be performed on text (or tokens) is associated with an additional request of performing content moderation on the text (or tokens). Therefore, in response to determining first executable API data corresponds to performing TTS processing, the action creation component may generate additional executable API data representing performing content moderation. For further example, a second association might represent that a request of proactively presenting content to a user is associated with an addition request of opening a microphone for capturing a follow-up user input. Therefore, in response to determining second executable API data represents proactively presenting content to a user, then the action creation component may generate second additional executable API data representing opening of a microphone to capture a follow-up user input. In some embodiments, the associations may include a natural language description of the request, executable API calls corresponding to the request for the action and the associated additional request. In some embodiments, the association may further indicate an order in which the request and/or the additional request are to be performed. For example, with respect to the TTS/content moderation example, the association may further indicate that the content moderation is to be performed prior to performing the TTS processing.

In some embodiments, the associations may be stored in the action repository 350, in which case the action creation component may query the action repository 350, using the executable API data, for the abovementioned associations (or an indication of the associations) to generate the additional executable API data. In the instance where the action creation component determines that none of the executable API data are associated with an additional request, the action creation component may not generate additional executable API data.

In some embodiments, the action creation component may generate the executable API data to include the additional executable API data, rather than generating additional executable API data separately. The executable API data including one or more executable API calls based on the requests in the action plan data 243 and including one or more additional executable API calls, may also include an order in which both the foregoing may be executed (e.g., execute content moderation prior to TTS processing).

The action creation component may send the executable API data and the additional executable API data to the action execution component. The action execution component may cause execution of the one or more API calls corresponding to the executable API data and the additional executable API data. For example, the action execution component may process the executable API data and/or the additional executable API data to generate the action data 247*a-n*. Action data 247*a* may represent, for example, an instruction (e.g., an executable API call determined from the executable API data and/or the additional executable API data) for a particular API to process to perform a function represented by the executable API call. In some embodiments, the action plan execution component 245 may generate the action data 247*a-n* to represent an instruction to provide the description of the action performable/to be performed with respect to the user input and/or the current task.

As shown in FIG. 5, the action plan execution component 245 may send the action data 247*a-n* to the API provider component 250, the LLM agent component 252, the skill component 254, the TTS component 256, and/or the orchestrator component 830. In some embodiments, the action plan execution component 245 may cause one or more of the API provider component 250, the LLM agent component 252, the skill component 254, and the TTS component 256 using a Representation State Transfer (REST) client and/or a Coral client. In some embodiments, the action plan execution component 245 may further include a hypertext transfer protocol (HTTP) client, which may be configured to cause a component remote to the system component(s) 220 (e.g., a LLM agent component 252*a* that is remote to the system component(s) 220) to perform a function corresponding to the executable API call. In such embodiments, if action data 247*a* corresponds to a remote component, the action plan execution component 245 may send the action data 247*a* to the HTTP client to cause the remote component to perform the action corresponding to the action data 247*a*.

As discussed above, in some embodiments, the action plan execution component 245 may be configured to execute one or more of the executable API data and/or the additional executable API data concurrently/at least partially in parallel. For example, if first executable API data corresponds to turning on a living room light and a second executable API data corresponds to turning on a TV, and there is no determined order in which to execute the executable API data, the action plan execution component 245 may cause the actions to be performed concurrently/at least partially in parallel.

As further discussed above, in some embodiments, the action plan execution component 245 (e.g., the LLM action resolution component, the action validation component and/or the action creation component) may be configured to determine an order in which one or more of the executable API data and/or the additional executable API data are to be executed. In such embodiments, the action plan execution component 245 may be further configured to cause execution of one or more of the executable API data and/or the additional executable API data in the determined order. For example, with respect to the example provided above regarding the request of "unlock the front door," where the action validation component determines that the request may potentially be in conflict with a system operating policy and determines that a request for authorization should be output to the user prior to execution of the request, the action plan execution component 245 may cause the request for authorization to be executed prior to causing execution of the request to unlock the front door. For further example, if first executable API data corresponds to changing a TV channel and first executable API data corresponds to turning the TV on, the action plan execution component 245 may cause the TV to be turned on prior to causing the TV channel to be changed.

With reference once more to causing the components (e.g., the API provider component 250, the LLM agent component 252, the skill component 254, and/or the TTS component 256) to generate a potential response(s) to the user input, and as discussed herein above, the system 100 may include the TTS component 256, which may be configured to process textual or tokenized input to generate audio data representing synthesized speech corresponding to the textual or tokenized input spoken by a synthetic voice. The processing of the TTS component 256 is discussed in detail below with respect to FIG. 8.

The LLM agent component 252 may correspond to one or more LLM agents. An LLM agent component 252 may correspond to a custom instantiation of an LLM (and other components) that is configured to handle user inputs relating to a particular domain/functionality. In some embodiments, the LLM agent component 252 may be configured to handle specific use cases via particular prompt generation, fine-tuning of the LLM, etc. For example, the LLM agent component 252*a* may be configured to handle user inputs/tasks related to information query, the LLM agent component 252*b* may be configured handle user inputs/tasks related to shopping, the LLM agent component 252*c* may be configured to handle user inputs/tasks related to ordering food from various restaurants, the LLM agent component 252*d* may be configured to handle user inputs/tasks related to ordering food from a particular restaurant (e.g., a particular pizza restaurant), the LLM agent component 252*e* may be configured to handle user inputs/tasks related to booking a hotel, the LLM agent component **252*f*** may be configured to handle user inputs/tasks related to booking a flight, etc.

The skill component 254 may be software running on the system component(s) 220 that is akin to a software application. That is, a skill component 254 may enable the system component(s) 220 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 220 may be configured with more than one skill component 254. For example, a weather service skill component may enable the system component(s) 220 to provide weather information, a car service skill component may enable the system component(s) 220 to book a trip with respect to a taxi or ride sharing service, a restaurant skill component may enable the system component(s) 220 to order a pizza with respect to the restaurant's online ordering system, etc. A skill component 254 may operate in conjunction between the system component(s) 220 and other devices, such as the user device 210, in order to complete certain functions. A skill component 254 may include hardware, software, firmware, or the like that may be dedicated to a particular skill component 254 or shared among different skill components 254.

The API provider component 250 may include various components that may be caused to execute using the action data **247*a-n*. For example, the API provider component 250 may include an entity recognition (ER) component, which may be configured to process textual or tokenized input to link one or more entity references included in the textual or tokenized input to a specific corresponding entity known to the system 100. For example, based on the textual or tokenized input (e.g., a context of the textual or tokenized input), the ER component may determine that a reference to "Neil Armstrong" is directed to the American astronaut. In some embodiments, the action data 247*a-n* may include an indication(s) (e.g., slots) of one or more entities included in the user input, as determined by one or more of the language models 320, 340, 540, in which case the ER component may process to link the one or more entities to the specific, referenced, entity known to the system 100**.

In other embodiments, the ER component may be configured to process the action data **247*a-n* to determine the one or more entities included in the user input and link the one or more determined entities to the specific, referenced, entity (entities) known to the system 100**. For example, the ER component may include one or more recognizers. Each recognizer may include a named entity recognition (NER) component. The NER component applies grammar information and lexical information (received from a storage) associated with a domain (associated with the recognizer implementing the NER component) to determine a mention of one or more entities in text data. In this manner, the NER component identifies "slots" (each corresponding to one or more particular words in text data) that may be useful for later processing. The NER component may also label each slot with a type (e.g., noun, place, city, artist name, song name, etc.). Thereafter, the ER component links a slot of text data to a specific entity known to the system. To perform entity resolution, the ER component may utilize gazetteer information stored in an entity library storage. The gazetteer information may be used to match text data (representing a portion of the user input) with text data representing known entities, such as song titles, contact names, etc. Gazetteers may be linked to users (e.g., a particular gazetteer may be associated with a specific user's music collection), may be linked to certain domains (e.g., a shopping domain, a music domain, a video domain, etc.), or may be organized in a variety of other ways.

For further example, the API provider component 250 may include a search component, which may be configured to query a storage (e.g., a database, repository, knowledge base, etc.) for information usable for generating a response to a user input. For example, if the action data **247*a-n*** represents a request for information of "Who won the game between [Team 1 Name] and [Team 2 Name]," then the search component may query the storage (or other sources, such as the Internet), to retrieve the information "[Team 1 Name] won the game between [Team 1 Name] and [Team 2 Name].".

As an even further example, the API provider component 250 may include a device controller component, which may be configured to cause a device to perform an action corresponding to the action data **247*a-n*. For example, if the action represented by action data 247*a*** is to turn on a living room light (e.g., "turn_on_device (device="living room light")), then the device controller component may identify the corresponding living room light, and instruct the living room light to power on (e.g., change its state to {state: ON}).

In some embodiments, the API provider component 250 may include a domain service component, which may be configured for interacting with one or more services defined by particular users, such as developers, specialists, or the like (e.g., to receive information, such as responses or annotations, to cause an action.

The API provider component 250, the LLM agent component 252, the skill component 254, and/or the TTS component 256 may send action response data **258*a-n* representing one or more responses generated by the one or more APIs corresponding to the action data 247*a-n* (e.g., the descriptions of the actions performable by the APIs with respect to the user input and/or the current task) to the action plan execution component 245. For example, in response to an API call to the skill component 254 associated with a user input for turning on a light, the action response data 258*a* may correspond to "turn on the light," "turn_on_device ("light", [device ID])", or the like. For further example, in response to an API call to the skill component 254 associated with a user input for ordering a pizza from a particular restaurant, the action response data 258*b* may correspond to "order medium pizza from [restaurant name]", "order_pizza ("medium", "pizza", "[restaurant name]")", or the like. The action plan execution component 245 may send the action response data 258*a-n* to the shortlister language model 540** for further processing.

In some embodiments, similar to the plan prompt generation component 310, the action plan execution component 245 may be further configured to modify (e.g., remove, replace, truncate) the action response data **258*a-n* for information that is not useful for downstream processing by the LLM orchestrator component 230. In embodiments where the data modification component 420 and the component description retrieval component 430 are included in a component outside of the plan prompt generation component 310, the action plan execution component 245 may send the action response data 258*a-n* to the component, which may process as discussed herein above to generate modified data to be included in the further prompt data. In other embodiments, the action plan execution component 245 may further include the data modification component 420 and the component description retrieval component 430 (or components similarly configured) and may process the action response data 258***a-n* as discussed herein above to generate further action response data corresponding to the action response data 258*a-n* but further including the modified values.

In embodiments where the action plan execution component 245 modifies one or more values included in the action response data 258*a-n*, the action plan execution component 245 may generate updated modification mapping data (e.g., similar to the updated modification mapping data 422 discussed herein above) representing at least a mapping between the one or more values and the one or more modified values, which may be sent to the profile storage 470 for storage.

The action plan execution component 245 may send the action response data 258*a-n* to the LLM shortlister component 240. In some embodiments, the LLM shortlister component 240 may send the potential response data 243*a-n* to the plan generation component 235 or the response arbitration component 260 (as the potential response data 243*a-n*), based on whether there are any remaining tasks to process with respect to/whether an ambiguity exists with respect to the user input and/or a current task, as is described herein below.

In other embodiments, the shortlister language model 540 may further process with respect to the action response data 258*a-n* to generate the potential response data 243*a-n*. In such embodiments, the action response data 258*a-n* may be sent to the shortlister prompt generation component 510 to generate further prompt data (not illustrated) corresponding to the prompt data 515 and further including the action response data 258*a-n*. In some embodiments, the further prompt data may correspond to an instruction for the shortlister language model 540 to process the action response data 258*a-n* (e.g., to generate a natural language summary of the action response data 258*a-n*, to filter and/or rank the action response data 258*a-n*, etc.) to generate potential response data 243*a-n*. In some embodiments, for example, where the action plan execution component 245 is not configured to modify one or more values included in the action response data 258*a-n*, the shortlister prompt generation component 510 may modify one or more values included in the action response data 258*a-n* determined to not be beneficial to downstream processing of the LLM orchestrator component 230, as discussed herein above with respect to FIG. 4.

In embodiments where the shortlister prompt generation component 510 modifies one or more values included in the action response data 258*a-n*, the shortlister prompt generation component 510 may generate updated modification mapping data (e.g., similar to the updated modification mapping data 422 discussed herein above) representing at least a mapping between the one or more values and the one or more modified values, which may be sent to the profile storage 470 for storage.

The shortlister language model 540 may process the action response data 258*a-n* (or the further prompt data including the action response data 258*a-n* including the modified values) to generate a natural language summary of the action response data (e.g., the potential response data 243*a-n*). In some embodiments, the potential response data 243*a-n* may include an association between action response data 258*a* (or a summarized representation of the action response data 258*a*) and an indication of the API/component that generated the action response data 258*a* (e.g., a component identifier, component description, etc.). In some embodiments, the shortlister language model 540 may be configured to filter and/or rank the action response data 258*a-n* based on how relevant the action response data 258*a-n* is to the current task. In some embodiments, the shortlister language model 540 may be configured to filter and/or rank the action response data 258*a-n* based on a confidence level of the component that provided the response data, where the confidence level may indicate a likelihood of the component being able to respond (e.g., within a period of time), the component being able to perform an action that corresponds to the current task, etc. In some embodiments, the action response data 258*a-n* may indicate whether or not the corresponding component is able to respond (e.g., the action response data 258*a* may include a Boolean value such as "yes" or "no" or other similar indications). In some embodiments, the shortlister language model 540 may filter and/or rank the action response data 258*a-n* based on information included in the prompt data 515 (e.g., the user input data 227, the relevant API data 535, the personalized context data 267, the prompt data 315, etc.) For example, the potential response data 243*a-n* may include a subset of the action response data 258*a-n* (or the summarized representations of the action response data 258*a-n*) and may further include a representation of a confidence associated with the action response data 258*a* (or a summarized representation of the action response data 258*a*). As such, the potential response data 243*a-n* may further include data representing a confidence of how relevant the action response data 258*a* is to the current task. In some embodiments, the shortlister language model 540 may consider a rating associated with the component that provided the action response data 258*a-n*, where the rating may be a user satisfaction rating provided by multiple different users of the system 100, a user satisfaction rating provided by the user 205 associated with the user input data 227, a system generated rating based on the number of past tasks handled by the component, a accuracy rating based on the number of past tasks the component had handled correctly/provided a desired response for, etc.

The LLM shortlister component 240 may send the potential response data 243*a-n* for further processing. In instances where the plan generation component 235 determined that more than one task is to be completed in order to perform the action responsive to the user input data 227, the LLM shortlister component 240 may send the potential response data 243*a-n* to the plan generation component 235, which may process as described herein above to maintain and prioritize the task list based on the potential response data 243*a-n* and select a new task to be completed. In instances where the plan generation component 235 determined that only one task is to be completed, or in instances where the LLM shortlister component 240 determines that there are no remaining tasks to be completed, the LLM shortlister may send the potential response data 243*a-n*, and the results of processing performed with respect to the previously completed tasks (e.g., previous action response data) to the response arbitration component 260, which is discussed in detail herein below with respect to FIG. 7). The LLM shortlister component 240 may further send the user input data 227, the context data 305, the personalized context data 267, etc., to the plan generation component 235 and/or the response arbitration component 260.

As discussed herein above, the shortlister language model 540 may be configured to determine whether additional information is needed in order to complete the current task (e.g., if an ambiguity exists in the user input data 227 or the current task, if the current task is to resolve an identified ambiguity, if an API argument is missing from the user input or other available data, etc.), in which case the shortlister language model 540 may send data representing a request for such additional information to the response arbitration component 260. In some embodiments, the action plan data 243 may represent the request for additional information, and the action plan execution component 245 may be configured to send corresponding action data 247*a-n* to the personalized context component 265. For example, for the example provided herein above with respect to ordering pizza, the shortlister language model 540 may determine that in order to resolve an ambiguity with respect to the user input data 227 or current task (e.g., based on the current task being to resolve the ambiguity or a determination that the current task cannot be completed due to the ambiguity), the system 100 must "identify user pizza preference," or the like. The system 100 may send a request to the personalized context component 265 to "identify user pizza preference" and the personalized context component 265 may process as described herein above to return personalized context data resolving the ambiguity (e.g., the user's pizza preference may be determined to be a cheese pizza or a pepperoni pizza).

Figure 7:
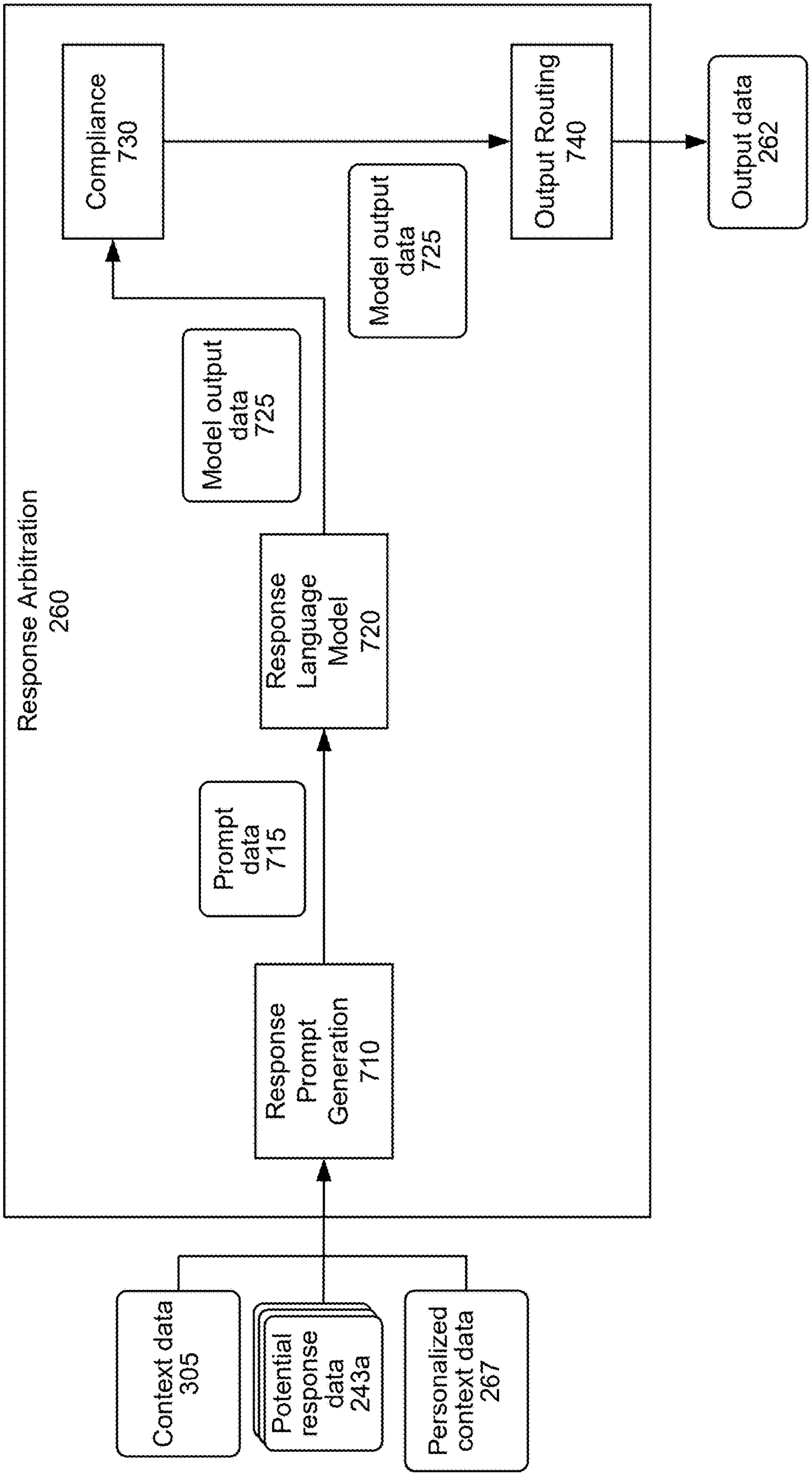
FIG. 7 is a conceptual diagram illustrating example component and processing of a response arbitration component, according to embodiments of the present disclosure.

FIG. 7 illustrates example components and processing of the response arbitration component 260. As shown in FIG. 7, the response arbitration component 260 may include a response prompt generation component 710, a response language model 720, a compliance component 730, and an output routing component 740. As discussed herein above, the response arbitration component 260 processes the potential response data 243*a-n* (representing the potential responses generated by the one or more components determined to be associated with the user input) to determine whether one or more of the potential responses generated by the system 100 are responsive to the user input.

As shown in FIG. 7, the response arbitration component 260 receives the potential response data 243*a-n* (output by the LLM shortlister component 240) at the response prompt generation component 710. The response prompt generation component 710 may further receive personalized context data 267 (from the LLM shortlister component 240 or the personalized context component 265) and context data 305. In some embodiments, the context data 305 may correspond to various contextual information associated with the user input (e.g., dialog history data, historical user input data, weather data, time of day, user ID, device information associated with the device that sent the user input data 227 (e.g., device ID, device states, historical device interaction data, etc.), etc.). As discussed herein below, the response arbitration component 260 may further receive additional information from the LLM shortlister component 240, such as the potential responses of processing performed with respect to previous tasks (e.g., previous action response data) associated with the user input, and the user input data 227.

The response prompt generation component 710 may process the potential response data 243*a-n*, context data 305, and the personalized context data 267 (and, optionally, the further information received from the LLM shortlister component 240) to generate prompt data 715 representing a prompt for input to the response language model 720. In some embodiments, the prompt data 715 may be an instruction for the response language model 720 to determine whether one or more of the potential responses represented in the potential response data 243*a-n* are responsive to the user input given the other information (e.g., the personalized context data 267, the context data 305, the potential responses associated with the previous tasks (e.g., previous action response data) associated with the user input, and the user input data 227) included in the prompt data 715. The prompt data may further be an instruction for the response language model 720 to, if the response language model 720 determines that one or more of the potential responses are responsive to the user input, cause performance of the one or more corresponding actions (e.g., the one or more potential actions included in the selected responses) and/or cause the system 100 to inform the user 205 of the one or more selected responses. For example, in some embodiments, prompt data 715 may further instruct the response language model 720 to generate a natural language summary of the one or more selected responses determined to be responsive to the user input. The prompt data 715 may instruct the response language model 720 to cause the system 100 to output the natural language summary to the user 205.

In some embodiments, for example, where the LLM shortlister component 240/action plan execution component 245 does not modify one or more values included in the potential response data 243*a-n* (e.g., the action response data 258*a-n*), the response prompt generation component 710 may modify one or more values included in the potential response data 243*a-n* determined to not be beneficial to downstream processing of the LLM orchestrator component 230, as discussed herein above with respect to FIG. 4.

In embodiments where the response prompt generation component 710 modifies one or more values included in the potential response data 243*a-n*, the response prompt generation component 710 may generate updated modification mapping data (e.g., similar to the updated modification mapping data 422 discussed herein above) representing at least a mapping between the one or more values and the one or more modified values, which may be sent to the profile storage 470 for storage.

In some embodiments, the prompt data 715 may further be an instruction for the response language model 720 to, if the response language model 720 determines that none of the potential responses are responsive to the user input, generate a request for additional information from a component of the system 100 and/or the user 205. As discussed above, the additional information may be any information usable to determine and/or perform an action responsive to the user input (e.g., to resolve an ambiguity associated with the user input and/or a task(s) associated with the user input).

In some embodiments, the response prompt generation component 710 may also include in the prompt data 715 a sample processing format to be used by the response language model 720 when processing the prompt. In some embodiments, the response prompt generation component 710 may generate the prompt data 715 according to a template format. For example, the prompt data 715 may adhere to a template format including:

{

"You are a conversational AI agent that communicates with users to satisfy their request or ask clarification questions. If applicable, summarize the responses that satisfy the user's request. If applicable, call the corresponding API's to perform the potential actions that satisfy the user's request. If no response is needed, indicate that."

Here is the user's request:

[user input data 227]

Here are the potential responses:
[potential response data 243*a-n*]
}

In some embodiments, the template format may instruct the response language model 720 as to how it should process to determine whether one or more of the potential responses are responsive to the user input. In some embodiments, the format may further include an indication, such as a label of "User:" indicating the following string of characters/tokens as the user input. In some embodiments, the format may further include a label of "Thought:" instructing the response language model 720 to generate an output representing whether one or more of the potential responses are determined to be responsive to the user input or whether additional information is needed. In some embodiments, the format may further include an indication of "Response:" instructing the response language model 720 to indicate the one or more selected responses determined to be responsive to the user input, generate a summary of the one or more selected responses, and/or generate a request for additional information.

Following such a template format, for example, and for the example user input of "What is the weather for today" and corresponding potential responses output by the LLM shortlister component 240, the response prompt generation component 710 may generate example prompt data 715*a:*

{
"You are a conversational AI agent that communicates with users to satisfy their request or ask clarification questions. If no response is needed, indicate that."
Here is the user's request:
What is the weather for today
Here are the potential responses and potential actions:
Skill component A: It is currently 70 degrees, with a high of 75 and a low of 68
Skill component B: The weather for today is expected to be mostly sunny, but with a chance of rain in the late afternoon
}

For further example, and for the example user input of "please order some pizza for dinner" and corresponding potential responses output by the LLM shortlister component 240, the response prompt generation component 710 may generate example prompt data 715*b:*

{
"You are a conversational AI agent that communicates with users to satisfy their request or ask clarification questions. If no response is needed, indicate that."
Here is the user's request:
Please order some pizza for dinner
Here are the potential responses and potential actions:
Component A: User ordered Brooklyn style pizza from [Company 1 name]
API A: Use [Application 1 name] to order pizza from [Company 1 name]
API B: Use [Application 2 name] to order pizza from [Company 2 name]
}

In some embodiments, the response prompt generation component 710 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data 715 may include "Please generate a polite, respectful, and safe response and one that does not violate protected class policy."

The response language model 720 processes the prompt data 715 to generate model output data 725 representing the one or more selected responses determined to be responsive to the user input, the natural language summary of the one or more selected responses, or the request for additional information.

If the response language model 720 determines that one or more of the potential responses are responsive to the user input, the response language model 720 may generate model output data 725 representing the one or more selected responses, or a natural language summary of the one or more selected responses, to be output to the user. For example, based on processing the first example prompt data above, the response language model 720 may select one of the potential responses (e.g., the potential responses from skill component A (e.g., a weather skill component)) determined to be responsive to the user input to generate model output data 725*a*: {"It is currently 70 degrees, with a high of 75 and a low of 68,"} or the like. For further example, based on processing the first example prompt data provided above, the response language model 720 may select more than one of the potential responses (e.g., the potential responses from both the skill component A and skill component B) determined to be responsive to the user input and generate a summary of the selected responses to generate model output data 725*b*: {"It is expected to be mostly sunny today, with a high of 75 and a low of 68, but with a chance of rain in the late afternoon,"} or the like.

As another example, based on processing the second example prompt data provided above, the response language model 720 may select one of the potential responses (e.g., the potential response from Component A (e.g., the personalized context component 265) representing that the user order Brooklyn style pizza from [Company 1 name]) determined to be responsive to the user input to generate model output data 725*a*: {"Ok, I will place an order for Brooklyn style pizza from [Company 1 name],"} or the like. As a further example, based on processing the second example prompt data provided above, the response language model 720 may select more than one of the potential responses (e.g., the potential responses from both component A and API A) determined to be responsive to the user input and generate a summary of the selected responses to generate model output data 725*b*: {"Ok, I will place an order for Brooklyn style pizza from [Company name] using [Application 1 name],"} or the like.

As such, the response language model 720 may select between the one or more potential responses from one or more different components (e.g., for the first example prompt data, the potential responses from the skill component A and the skill component B and, for the second example prompt data, the potential responses from Component A, API A, and API B) to determine that a subset of the potential responses are responsive to the user input. Thereafter, the response language model 720 may cause output of the selected responses (e.g., the subset of potential responses) or a natural language summary of the selected responses to the user.

In some embodiments, the response arbitration component 260 may also generate and send an instruction to the components, (e.g., API(s), components, agents, etc. as discussed herein above with respect to FIG. 5) configured to perform the potential actions included in the selected responses to cause performance of the potential actions (or another component of the system 100 configured to cause the components to perform the potential actions, such as the action plan execution component 245). For example, in instances where the selected responses include a potential action to be performed, the response language model 720 may further cause the corresponding components to perform the potential action (e.g., cause API A to order the Brooklyn style pizza from [Company 1 name] using [Application 1 name]). In other embodiments, the system 100 may not generate and/or send the instruction until approval to perform the action(s) is received from the user 205.

If the response language model 720 determines that none of the potential responses are responsive to the user input and/or that an ambiguity exists with respect to the user input and/or one or more of the determined tasks, the response language model 720 may generate model output data 725 representing a request to be output to the user and/or the personalized context component 265. For example, based on processing the first example prompt data provided above, the response language model 720 may determine an ambiguity exists with respect to the size of the pizza to be ordered and may generate model output data 725*c*: {"What size pizza should I order?",} {"What size pizza does the user usually order?",} or the like to be output to the user and/or sent to the personalized context component 265.

As further discussed herein below, one or more of the components discussed herein (e.g., the plan generation component 235 and/or the LLM shortlister component 240) may be capable of determining whether an ambiguity exists in the user input or the current task, and may determine that additional information is needed. In response to such a determination, the component(s) may be further configured to send a request for such additional information to the response arbitration component 260, which may process as described herein to generate a request for the additional information to be sent to the personalized context component 265 or output to the user 205 to solicit the additional information. In some embodiments, the response arbitration component 260 may send the request for additional information to the action plan generation component 242, which may, in turn, send action plan data representing the request to the action plan execution component 245 to cause output of the request to the user 205 to solicit the additional information.

The response language model 720 may send the model output data 725 to the compliance component 730, which is configured to determine whether model output data generated by the response language model 720 is appropriate for output to the user 205. In other words, the compliance component 730 processes the model output data 725 to determine whether the model output data 725 includes any inappropriate/sensitive information that should not be output to the user 205 (e.g., confidential information, offensive language, etc.). In some embodiments, the compliance component 730 may be configured to compare the model output data 725 to one or more words determined to be inappropriate/sensitive and should not be output to the user 205. In some embodiments, the compliance component 730 may include/implement an ML model. For example, the ML model may process the model output data 725 to determine whether the model output data 725 includes any inappropriate/sensitive information. During training, the ML model may take as input a plurality of training natural language inputs, where the ML model is tasked with classifying a natural language input as including inappropriate/sensitive information or not. The output of the ML model (e.g., 0, 1, a value between 0 and 1, or the like) resulting from processing with respect to a training natural language input may be compared to a corresponding label representing whether the natural language input includes inappropriate/sensitive information or not. Based on the comparison, one or more parameters of the ML may be configured. In some embodiments, the ML model may be a classifier.

If the output of the compliance component 730 indicates that the model output data 725 includes information that is not appropriate for output to the user 205, the compliance component 730 may cause further processing of the model output data 725 by downstream components to halt. In some embodiments, the response arbitration component 260 may cause the response language model 720 to generate new model output data 725 to be evaluated by the compliance component 730. For example, the response arbitration component 260 may cause the response prompt generation component 710 to generate new prompt data, which may include the prompt data 715, the model output data 725, and an indication that the model output data 725 is not appropriate for output to the user 205. The new prompt data may be an instruction to generate new model output data that is appropriate for output to the user 205.

If the output of the compliance component 730 indicates that the model output data 725 is appropriate for output to the user, the compliance component 730 may send the model output data 725 to the output routing component 740. The output routing component 740 processes the model output data 725 to determine one or more components that are to be caused to process in response to the model output data 725. In other words, the output routing component 740 parses the model output data 725 to determine one or more components that the model output data 725 is to be routed to (or that are to be caused to process based on the model output data 725).

For example, in an instance where the response language model 720 determines that one or more of the potential responses are responsive to the user input and generates model output data 725 including the one or more selected responses (or a natural language summary of the one or more selected responses), the output routing component 740 may parse the model output data 725 to determine the selected responses/the natural language summary and send output data 262 corresponding to the selected responses/the natural language summary to a component configured to generate corresponding data to be output to the user 205. For example, the output routing component 740 may send (via the action plan generation component 242 and the action plan execution component 245) the output data 262 to a TTS component (e.g., the TTS component 256), which may process as described herein below to generate output audio data including synthesized speech corresponding to the output data 262, which the system 100 (e.g., the response arbitration component 260) may send to the user device 210 for output to the user 205. In some embodiments, the system 100 may further include a component configured to generate visual output data (e.g., output image and/or video data) corresponding to the output data 262, which may be sent (e.g., from the response arbitration component 260) to the user device 210 to be output to the user.

For further example, in embodiments where the model output data 725 includes selected responses that include one or more potential actions to be performed, the output routing component 740 may process as described herein above to determine the one or more selected responses/the natural language summary and send the output data 262 to the one or more components associated with the selected responses. In such embodiments, the output data 262 may further include an instruction for the one or more components to perform the potential actions corresponding to the selected responses. For example, in some embodiments, the components corresponding to the potential responses included in the potential response data 243*a-n* may, after generating the potential responses, suspend processing required to perform the potential action included in the potential responses and await an instruction from the system 100 to perform the potential action. As such, the output routing component 740 may include the instruction in the output data 262 to cause the component to perform the potential action. In some embodiments, the output routing component 740 may generate an API call configured to cause the component to perform the action.

In some embodiments, where the model output data 725 includes selected responses that include one or more potential actions to be performed, the output data 262 may further request authorization from the user 205 to perform the one or more potential actions responsive to the user input. After receiving the request authorization (e.g., via a subsequent user input) the response arbitration component 260 may generate and send the corresponding instruction (or API call) to perform the one or more potential actions responsive to the user input. In some embodiments, the system 100 may store data indicating prior authorization to perform the one or more potential actions responsive to the user input (or one or more actions similar to the one or more potential actions), in which case the response arbitration component 260 may use such data as authorization to perform the one or more potential actions. For example, the user 205 may have previously provided authorization for a set of actions (e.g., turning on outside lights). Thereafter, the system 100 may determine the one or more potential actions to be performed in response to the user input data 227. If the system 100 determines that the one or more actions are included in the set of actions previously authorized by the user 205, the system 100 may not ask for further authorization prior to causing the one or more potential actions to be performed.

For further example, in an instance where the response language model 720 generates model output data 725 including a request for additional information (in response to the response language model 720 determining that none of the potential responses are responsive to the user input and/or an ambiguity exists with respect to the user input and/or one or more of the tasks), which may be determined by the output routing component 740 based on, for example, the model output data 725 including a question, the output routing component 740 may parse the model output data 725 to determine whether the request for additional information is to be sent to the personalized context component 265 and/or output to the user 205. In some embodiments, the response language model 720 may include in the model output data 725 an indication of whether the request for additional information should be sent to the personalized context component 265 and/or output to the user 205. In some embodiments, unless otherwise indicated in the model output data 725, the output routing component 740 may determine to send the request for additional information to the personalized context component 265 (via the action plan generation component 242) prior to outputting the request for additional information to the user 205 (via the action plan generation component 242 and the action plan execution component 245). In the instance where the personalized context component 265 is unable to resolve the ambiguity (or a component of the system 100 is unable to resolve the ambiguity using the personalized context data generated by the personalized context component 265), the output routing component 740 may determine the request for additional information is to be output to the user 205.

In some embodiments, the response arbitration component 260 may be configured to further process data representing potential responses potentially responsive to the user input that is generated by one or more other components of the system 100 not included in the LLM orchestrator component 230. For example, the response arbitration component 260 may further receive data from an orchestrator component 830 (discussed in detail herein below with respect to FIG. 8) representing a potential response to the user input (e.g., the output of the skill component 254), where the orchestration of the processing performed to generate the potential response was performed by the orchestrator component 830, rather than the LLM orchestrator component 230. In such embodiments, the response arbitration component 260 may be further configured to arbitrate between first potential responses received as a result of the processing of the LLM orchestrator component 230 and second potential responses received as a result of the processing of the orchestrator component 830. As discussed above, the response arbitration component 260 may select one or more portions (e.g., potential actions, potential responses, etc.) of the first potential responses and/or the second potential responses that are determined to be responsive to the user input and cause output of the one or more portions (or a summarized representation of the one or more portions) and/or performance of the potential actions corresponding to the selected responses.

In some embodiments, the data received from the orchestrator component 830 may be included in the potential response data 243*a-n*. For example, the orchestrator component 830 may be determined to be configured to perform a function (e.g., cause other component(s) to perform a function) potentially relevant to the user input such that the LLM shortlister component 240 may cause the orchestrator component 830 to generate potential responses potentially responsive to the user input, which may be included in the potential response data 243*a-n* sent to the response arbitration component 260.

In some embodiments, the LLM orchestrator component 230 may further include a memory storage (not illustrated) which may store various information associated with the processing performed (e.g., user input data 227, the prompt data 315, the context data 305, the personalized context data 267, the modification mapping data 408, the updated modification mapping data 422, the model output data 325, prompt data 335, the task processing data 237, the relevant API data 535, the prompt data 515, the action plan data 243, the action response data 258*a-n*, the potential response data 243*a-n*, etc.) during one or more previous iterations of processing by the LLM orchestrator component 230 for the user input data 227. As such, after the LLM shortlister component 240 generates the potential response data 243*a-n*, the LLM orchestrator component 230 may send the abovementioned data to the memory storage. In some embodiments, the above-mentioned data may be sent to the memory storage as it is generated by the system 100. In some embodiments, after a response to the user input has been presented to the user 205 (and/or an action responsive to the user input has been performed), and/or a dialog between the user 205 and the system 100 has ended, the system 100 may cause the information included in the memory storage to be deleted.

In such embodiments, one or more of the prompt generation components discussed herein may be configured to include (e.g., append) one or more portions of the data included in the memory storage in the data (e.g., the generated prompts) to the corresponding language models. For example, during a subsequent iteration of processing, the plan prompt generation component 310 may receive one or more portions of the data included in the memory storage (which were generated during one or more previous iterations of processing performed with respect to the user input data 227) and include the one or more portions of data in the prompt data 315.

In some embodiments, the language models 320, 340, 540, 720 may be fine-tuned to perform a particular task(s). Fine-tuning of the language models 320, 340, 540, 720 may be performed using one or more techniques. One example fine-tuning technique is transfer learning that involves reusing a pre-trained model's weights and architecture for a new task. The pre-trained model may be trained on a large, general dataset, and the transfer learning approach allows for efficient and effective adaptation to specific tasks. Another example fine-tuning technique is sequential fine-tuning where a pre-trained model is fine-tuned on multiple related tasks sequentially. This allows the model to learn more nuanced and complex language patterns across different tasks, leading to better generalization and performance. Yet another fine-tuning technique is task-specific fine-tuning where the pre-trained model is fine-tuned on a specific task using a task-specific dataset. Yet another fine-tuning technique is multi-task learning where the pre-trained model is fine-tuned on multiple tasks simultaneously. This approach enables the model to learn and leverage the shared representations across different tasks, leading to better generalization and performance. Yet another fine-tuning technique is adapter training that involves training lightweight modules that are plugged into the pre-trained model, allowing for fine-tuning on a specific task without affecting the original model's performance on other tasks.

In some embodiments, one or more components of the system 100 discussed herein above may be configured to begin processing with respect to data as soon as the data or a portion of the data is available to the one or more components. Some components of the system 100 are generative components/models that can begin processing with respect to portions of data as they are available, instead of waiting to initiate processing after the entirety of data is available. In other words, the system 100 may be configured to stream portions of data associated with processing with respect to a user input to the one or more components such that the one or more components may begin performing their configured processing with respect to that data as soon as it is available to the one or more components. For example, if the output of the plan generation language model 320, the task selection language model 340, and/or the shortlister language model 540 indicates that additional information is needed to complete a first task associated with a user input, a request for the additional information may be sent to the personalized context component 265. Thereafter, the plan generation language model 320, the task selection language model 340, and/or the shortlister language model 540 may continue to process to complete their configured operations. For example, while the personalized context component 265 is processing to determine the additional information, the system 100 may begin processing with respect to a second task associated with the user input. Thereafter, the output of the personalized context component 265 may be sent to the response arbitration component 260 such that once the response arbitration component 260 receives the output of the LLM shortlister component 240, the response arbitration component 260 may resolve the ambiguity that resulted in the request for additional information in order to generate the output data 262. For further example, if the user input data 227 is generated to include the natural language representation of the user input, but the processing required to determine the corresponding contextual signals (e.g., weather data, time of data, dialog history, device information, etc.) is yet to be completed, the plan generation component 235 may begin processing with respect to the natural language representation of the user input. Once the corresponding contextual signals have been generated, the plan generation component 235 may begin processing with respect to the contextual signals and may update downstream components with the result of the processing with respect to the contextual signals.

As another example, if the plan generation component 235 determines that more than one task is to be completed to perform an action responsive to a user input, and the LLM shortlister component 240 processes as described herein above to cause one or more components to generate potential responses with respect to a first task of the more than one tasks, the LLM shortlister component 240 may send the potential responses (and a representation of the user input and the current task) to the response arbitration component 260 to process as described herein above with respect to those potential responses while the system 100 (e.g., the plan generation component 235 and/or the LLM shortlister component 240) completes processing with respect to the remaining tasks of the one or more tasks. Therefore, the response arbitration component 260 may process as described herein to select between the potential responses associated with the first task while the potential responses associated with one or more of the remaining tasks is completed. As such, the response arbitration component 260 may only need to arbitrate between the potential responses associated with the first task that were previously selected by the response arbitration component 260 as being responsive to the first task when the response arbitration component 260 later processes with respect to further potential responses associated with further tasks.

As a further example, if the API shortlister component 520 determines (e.g., with a confidence value that meets or exceeds a particular threshold) that a particular API or component description should be included in the relevant API data, the API shortlister component 520 may provide the corresponding relevant API data to the shortlister prompt generation component 510 so that the shortlister prompt generation component 510 may begin processing with respect to the relevant API data while the API shortlister component 520 continues to determine one or more further relevant API data. In general, the system 100 is capable of performing such streaming and processing of portions of data discussed herein (e.g., for processing with respect to a user input) and updating downstream components with the results of processing of newly available portions of data as the data becomes available for processing.

Figure 8:
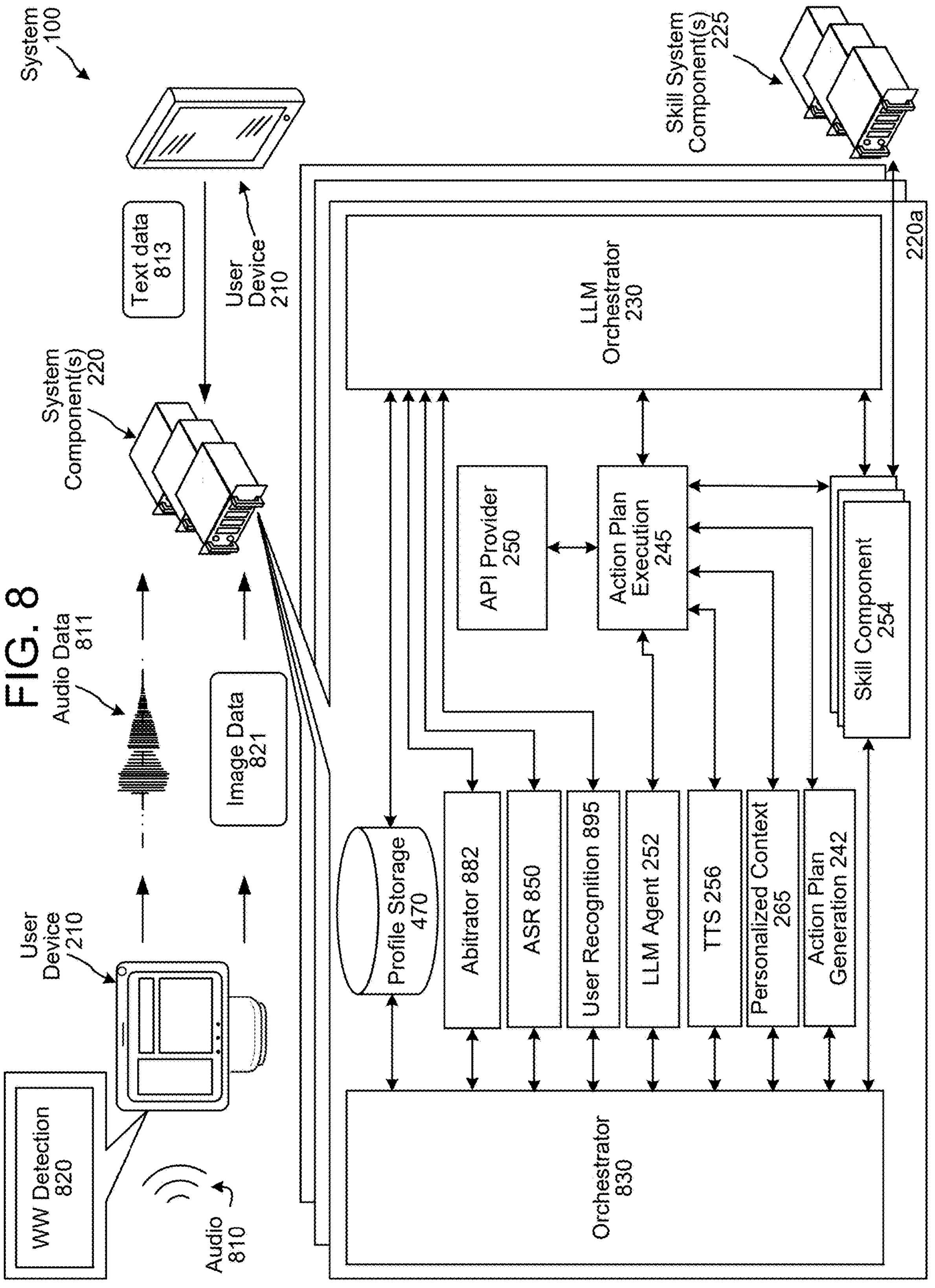
FIG. 8 is a conceptual diagram of components of the system, according to embodiments of the present disclosure.

The system 100 may operate using various components as described in FIG. 8. The various components may be located on same or different physical devices. Communication between various components may occur directly or across a network(s) 299. The user device 210 may include audio capture component(s), such as a microphone or array of microphones of a user device 210, captures audio 810 and creates corresponding audio data. Once speech is detected in audio data representing the audio 810, the user device 210 may determine if the speech is directed at the user device 210/system component(s). In at least some embodiments, such determination may be made using a wakeword detection component 820. The wakeword detection component 820 may be configured to detect various wakewords. In at least some examples, each wakeword may correspond to a name of a different digital assistant. An example wakeword/ digital assistant name is "Alexa." In another example, input to the system may be in form of text data 813, for example as a result of a user typing an input into a user interface of user device 210. Other input forms may include indication that the user has pressed a physical or virtual button on user device 210, the user has made a gesture, etc. The user device 210 may also capture images using camera(s) of the user device 210 and may send image data 821 representing those image(s) to the system component(s). The image data 821 may include raw image data or image data processed by the user device 210 before sending to the system component(s). The image data 821 may be used in various manners by different components of the system to perform operations such as determining whether a user is directing an utterance to the system, interpreting a user command, responding to a user command, etc.

The wakeword detection component 820 of the user device 210 may process the audio data, representing the audio 810, to determine whether speech is represented therein. The user device 210 may use various techniques to determine whether the audio data includes speech. In some examples, the user device 210 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 210 may implement a classifier configured to distinguish speech from background noise. The classifier may be implemented by techniques such as linear classifiers, support vector machines, and decision trees. In still other examples, the user device 210 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 810, is analyzed to determine if specific characteristics of the audio data match preconfigured acoustic waveforms, audio signatures, or other data corresponding to a wakeword.

Thus, the wakeword detection component 820 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 820 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 820 and/or input is detected by an input detector, the user device 210 may "wake" and begin transmitting audio data 811, representing the audio 810, to the system component(s) 220. The audio data 811 may include data corresponding to the wakeword; in other embodiments, the portion of the audio corresponding to the wakeword is removed by the user device 210 prior to sending the audio data 811 to the system component(s) 220. In the case of touch input detection or gesture-based input detection, the audio data may not include a wakeword.

In some implementations, the system 100 may include more than one system component(s). The system component(s) 220 may respond to different wakewords and/or perform different categories of tasks. Each system component(s) may be associated with its own wakeword such that speaking a certain wakeword results in audio data be sent to and processed by a particular system. For example, detection of the wakeword "Alexa" by the wakeword detection component 820 may result in sending audio data to system component(s) 220 for processing while detection of the wakeword "Computer" by the wakeword detector may result in sending audio data to system component(s) b for processing. The system may have a separate wakeword and system for different skills/systems (e.g., "Dungeon Master" for a game play skill/system component (s) c) and/or such skills/systems may be coordinated by one or more skill component(s) 254 of one or more system component(s) 220.

The user device 210 may also include a system directed input detector. (The system component(s) may also include a system directed input detector which may operate in a manner similar to system directed input detector.) The system directed input detector may be configured to determine whether an input to the system (for example speech, a gesture, etc.) is directed to the system or not directed to the system (for example directed to another user, etc.). The system directed input detector may work in conjunction with the wakeword detection component 820. If the system directed input detector determines an input is directed to the system, the user device 210 may "wake" and begin sending captured data for further processing If data is being processed the user device 210 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector determines an input is not directed to the system (such as a speech or gesture directed to another user) the user device 210 may discard the data and take no further action for processing purposes. In this way the system 100 may prevent processing of data not directed to the system, thus protecting user privacy. As an indicator to the user, however, the system may output an audio, visual, or other indicator when the system directed input detector is determining whether an input is potentially device directed. For example, the system may output an orange indicator while considering an input, and may output a green indicator if a system directed input is detected. Other such configurations are possible.

Upon receipt by the system component(s) 220, the audio data 811 may be sent to an orchestrator component 830 and/or the LLM orchestrator component 230. The orchestrator component 830 may include memory and logic that enables the orchestrator component 830 to transmit various pieces and forms of data to various components of the system, as well as perform other operations as described herein. In some embodiments, the orchestrator component 830 may optionally be included in the system component(s) 220. In embodiments where the orchestrator component 830 is not included in the system component(s) 220, the audio data 811 may be sent directly to the LLM orchestrator component 230. Further, in such embodiments, each of the components of the system component(s) 220 may be configured to interact with the LLM orchestrator component 230, the action plan execution component 245, and/or the API provider component 250.

In some embodiments, the system component(s) 220 may include an arbitrator component 882, which may be configured to determine whether the orchestrator component 830 and/or the LLM orchestrator component 230 are to process with respect to the audio data 811. In some embodiments, the LLM orchestrator component 230 may be selected to process with respect to the audio data 811 only if the user 205 associated with the audio data 811 (or the user device 210 that captured the audio 810) has previously indicated that the LLM orchestrator component 230 may be selected to process with respect to user inputs received from the user 205.

In some embodiments, the arbitrator component 882 may determine the orchestrator component 830 and/or the LLM orchestrator component 230 are to process with respect to the audio data 811 based on metadata associated with the audio data 811. For example, the arbitrator component 882 may be a classifier configured to process a natural language representation of the audio data 811 (e.g., output by the ASR component 850) and classify the corresponding user input as requiring the processing of the orchestrator component 830 and/or the LLM orchestrator component 230. For further example, the arbitrator component 882 may determine whether the device from which the audio data 811 is received is associated with an indicator representing the audio data 811 is to be processed by the orchestrator component 830 and/or the LLM orchestrator component 230. As an even further example, the arbitrator component 882 may determine whether the user (e.g., determined using data output from the user recognition component 895) from which the audio data 811 is received is associated with a user profile including an indicator representing the audio data 811 is to be processed by the orchestrator component 830 and/or the LLM orchestrator component 230. As another example, the arbitrator component 882 may determine whether the audio data 811 (or the output of the ASR component 850) corresponds to a request representing that the audio data 811 is to be processed by the orchestrator component 830 and/or the LLM orchestrator component 230 (e.g., a request including "let's chat" may represent that the audio data 811 is to be processed by the LLM orchestrator component 230). In some embodiments, if the arbitrator component 882 is unsure (e.g., a confidence score corresponding to whether the orchestrator component 830 and/or the LLM orchestrator component 230 is to process is below a threshold), then the arbitrator component 882 may send the audio data 811 to both of the orchestrator component 830 and the LLM orchestrator component 230. In such embodiments, the orchestrator component 830 and/or the LLM orchestrator component 230 may include further logic for determining further confidence scores during processing representing whether the orchestrator component 830 and/or the LLM orchestrator component 230 should continue processing.

The arbitrator component 882 may send the audio data 811 to an ASR component 850. In some embodiments, the component selected to process the audio data 811 (e.g., the orchestrator component 830 and/or the LLM orchestrator component 230) may send the audio data 811 to the ASR component 850. The ASR component 850 may transcribe the audio data 811 into text data. The text data output by the ASR component 850 represents one or more than one (e.g., in the form of an N-best list) ASR hypotheses representing speech represented in the audio data 811. The ASR component 850 interprets the speech in the audio data 811 based on a similarity between the audio data 811 and pre-established language models. For example, the ASR component 850 may compare the audio data 811 with models for sounds (e.g., acoustic units such as phonemes, senons, phones, etc.) and sequences of sounds to identify words that match the sequence of sounds of the speech represented in the audio data 811. The ASR component 850 sends the text data generated thereby to the arbitrator component 882, the orchestrator component 830, and/or the LLM orchestrator component 230. In instances where the text data is sent to the arbitrator component 882, the arbitrator component 882 may send the text data to the component selected to process the audio data 811 (e.g., the orchestrator component 830 and/or the LLM orchestrator component 230). The text data sent from the ASR component 850 to the arbitrator component 882, the orchestrator component 830, and/or the LLM orchestrator component 230 may include a single top-scoring ASR hypothesis or may include an N-best list including multiple top-scoring ASR hypotheses. An N-best list may additionally include a respective score associated with each ASR hypothesis represented therein.

Figure 9:
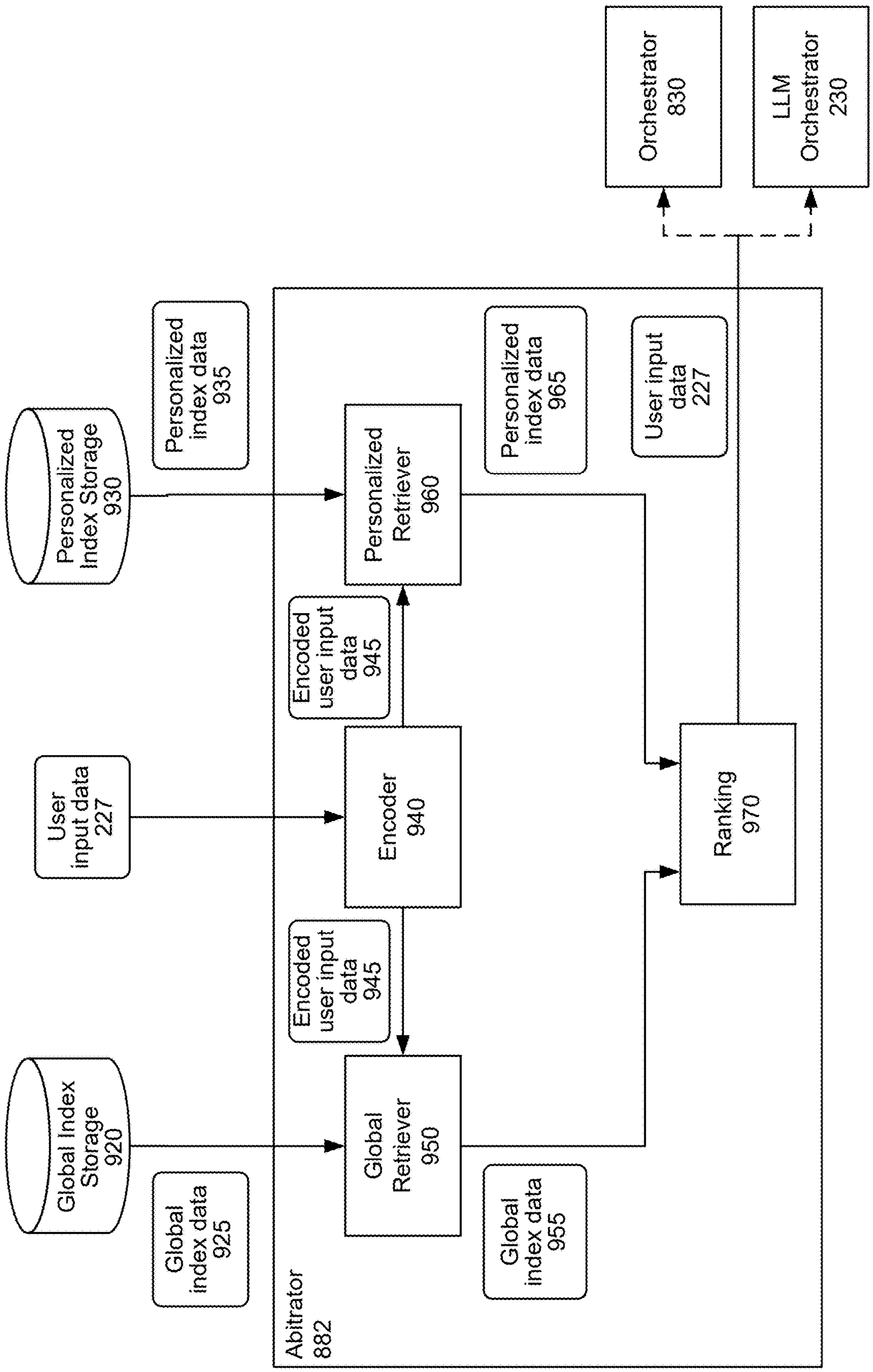
FIG. 9 is a conceptual diagram illustrating example processing of an arbitrator component, according to embodiments of the present disclosure.

FIG. 9 illustrates example components and processing of the arbitrator component 882. As shown in FIG. 9, the arbitrator component 882 may include an encoder component 940, a global retriever component 950, a personalized retriever component 960, and a ranking component 970. The arbitrator component 882 may be in communication with a global index storage 920 and a personalized index storage 930. The arbitrator component 882 may be configured to perform retrieval-based techniques based on a semantic vectorized representation of a user input and historical user inputs received by the system 100 over a period of time (e.g., past 30 days) to determine whether the orchestrator component 830 or the LLM orchestrator component 230 or both of them should process with respect to the user input.

The user input data 227 may be received at the encoder component 940 of the arbitrator component 882. The encoder component 940 may process the user input data 227 to generate encoded user input data 945 represented an encoded representation of the user input data 227 (e.g., a vectorized representation of the user input). The encoder component may send the encoded user input data 945 to the global retriever component 950 and the personalized retriever component 960. In some embodiments, the encoder component 940 may be trained using techniques associated with Deep Structured Semantic Models (DSSM).

The global retriever component 950 is configured to determine one or more historical user inputs that are similar to the user input data 227. The global retriever component 950 queries a global index storage 920 for global index data 925 representing one or more historical user inputs that are semantically similar to the user input data 227. The global retriever component 950 may include one or more historical user inputs received from various users over a period of time (e.g., 30 days). In some embodiments, the global index data 925 may correspond to an encoded representation(s) of the historical user input(s). In such embodiments, the one or more historical user inputs that are semantically similar to the user input data 227 may be determined based on comparing the encoded user input data 945 to the encoder representation(s) of the historical user input(s) (e.g., to determine a cosine similarity). The global retriever component 950 may send the global index data 925 to the ranking component 970.

The personalized retriever component 960 is configured to determine one or more historical user inputs that are similar to the user input data 227, where the one or more historical user inputs are associated with the user 205 that provided the user input corresponding to the user input data 227. The personalized retriever component 960 queries a personalized index storage 930 for personalized index data 935 representing one or more historical user inputs that are semantically similar to the user input data 227 and were provided by the same user that provided the user input corresponding to the user input data 227. The personalized retriever component 960 may include one or more historical user inputs received from the user corresponding to the user input data 227 over a period of time (e.g., 30 days). In some embodiments, the personalized index data 935 may correspond to an encoded representation(s) of the historical user input(s). In such embodiments, the one or more historical user inputs that are semantically similar to the user input data 227 may be determined based on comparing the encoded user input data 945 to the encoder representation(s) of the historical user input(s) (e.g., to determine a cosine similarity). The personalized retriever component 960 may send the personalized index data 935 to the ranking component 970.

In some embodiments, the global index storage 920 and/or the personalized index storage 930 may further include metadata associated with the historical user inputs, which may be further included in the global index data 925 and/or the personalized index data 935. For example, the global index storage 920 and/or the personalized index storage 930 may further include a user satisfaction associated with a system-generated response to the user input, a value representing how many times the user input was received during the time period, a domain (e.g., routine, smart home, shopping, weather, etc.), etc.

In some embodiments, the global retriever component 950 and/or the personalized retriever component 960 may retrieve the global index data 925 and/or the personalized index data 935 semantically similar to the encoded user input data 945 using Maximum Inner Product Search Solution.

The ranking component 970 may process the global index data 955 and the personalized index data 965 to determine whether to send the user input data 227 to the orchestrator component 830 and/or the LLM orchestrator component 230. In some embodiments, the ranking component 970 may make such a determination based on the metadata included in the global index data 955 and/or the personalized index data 965. In some embodiments, the ranking component 970 may be a rule-based component. In other embodiments, the ranking component 970 may be an ML-based component (e.g., a decision tree, a classifier, an LLM, etc.). In embodiments where the ranking component 970 is an LLM, the ranking component 970 may be further configured to determine if there the user input is ambiguous, in which case the ranking component 970 may generate a request for additional information to resolve the ambiguity.

In some embodiments, after determining that the orchestrator component 830 and/or the LLM orchestrator component 230 should process with respect to the user input data 227, the ranking component 970 may be configured to periodically determine whether the orchestrator component 830 and/or the LLM orchestrator component 230 should continue processing with respect to the user input data 227. For example, after a particular point in the processing of the orchestrator component 830 (e.g., after performing NLU, prior to determining a skill component 254 to process with respect to the user input data 227, prior to performing an action responsive to the user input, etc.) and/or the LLM orchestrator component 230 (e.g., after selecting a task to be completed, after receiving the action response data from the one or more components, after completing a task, prior to performing an action responsive to the user input, etc.) the orchestrator component 830 and/or the LLM orchestrator component 230 may query the arbitrator component 882 has determined that the orchestrator component 830 and/or the LLM orchestrator component 230 should halt processing with respect to the user input data 227. As discussed above, the system 100 may be configured to stream portions of data associated with processing with respect to a user input to the one or more components such that the one or more components may begin performing their configured processing with respect to that data as soon as it is available to the one or more components. As such, the arbitrator component 882 may cause the orchestrator component 830 and/or the LLM orchestrator component 230 to begin processing with respect to a user input as soon as a portion of data associated with the user input data 227 is available (e.g., the ASR data, context data, output of the user recognition component 895. Thereafter, once the arbitrator component 882 has enough data to perform the processing described herein above to determine whether the orchestrator component 830 and/or the LLM orchestrator component 230 is to process with respect to the user input, the arbitrator component 882 may inform the corresponding component (e.g., the orchestrator component 830 and/or the LLM orchestrator component 230) to continue/halt processing with respect to the user input at one of the logical checkpoints in the processing of the orchestrator component 830 and/or the LLM orchestrator component 230.

In some embodiments, the orchestrator component 830 and/or the LLM orchestrator component 230 may periodically confirm that they are to continue processing with respect to the user input. For example, the arbitrator component 882 may be further configured to periodically receive data generated by the orchestrator component 830 and/or the LLM orchestrator component 230 during processing with respect to the user input and determine whether the orchestrator component 830 and/or the LLM orchestrator component 230 should continue processing. The arbitrator component 882 may receive such data at logical checkpoints in the processing of the orchestrator component 830 (e.g., after completion of ASR processing, after completion of natural language understanding processing, after selection of a skill component to process with respect to the user input and prior to initiation of processing by the skill component, or prior to the processing of any component discussed herein with respect to the orchestrator component 830.) and/or the LLM orchestrator component 230 (e.g., prior to processing of the LLM shortlister component 240, prior to beginning processing with respect to a subsequent task, or prior to the processing of any other component discussed herein above with respect to the LLM orchestrator component 230). The arbitrator component 882 may be configured to process as described herein above to compare the received data to data associated with processing of a previous user input. This may allow the arbitrator component 882 to make a more informed determination (e.g., based on the additional data determined during processing of the orchestrator component 830 and/or the LLM orchestrator component 230) as to which component(s) should process the user input. In some embodiments, the data may be received at another component of the system 100 configured to process as described herein.

In some embodiments, after sending the data to the arbitrator component 882, the orchestrator component 830 and/or the LLM orchestrator component 230 may temporarily suspend processing with respect to the user input until they receive data from the arbitrator component 882 confirming that they are to continue processing with respect to the user input. As discussed above, in some embodiments, the LLM orchestrator component 230 may send the data to the arbitrator component 882 prior to the processing of the LLM shortlister component 240. In some embodiments, the LLM orchestrator component 230 may further include a component configured to process the task processing data output by the plan generation component 235 (e.g., the task processing data 237) to determine whether completion of the current task will result in a real-world action (e.g., a change in the state of a device, such as turning on a light, changing a channel on a television, changing a temperature value on a thermostat, locking a door, etc.). If the component determines that completion of the current task will result in a real-world action, then the LLM orchestrator component 230 may temporarily suspend its processing prior to the processing of the LLM shortlister component 240. If the component determines that completion of the current task will not result in a real-world action, then the LLM orchestrator component 230 may begin processing of the LLM shortlister component 240, rather than temporarily suspending processing. In some embodiments, the orchestrator component 830 may include a similarly configured component.

A skill system component(s) 225 may communicate with a skill component(s) 254 within the system component(s) 220 directly with the orchestrator component 830 and/or the action plan execution component 245, or with other components. A skill system component(s) 225 may be configured to perform one or more actions. An ability to perform such action(s) may sometimes be referred to as a "skill." That is, a skill may enable a skill system component(s) 225 to execute specific functionality in order to provide data or perform some other action requested by a user. For example, a weather service skill may enable a skill system component(s) 225 to provide weather information to the system component(s) 220, a car service skill may enable a skill system component(s) 225 to book a trip with respect to a taxi or ride sharing service, an order pizza skill may enable a skill system component(s) 225 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 220 may be configured with a skill component 254 dedicated to interacting with the skill system component(s) 225. Unless expressly stated otherwise, reference to a skill, skill device, or skill component may include a skill component 254 operated by the system component(s) 220 and/or skill operated by the skill system component(s) 225. Moreover, the functionality described herein as a skill or skill may be referred to using many different terms, such as an action, bot, app, or the like. The skill component 254 and or skill system component(s) 225 may return output data to the orchestrator component 830.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system component(s) includes a TTS component 256. The TTS component 256 may generate audio data (e.g., synthesized speech) from text data using one or more different methods. Text data input to the TTS component 256 may come from a skill component 254, the orchestrator component 830, or another component of the system. In one method of synthesis called unit selection, the TTS component 256 matches text data against a database of recorded speech. The TTS component 256 selects matching units of recorded speech and concatenates the units together to form audio data. In another method of synthesis called parametric synthesis, the TTS component 256 varies parameters such as frequency, volume, and noise to create audio data including an artificial speech waveform. Parametric synthesis uses a computerized voice generator, sometimes called a vocoder.

The user device 210 may include still image and/or video capture components such as a camera or cameras to capture one or more images. The user device 210 may include circuitry for digitizing the images and/or video for transmission to the system component(s) 220 as image data. The user device 210 may further include circuitry for voice command-based control of the camera, allowing a user 205 to request capture of image or video data. The user device 210 may process the commands locally or send audio data 811 representing the commands to the system component(s) 220 for processing, after which the system component(s) 220 may return output data that can cause the user device 210 to engage its camera.

The system component(s) 220 may include a user recognition component 895 that recognizes one or more users using a variety of data. However, the disclosure is not limited thereto, and the user device 210 may include a user recognition component 1095 instead of and/or in addition to user recognition component 895 of the system component(s) 220 without departing from the disclosure. User recognition component 1095 operates similarly to user recognition component 895.

The user recognition component 895 may take as input the audio data 811 and/or text data output by the ASR component 850. The user recognition component 895 may perform user recognition by comparing audio characteristics in the audio data 811 to stored audio characteristics of users. The user recognition component 895 may also perform user recognition by comparing biometric data (e.g., fingerprint data, iris data, etc.), received by the system in correlation with the present user input, to stored biometric data of users assuming user permission and previous authorization. The user recognition component 895 may further perform user recognition by comparing image data (e.g., including a representation of at least a feature of a user), received by the system in correlation with the present user input, with stored image data including representations of features of different users. The user recognition component 895 may perform additional user recognition processes, including those known in the art.

The user recognition component 895 determines scores indicating whether user input originated from a particular user. For example, a first score may indicate a likelihood that the user input originated from a first user, a second score may indicate a likelihood that the user input originated from a second user, etc. The user recognition component 895 also determines an overall confidence regarding the accuracy of user recognition operations.

Output of the user recognition component 895 may include a single user identifier corresponding to the most likely user that originated the user input. Alternatively, output of the user recognition component 895 may include an N-best list of user identifiers with respective scores indicating likelihoods of respective users originating the user input. The output of the user recognition component 895 may be used to inform processing of the arbitrator component 882, the orchestrator component 830, and/or the LLM orchestrator component 230 as well as processing performed by other components of the system.

The system component(s) 220/user device 210 may include a presence detection component that determines the presence and/or location of one or more users using a variety of data.

The system 100 (either on user device 210, system component(s), or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 470 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a user device 210, the user profile (associated with the presented login information) may be updated to include information about the user device 210, for example with an indication that the device is currently in use. Each user profile may include identifiers of skills that the user has enabled. When a user enables a skill, the user is providing the system component(s) with permission to allow the skill to execute with respect to the user's natural language user inputs. If a user does not enable a skill, the system component(s) may not invoke the skill to execute with respect to the user's natural language user inputs.

The profile storage 470 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 470 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Figure 10:
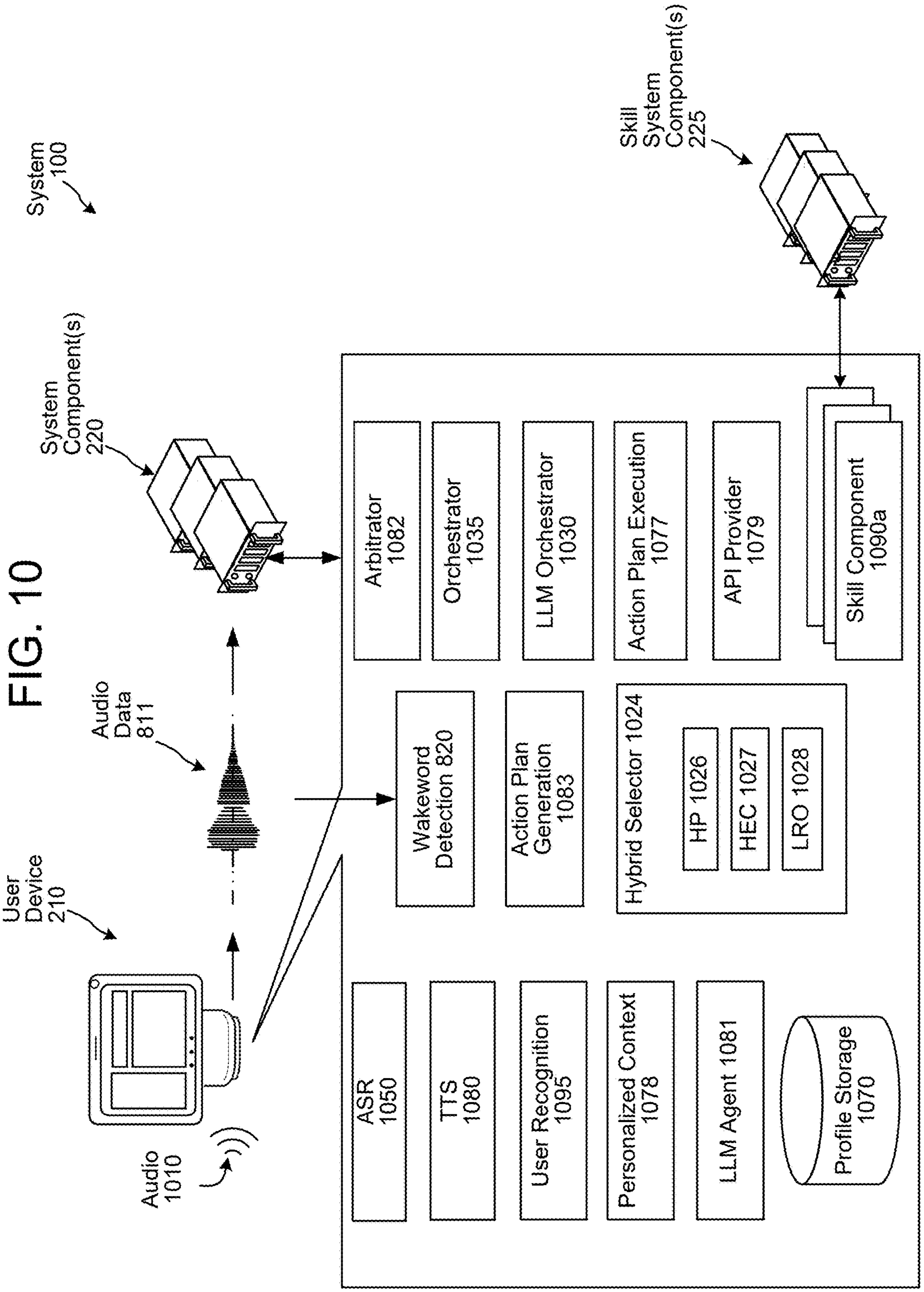
FIG. 10 is a conceptual diagram illustrating components that may be included in a device, according to embodiments of the present disclosure.

Although the components of FIG. 8 may be illustrated as part of system component(s) 220, user device 210, or otherwise, the components may be arranged in other device(s) (such as in user device 210 if illustrated in system component(s) 220 or vice-versa, or in other device(s) altogether) without departing from the disclosure. FIG. 10 illustrates such a configured user device 210.

In at least some embodiments, the system component(s) may receive the audio data 811 from the user device 210, to recognize speech corresponding to a spoken input in the received audio data 811, and to perform functions in response to the recognized speech. In at least some embodiments, these functions involve sending directives (e.g., commands), from the system component(s) to the user device 210 (and/or other devices 210) to cause the user device 210 to perform an action, such as output an audible response to the spoken input via a loudspeaker(s), and/or control secondary devices in the environment by sending a control command to the secondary devices.

Thus, when the user device 210 is able to communicate with the system component(s) over the network(s) 299, some or all of the functions capable of being performed by the system component(s) may be performed by sending one or more directives over the network(s) 299 to the user device 210, which, in turn, may process the directive(s) and perform one or more corresponding actions. For example, the system component(s), using a remote directive that is included in response data (e.g., a remote response), may instruct the user device 210 to output an audible response (e.g., using TTS processing performed by an on-device TTS component 1080) to a user's question via a loudspeaker(s) of (or otherwise associated with) the user device 210, to output content (e.g., music) via the loudspeaker(s) of (or otherwise associated with) the user device 210, to display content on a display of (or otherwise associated with) the user device 210, and/or to send a directive to a secondary device (e.g., a directive to turn on a smart light). It is to be appreciated that the system component(s) may be configured to provide other functions in addition to those discussed herein, such as, without limitation, providing step-by-step directions for navigating from an origin location to a destination location, conducting an electronic commerce transaction on behalf of the user 205 as part of a shopping function, establishing a communication session (e.g., a video call) between the user 205 and another user, and so on.

As noted with respect to FIG. 8, the user device 210 may include a wakeword detection component 820 configured to compare the audio data 811 to stored models used to detect a wakeword (e.g., "Alexa") that indicates to the user device 210 that the audio data 811 is to be processed by the user device 210 (e.g., by the orchestrator component 1035 and/or the LLM orchestrator 1030, which are configured similar to the orchestrator component 830 and the LLM orchestrator component 230, respectively). In at least some embodiments, a hybrid selector 1024, of the user device 210, may send the audio data 811 to the wakeword detection component 820. If the wakeword detection component 820 detects a wakeword in the audio data 811, the wakeword detection component 820 may send an indication of such detection to the hybrid selector 1024. In response to receiving the indication, the hybrid selector 1024 may send the audio data 811 to the system component(s) and/or the ASR component 1050. The wakeword detection component 820 may also send an indication, to the hybrid selector 1024, representing a wakeword was not detected. In response to receiving such an indication, the hybrid selector 1024 may refrain from sending the audio data 811 to the system component(s), and may prevent the ASR component 1050 from further processing the audio data 811. In this situation, the audio data 811 can be discarded.

The user device 210 may conduct its own speech processing using on-device language processing components, such as an ASR component 1050, similar to the manner discussed herein with respect to the ASR component 850 of the system component(s). ASR component 1050 may operate similarly to ASR component 850. The user device 210 may also internally include, or otherwise have access to, other components such as one or more skill components 1090 capable of executing commands based on the output of the orchestrator component 1035, the LLM orchestrator 1030, or other results determined by the user device 210/system component(s) (which may operate similarly to skill components 254), an arbitrator component 1082 (configured to process in a similar manner to that discussed herein above with respect to the arbitrator component 882), an action plan execution component 1077 (configured to process in a similar manner to that discussed herein with respect to the action plan execution component 245), a personalized context component 1078 (configured to process in a similar manner to that discussed herein with respect to the personalized context component 265), an API provider component 1079 (configured to process in a similar manner to that discussed herein with respect to the API provider component 250), and LLM agent component 1081 (configured to process in a similar manner to that discussed herein with respect to the LLM agent component 252), an action plan generation component 1083 (configured to process in a similar manner to that discussed herein with respect to the action plan generation component 242), a user recognition component 1095 (configured to process in a similar manner to that discussed herein with respect to the user recognition component 895 of the system component(s)), profile storage 1070 (configured to store similar profile data to that discussed herein with respect to the profile storage 470 of the system component(s)), or other components. In at least some embodiments, the profile storage 1070 may only store profile data for a user or group of users specifically associated with the user device 210. Similar to as described above with respect to skill component 254, a skill component 1090 may communicate with a skill system component(s) 225. The user device 210 may also have its own TTS component 1080, which may operate similarly to TTS component 256.

In at least some embodiments, the on-device language processing components may not have the same capabilities as the language processing components of the system component(s). For example, the on-device language processing components may be configured to handle only a subset of the natural language user inputs that may be handled by the system component(s). For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s). If the user device 210 attempts to process a natural language user input for which the on-device language processing components are not necessarily best suited, the language processing results determined by the user device 210 may indicate a low confidence or other metric indicating that the processing by the user device 210 may not be as accurate as the processing done by the system component(s).

The hybrid selector 1024, of the user device 210, may include a hybrid proxy (HP) 1026 configured to proxy traffic to/from the system component(s). For example, the HP 1026 may be configured to send messages to/from a hybrid execution controller (HEC) 1027 of the hybrid selector 1024. For example, command/directive data received from the system component(s) can be sent to the HEC 1027 using the HP 1026. The HP 1026 may also be configured to allow the audio data 811 to pass to the system component(s) while also receiving (e.g., intercepting) this audio data 811 and sending the audio data 811 to the HEC 1027.

In at least some embodiments, the hybrid selector 1024 may further include a local request orchestrator (LRO) 1028 configured to notify the ASR component 1050 about the availability of new audio data 811 that represents user speech, and to otherwise initiate the operations of local language processing when new audio data 811 becomes available. In general, the hybrid selector 1024 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the user device 210 receives directive data from the system component(s) and chooses to use that remotely-determined directive data.

Thus, when the audio data 811 is received, the HP 1026 may allow the audio data 811 to pass through to the system component(s) and the HP 1026 may also input the audio data 811 to the on-device ASR component 1050 by routing the audio data 811 through the HEC 1027 of the hybrid selector 1024, whereby the LRO 1028 notifies the ASR component 1050 of the audio data 811. At this point, the hybrid selector 1024 may wait for response data from either or both of the system component(s) or the local language processing components. However, the disclosure is not limited thereto, and in some examples the hybrid selector 1024 may send the audio data 811 only to the local ASR component 1050 without departing from the disclosure. For example, the user device 210 may process the audio data 811 locally without sending the audio data 811 to the system component(s).

The local ASR component 1050 is configured to receive the audio data 811 from the hybrid selector 1024, and to recognize speech in the audio data 811. The user device 210 and/or the system component(s) may associate a unique identifier with each natural language user input. The user device 210 may include the unique identifier when sending the audio data 811 to the system component(s), and the response data from the system component(s) may include the unique identifier to identify which natural language user input the response data corresponds.

In at least some embodiments, the user device 210 may include, or be configured to use, one or more skill components 1090 that may work similarly to the skill component(s) 254 implemented by the system component(s). The skill component(s) 1090 may correspond to one or more domains that are used in order to determine how to act on a spoken input in a particular way, such as by outputting a directive that corresponds to the determined intent, and which can be processed to implement the desired operation. The skill component(s) 1090 installed on the user device 210 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally, or alternatively, the user device 210 may be in communication with one or more skill system component(s) 225. For example, a skill system component (s) 225 may be located in a remote environment (e.g., separate location) such that the user device 210 may only communicate with the skill system component(s) 225 via the network(s) 299. However, the disclosure is not limited thereto. For example, in at least some embodiments, a skill system component(s) 225 may be configured in a local environment (e.g., home server and/or the like) such that the user device 210 may communicate with the skill system component(s) 225 via a private network, such as a local area network (LAN).

As used herein, a "skill" may refer to a skill component 1090, a skill system component(s) 225, or a combination of a skill component 1090 and a corresponding skill system component(s) 225.

Similar to the manner discussed with regard to FIG. 8, the local user device 210 may be configured to recognize multiple different wakewords and/or perform different categories of tasks depending on the wakeword. Such different wakewords may invoke different processing components of local user device 210 (not illustrated in FIG. 10). For example, detection of the wakeword "Alexa" by the wakeword detection component 820 may result in sending audio data to certain language processing components 1092/skill components 1090 for processing while detection of the wakeword "Computer" by the wakeword detector may result in sending audio data different language processing components 1092/skill components 1090 for processing.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 11:
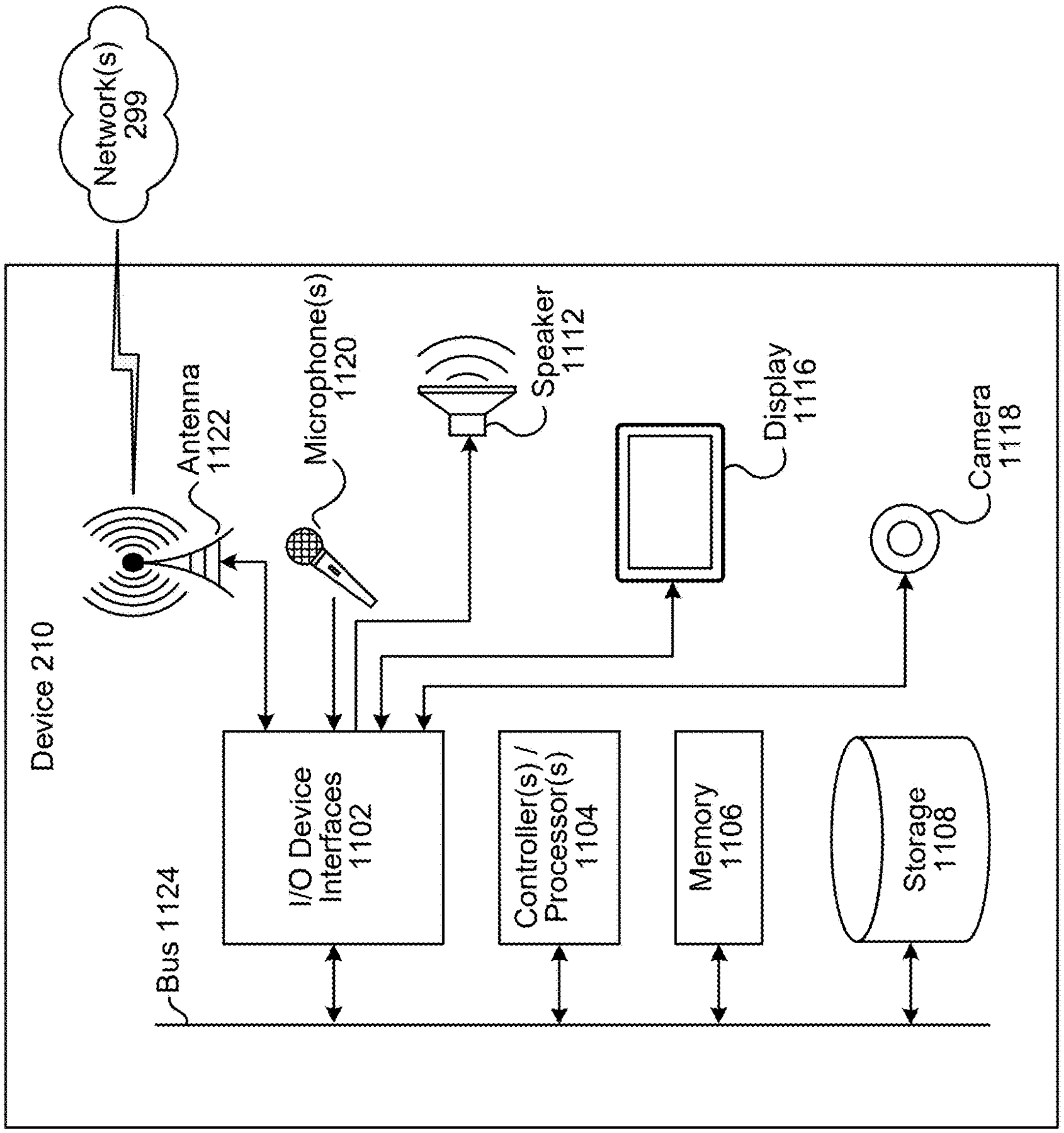
FIG. 11 is a block diagram conceptually illustrating example components of a device, according to embodiments of the present disclosure.
Figure 12:
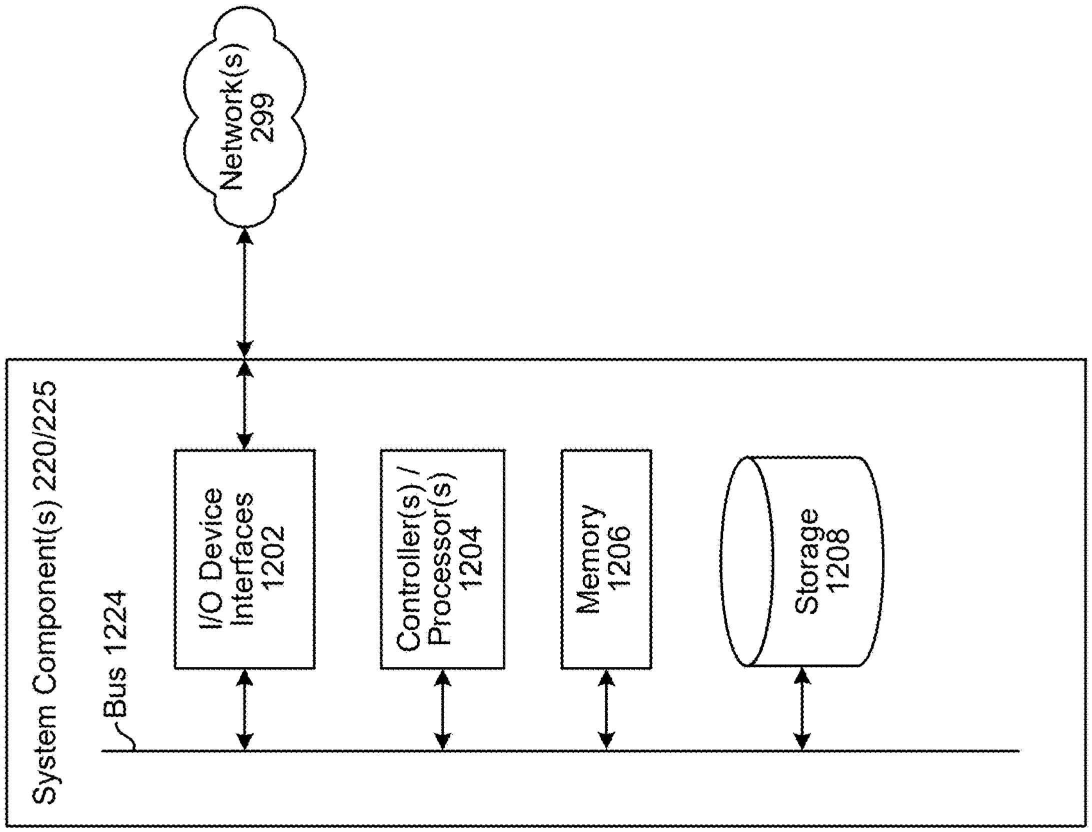
FIG. 12 is a block diagram conceptually illustrating example components of a system, according to embodiments of the present disclosure.

FIG. 11 is a block diagram conceptually illustrating a user device 210 that may be used with the system. FIG. 12 is a block diagram conceptually illustrating example components of a remote device, such as the natural language command processing system component(s), which may assist with ASR processing, NLU processing, etc., and a skill system component(s) 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the user device 210 may operate locally to a user (e.g., within a same environment so the device may receive inputs and playback outputs for the user) the server/system component(s) may be located remotely from the user device 210 as its operations may not require proximity to the user. The server/system component(s) may be located in an entirely different location from the user device 210 (for example, as part of a cloud computing system or the like) or may be located in a same environment as the user device 210 but physically separated therefrom (for example a home server or similar device that resides in a user's home or business but perhaps in a closet, basement, attic, or the like). The system component(s) 120 may also be a version of a user device 210 that includes different (e.g., more) processing capabilities than other user device(s) 110 in a home/office. One benefit to the server/system component(s) being in a user's home/business is that data used to process a command/return a response may be kept within the user's home, thus reducing potential privacy concerns.

Multiple system components (120/125) may be included in the overall system 100 of the present disclosure, such as one or more natural language processing system component(s) 120 for performing ASR processing, one or more natural language processing system component(s) 120 for performing NLU processing, one or more skill system component(s) 125, etc. In operation, each of these systems may include computer-readable and computer-executable instructions that reside on the respective device (120/125), as will be discussed further below.

Each of these devices (110/120/125) may include one or more controllers/processors (1104/1204), which may each include a central processing unit (CPU) for processing data and computer-readable instructions, and a memory (1106/1206) for storing data and instructions of the respective device. The memories (1106/1206) may individually include volatile random access memory (RAM), non-volatile read only memory (ROM), non-volatile magnetoresistive memory (MRAM), and/or other types of memory. Each device (110/120/125) may also include a data storage component (1108/1208) for storing data and controller/processor-executable instructions. Each data storage component (1108/1208) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1102/1202).

Computer instructions for operating each device (110/120/125) and its various components may be executed by the respective device's controller(s)/processor(s) (1104/1204), using the memory (1106/1206) as temporary "working" storage at runtime. A device's computer instructions may be stored in a non-transitory manner in non-volatile memory (1106/1206), storage (1108/1208), or an external device(s). Alternatively, some or all of the executable instructions may be embedded in hardware or firmware on the respective device in addition to or instead of software.

Each device (110/120/125) includes input/output device interfaces (1102/1202). A variety of components may be connected through the input/output device interfaces (1102/1202), as will be discussed further below. Additionally, each device (110/120/125) may include an address/data bus (1124/1224) for conveying data among components of the respective device. Each component within a device (110/120/125) may also be directly connected to other components in addition to (or instead of) being connected to other components across the bus (1124/1224).

Referring to FIG. 11, the user device 210 may include input/output device interfaces 1102 that connect to a variety of components such as an audio output component such as a speaker 1112, a wired headset or a wireless headset (not illustrated), or other component capable of outputting audio. The user device 210 may also include an audio capture component. The audio capture component may be, for example, a microphone 1120 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The user device 210 may additionally include a display 1116 for displaying content. The user device 210 may further include a camera 1118.

Via antenna(s) 1122, the input/output device interfaces 1102 may connect to one or more networks 299 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 299, the system may be distributed across a networked environment. The I/O device interface (1102/1202) may also include communication components that allow data to be exchanged between devices such as different physical servers in a collection of servers or other components.

The components of the device(s) 110, the natural language command processing system component(s), or a skill system component(s) 125 may include their own dedicated processors, memory, and/or storage. Alternatively, one or more of the components of the device(s) 110, the natural language command processing system component(s), or a skill system component(s) 125 may utilize the I/O interfaces (1102/1202), processor(s) (1104/1204), memory (1106/1206), and/or storage (1108/1208) of the device(s) 110, natural language command processing system component(s), or the skill system component(s) 125, respectively. Thus, the ASR component XXA50 may have its own I/O interface(s), processor(s), memory, and/or storage; the NLU component XXA60 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the user device 210, the natural language command processing system component(s), and a skill system component(s) 125, as described herein, are illustrative, and may be located as a stand-alone device or may be included, in whole or in part, as a component of a larger device or system. As can be appreciated, a number of components may exist either on a system component(s) and/or on user device 210. Unless expressly noted otherwise, the system version of such components may operate similarly to the device version of such components and thus the description of one version (e.g., the system version or the local version) applies to the description of the other version (e.g., the local version or system version) and vice-versa.

Figure 13:
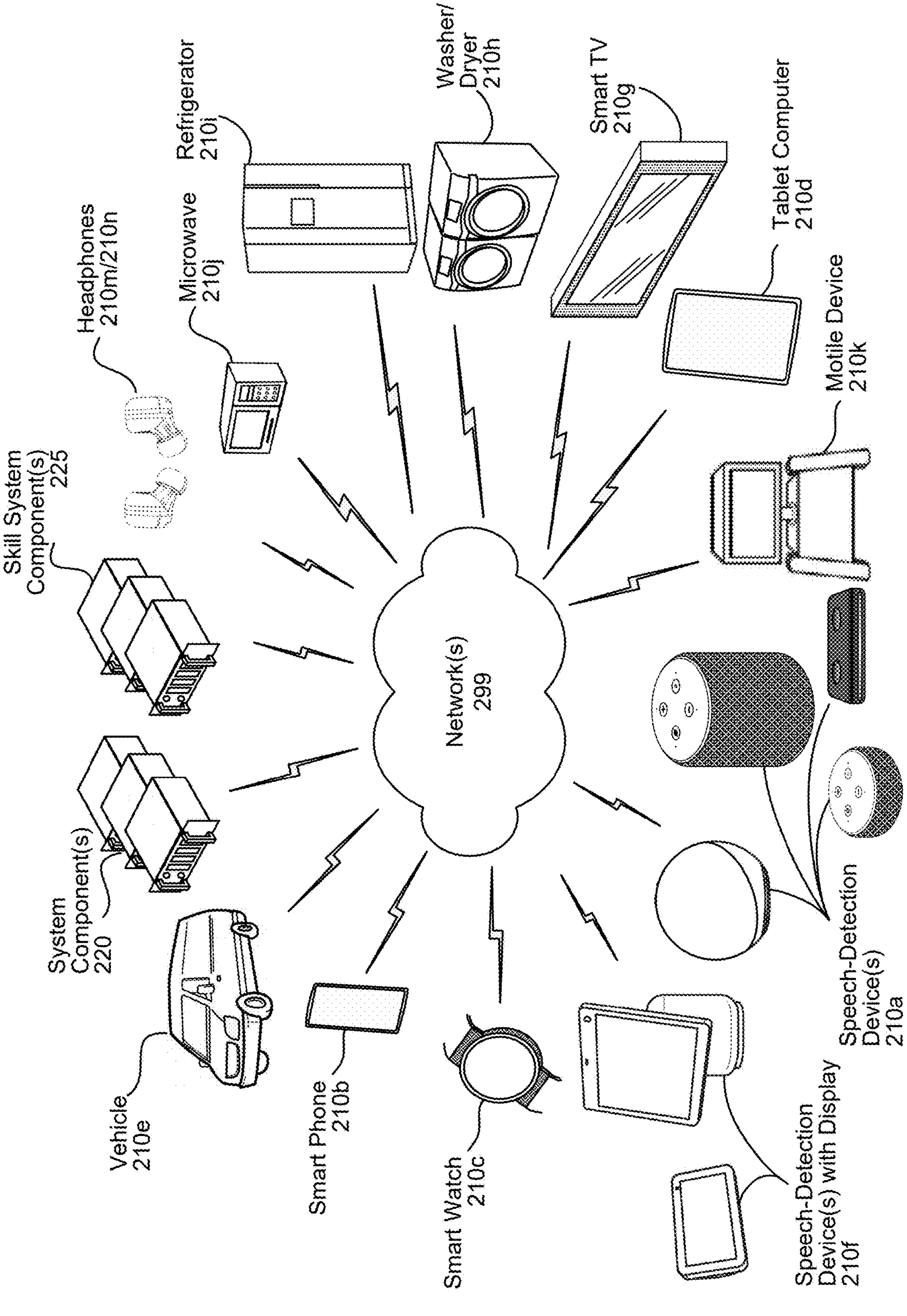
FIG. 13 illustrates an example of a computer network for use with the overall system, according to embodiments of the present disclosure.

As illustrated in FIG. 13, multiple devices (110*a*-110*n*, 120, 125) may contain components of the system and the devices may be connected over a network(s) 299. The network(s) 299 may include a local or private network or may include a wide network such as the Internet. Devices may be connected to the network(s) 299 through either wired or wireless connections. For example, a speech-detection device 210*a*, a smart phone 210*b*, a smart watch 210*c*, a tablet computer 210*d*, a vehicle 210*e*, a speech-detection device with display 210*f*, a display/smart television 210*g*, a washer/dryer 210*h*, a refrigerator 210*i*, a microwave 210*j*, autonomously motile device 210*k* (e.g., a robot), etc., may be connected to the network(s) 299 through a wireless service provider, over a Wi-Fi or cellular network connection, or the like. Other devices are included as network-connected support devices, such as the natural language command processing system component(s) 120, the skill system component(s) 125, and/or others. The support devices may connect to the network(s) 299 through a wired connection or wireless connection. Networked devices may capture audio using one-or-more built-in or connected microphones or other audio capture devices, with processing performed by ASR components, NLU components, or other components of the same device or another device connected via the network(s) 299, such as the ASR component XXA50, the NLU component XXA60, etc. of the natural language command processing system component(s) 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:

receiving first input audio data representing a first spoken input;

performing automatic speech recognition (ASR) processing using the first input audio data to generate a first transcript of the first spoken input;

receiving first context data associated with the first spoken input, wherein the first context data is determined by a first component, and includes a first value;

based at least in part on the first context data, determining a first component description associated with the first component;

determining the first component description indicates the first value is to be modified prior to being processed by a first language model;

based at least in part on determining the first component description indicates the first value is to be modified, generating a first modified value;

determining second context data corresponding to the first context data, wherein the second context data includes the first modified value, instead of the first value;

determining first data associating the first value and the first modified value;

processing the first transcript and the second context data to generate a first prompt including the first transcript and the second context data;

processing, using the first language model, the first prompt to generate first model output data indicating a first action to be performed by a second component, wherein the first model output data includes the first modified value;

based at least in part on the first data, processing the first model output data to generate a first request for the second component to perform the first action, wherein the first request includes the first value, instead of the first modified value;

based at least in part on the first request, causing the second component to perform the first action;

receiving, from the second component, first response data associated with performance of the first action;

generating, based at least in part on the first response data, first output data responsive to the first spoken input; and causing presentation of the first output data.

2. The computer-implemented method of claim 1, wherein the first value is associated with a first identifier type and profile data associated with the first spoken input, and the method further comprises:

using the profile data, determining a name associated with the first value;

based at least in part on the first identifier type, determining a first mapping representing an association between a previous value and a previous modified value;

based at least in part on the name and the previous modified value, determining the first modified value, wherein the first modified value is a natural language description of the first value; and generating a second mapping representing an association between the first value and the first modified value.

3. The computer-implemented method of claim 1, wherein the first response data includes a second value and the method further comprises:

based at least in part on the first response data, determining a second component description associated with the second component;

determining the second component description indicates the second value is to be modified;

based at least in part on determining the second component description indicates the second value is to be modified, generating a second modified value;

determining second response data corresponding to the first response data, wherein the second response data includes the second modified value, instead of the second value; and generating a mapping representing the first value and the first modified value are associated, wherein generating, based at least in part on the first response data, the first output data responsive to the first spoken input further comprises processing the second response data.

4. The computer-implemented method of claim 1, wherein the first value is associated with a first identifier type and the first context data includes a component identifier associated with a third component that generated the first context data, and the method further comprises:

determining the component identifier corresponds to the first component description;

based at least in part on the component identifier corresponding to the first component description, retrieve the first component description from a storage; and processing the first value and the first component description to determine the first component description includes the first identifier type, wherein determining the first component description indicates the first value is to be modified is based at least in part on determining the first component description includes the first identifier type.

5. A computer-implemented method comprising:

receiving first input data;

receiving first context data associated with the first input data, wherein the first context data is determined by a first component, the first context data including a first value;

determining a component description associated with the first component;

determining the component description indicates that the first value is to be modified prior to processing by a first language model;

determining second context data corresponding to the first context data, wherein the second context data includes a first modified value instead of the first value;

processing, using the first language model, the first input data and the second context data to determine first data indicating a first action to be performed by a second component, wherein the first action is to be performed using the first value;

based at least in part on the first data, determining second data representing the first action, wherein the second data includes the first value;

based at least in part on the second data, receiving, from the second component, first response data associated with performance of the first action;

generating, based at least in part on the first response data, first output data corresponding to the first input data; and causing presentation of the first output data.

6. The computer-implemented method of claim 5, wherein the first value is associated with a first identifier type and profile data associated with the first input data, and the method further comprises:

using the profile data, determining natural language data associated with the first value;

based at least in part on the first identifier type, determining a first mapping representing an association between a previous value and a previous modified value;

based at least in part on the natural language data and the previous modified value, determining the first modified value, wherein the first modified value is a natural language description of the first value; and generating a second mapping representing an association between the first value and the first modified value.

7. The computer-implemented method of claim 5, further comprising:

processing the second data to generate a first executable application programming interface (API) call usable to cause the first component to perform the first action, the first executable API call including the first value, wherein receiving the first response data associated with performance of the first action based at least in part on the second data comprises processing the first executable API call.

8. The computer-implemented method of claim 5, wherein the first response data includes a second value and the method further comprises:

based at least in part on the first response data, determining third data associated with the first component, the third data indicating the second value is to be modified;

based at least in part on the third data indicating the second value is to be modified, generating a second modified value;

determining second response data corresponding to the first response data, wherein the second response data includes the second modified value, instead of the second value; and generating a mapping representing the second value and the second modified value are associated, wherein generating, based at least in part on the first response data, the first output data corresponding to the first input data comprises processing the second response data.

9. The computer-implemented method of claim 8, wherein the first input data includes a first user input, and the method further comprises:

determining the second response data is responsive to the first user input, wherein generating the first output data is based at least in part on determining the second response data is responsive to the first user input;

based at least in part on determining the second response data is responsive to the first user input, using the third data to determine the second value;

generating third response data corresponding to the second response data, wherein the third response data includes the second value, instead of the second modified value; and based at least in part on the third response data, causing the first component to perform the first action.

10. The computer-implemented method of claim 5, wherein the first value is associated with a first identifier type, and the method further comprises:

determining third data including one or more identifier types associated with values to be modified; and processing the first value and the third data to determine the third data includes the first identifier type, wherein determining that the first value is to be modified prior to processing by the first language model is based at least in part on determining the third data includes the first identifier type.

11. The computer-implemented method of claim 5, wherein the first value is associated with a first identifier type and the first context data includes a component identifier associated with the first component, and the method further comprises:

determining the component identifier corresponds to the component description;

based at least in part on the component identifier corresponding to the component description, retrieving the component description from a storage;

processing the first value and the component description to determine the component description includes the first identifier type; and based at least in part on determining the component description includes the first identifier type, determining the component description indicates the first value is to be modified.

12. The computer-implemented method of claim 5, wherein the first language model is a large language model (LLM), and the method further comprises:

processing the second context data to generate a first prompt including the second context data, wherein the first prompt is a first instruction for the LLM to determine a component to process with respect to the first input data; and processing, using the LLM, the first prompt to generate the first data.

13. A computing system comprising:

at least one processor; and at least one memory including instructions, that when executed by the at least one processor, cause the computing system to:

receive first input data;

receive first context data associated with the first input data, wherein the first context data is determined by a first component, the first context data including a first value;

determine a component description associated with the first component;

determine the component description indicates that the first value is to be modified prior to processing by a first language model;

determine second context data representing the first context data, wherein the second context data includes a first modified value instead of the first value;

process, using the first language model, the first input data and the second context data to determine first data indicating a first action to be performed by a second component, wherein the first action is to be performed using the first value;

based at least in part on the first data, determine second data representing the first action, wherein the second data includes the first value;

based at least in part on the second data, receive, from the second component, first response data associated with performance of the first action;

generate, based at least in part on the first response data, first output data corresponding to the first input data; and cause presentation of the first output data.

14. The computing system of claim 13, wherein the first value is associated with a first identifier type and profile data associated with the first input data, and wherein the at least one memory further comprises instructions that, when executed by the at least one processor, further cause the computing system to:

using the profile data, determine natural language data associated with the first value;

based at least in part on the first identifier type, determine a first mapping representing an association between a previous value and a previous modified value;

based at least in part on the natural language data and the previous modified value, determine the first modified value, wherein the first modified value is a natural language description of the first value; and generate a second mapping representing an association between the first value and the first modified value.

15. The computing system of claim 13, wherein the at least one memory further comprises instructions that, when executed by the at least one processor, further cause the computing system to:

process the second data to generate a first executable application programming interface (API) call usable to cause the first component to perform the first action, the first executable API call including the first value, wherein receiving the first response data associated with performance of the first action based at least in part on the second data comprises processing the first executable API call.

16. The computing system of claim 13, wherein the first response data includes a second value and wherein the at least one memory further comprises instructions that, when executed by the at least one processor, further cause the computing system to:

based at least in part on the first response data, determine third data associated with the first component, the third data indicating the second value is to be modified;

based at least in part on the second data indicating the second value is to be modified, generate a second modified value;

determine second response data corresponding to the first response data, wherein the second response data includes the second modified value, instead of the second value; and generate a mapping representing the second value and the second modified value are associated, wherein generating, based at least in part on the first response data, the first output data corresponding to the first input data comprises processing the second response data.

17. The computing system of claim 16, wherein the first input data includes a first user input, wherein the at least one memory further comprises instructions that, when executed by the at least one processor, further cause the computing system to:

determine the second response data is responsive to the first user input, wherein generating the first output data is based at least in part on determining the second response data is responsive to the first user input;

based at least in part on determining the second response data is responsive to the first user input, use the third data to determine the second value;

generate third response data corresponding to the second response data, wherein the third response data includes the second value, instead of the second modified value; and based at least in part on the third response data, cause the first component to perform the first action.

18. The computing system of claim 13, wherein the first value is associated with a first identifier type, and wherein the at least one memory further comprises instructions that, when executed by the at least one processor, further cause the computing system to:

determine third data including one or more identifier types associated with values to be modified; and process the first value and the third data to determine the third data includes the first identifier type, wherein determining that the first value is to be modified prior to processing by the first language model is based at least in part on determining the third data includes the first identifier type.

19. The computing system of claim 13, wherein the first value is associated with a first identifier type and the first context data includes a component identifier associated with the first component, and wherein the at least one memory further comprises instructions that, when executed by the at least one processor, further cause the computing system to:

determine the component identifier corresponds to the component description;

based at least in part on the component identifier corresponding to the component description, retrieve the component description from a storage;

process the first value and the component description to determine the component description includes the first identifier type; and based at least in part on determining the component description includes the first identifier type, determine the component description indicates the first value is to be modified.

20. The computing system of claim 13, wherein the first language model is a large language model (LLM), and wherein the at least one memory further comprises instructions that, when executed by the at least one processor, further cause the computing system to:

process the second context data to generate a first prompt including the second context data, wherein the first prompt is a first instruction for the LLM to determine a component to process with respect to the first input data; and process, using the LLM, the first prompt to generate the first data.

* * * * *